United States Patent
Shimizu et al.

(12) 
(10) Patent No.: US 10,602,104 B2
(45) Date of Patent: Mar. 24, 2020

(54) LIGHTING APPARATUS

(71) Applicant: MAXELL, LTD., Kyoto (JP)

(72) Inventors: Takuya Shimizu, Kyoto (JP); Maki Hanada, Kyoto (JP); Megumi Kurachi, Kyoto (JP); Hiroyuki Urata, Kyoto (JP); Katsuyuki Watanabe, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/184,201

(22) Filed: Nov. 8, 2018

(65) Prior Publication Data
US 2019/0089936 A1    Mar. 21, 2019

Related U.S. Application Data

(63) Continuation of application No. 15/538,678, filed as application No. PCT/JP2015/085101 on Dec. 15, 2015, now Pat. No. 10,171,780.

(30) Foreign Application Priority Data

Dec. 26, 2014 (JP) ................ 2014-265568
Dec. 10, 2015 (JP) ................ 2015-241285

(51) Int. Cl.
*H04N 9/31* (2006.01)
*G03B 21/14* (2006.01)
(Continued)

(52) U.S. Cl.
CPC .............. *H04N 9/3158* (2013.01); *F21S 8/00* (2013.01); *F21V 23/0478* (2013.01);
(Continued)

(58) Field of Classification Search
CPC ........ H01H 17/00; H01H 17/02; H01H 17/08; H01H 17/16; F21V 23/04; F21S 8/04;
(Continued)

(56) References Cited

U.S. PATENT DOCUMENTS 1,147,949 A * 7/1915 Keen .................. F21V 23/04
                                                 191/12.2 R
5,645,341 A * 7/1997 Liao ................... F21L 4/08
                                                 362/183
(Continued)

FOREIGN PATENT DOCUMENTS

JP    60-150518 A    8/1985
JP    1-189890 A     7/1989
(Continued)

OTHER PUBLICATIONS

International Search Report of PCT/JP2015/085101 dated Mar. 1, 2016.
(Continued)

*Primary Examiner* — William N Harris
(74) *Attorney, Agent, or Firm* — Mattingly & Malur, PC

(57) ABSTRACT

A lighting apparatus with an image-projecting function that is convenient for a user is provided. It includes: an illuminating unit that emits illumination light; a projection-type image display unit that emits image-projecting emission light for projecting an image; and a sensor that emits operation-detecting light for operation detection and that is capable of detecting an operation by an operation object in a range including an image projection area of the projection-type image display unit, and is configured so that the image-projecting light, and the operation-detecting emission light have respective different wavelength distribution characteristics, and regarding a light amount in the wavelength range of light used by the sensor for the operation detection, a light amount of the operation-detecting light is the largest among those of the illumination light, the image-projecting emission light, and the operation-detecting light.

8 Claims, 43 Drawing Sheets

(A)

(B)

(51) Int. Cl.

| | | |
|---|---|---|
| *H05B 33/08* | (2020.01) | |
| *F21V 33/00* | (2006.01) | |
| *F21S 8/00* | (2006.01) | |
| *F21V 23/04* | (2006.01) | |
| *G03B 21/28* | (2006.01) | |
| *F21Y 115/10* | (2016.01) | |
| *G06F 3/042* | (2006.01) | |
| *H05B 37/02* | (2006.01) | |
| *G06F 3/0482* | (2013.01) | |
| *G06F 3/0484* | (2013.01) | |
| *G06F 3/01* | (2006.01) | |

(52) U.S. Cl.
CPC ............ *F21V 33/00* (2013.01); *G03B 21/145* (2013.01); *G06F 3/011* (2013.01); *G06F 3/0421* (2013.01); *G06F 3/0425* (2013.01); *G06F 3/0426* (2013.01); *G06F 3/0482* (2013.01); *G06F 3/04842* (2013.01); *H04N 9/3179* (2013.01); *H04N 9/3194* (2013.01); *H05B 33/0803* (2013.01); *H05B 37/0227* (2013.01); *F21V 23/04* (2013.01); *F21Y 2115/10* (2016.08); *G03B 21/28* (2013.01)

(58) Field of Classification Search
CPC .. F21S 8/06; F21S 8/046; H05B 39/02; G03B 21/145
USPC ................................. 362/253, 184, 236, 240
See application file for complete search history.

(56) References Cited

U.S. PATENT DOCUMENTS

| | | | |
|---|---|---|---|
| 6,315,431 B1 * | 11/2001 | Greedy ................. F04D 25/088 | |
| | | | 362/205 |
| 8,297,758 B2 | 10/2012 | Choi | |
| 10,171,780 B2 | 1/2019 | Shimizu et al. | |
| 2010/0128231 A1 | 5/2010 | Furui | |
| 2010/0289664 A1 | 11/2010 | Mizushima et al. | |
| 2011/0292303 A1 | 12/2011 | Nimura et al. | |
| 2012/0019165 A1 | 1/2012 | Igaki et al. | |
| 2012/0287493 A1 | 11/2012 | Kuhlman | |
| 2013/0163232 A1 | 6/2013 | Kasuga | |
| 2013/0222771 A1 | 8/2013 | Tsubota | |
| 2014/0022463 A1 | 1/2014 | Kinebuchi et al. | |
| 2014/0035964 A1 | 2/2014 | Kasuga | |
| 2014/0043544 A1 | 2/2014 | Kasuga | |
| 2014/0098303 A1 | 4/2014 | Kasuga | |
| 2015/0159860 A1 * | 6/2015 | Truong ............... F21V 33/0052 | |
| | | | 362/234 |
| 2015/0209666 A1 | 7/2015 | Harris | |
| 2019/0089936 A1 | 3/2019 | Shimizu et al. | |

FOREIGN PATENT DOCUMENTS

| | | |
|---|---|---|
| JP | 4-2005 A | 1/1992 |
| JP | 07-264527 A | 10/1995 |
| JP | 09-139905 A | 5/1997 |
| JP | 11-144510 A | 5/1999 |
| JP | 2004-037918 A | 2/2004 |
| JP | 2004-078150 A | 3/2004 |
| JP | 2004-233692 A | 8/2004 |
| JP | 2004-336615 A | 11/2004 |
| JP | 2006-086024 A | 3/2006 |
| JP | 2006-162832 A | 6/2006 |
| JP | 2007-027072 A | 2/2007 |
| JP | 2004-184768 A | 7/2007 |
| JP | 2008-41594 A | 2/2008 |
| JP | 2008-077979 A | 4/2008 |
| JP | 2008-180837 A | 8/2008 |
| JP | 2008-185757 A | 8/2008 |
| JP | 2009-145526 A | 7/2009 |
| JP | 2009-186927 A | 8/2009 |
| JP | 2010-130225 A | 6/2010 |
| JP | 2011-175780 A | 9/2011 |
| JP | 2011-248205 A | 12/2011 |
| JP | 2011-253025 A | 12/2011 |
| JP | 2012-069503 A | 4/2012 |
| JP | 2012-186118 A | 9/2012 |
| JP | 2003-01683 A | 1/2013 |
| JP | 2013-152922 A | 8/2013 |
| JP | 2014-021428 A | 2/2014 |
| JP | 2014-032750 A | 2/2014 |
| JP | 2014-035522 A | 2/2014 |
| JP | 2014-41229 A | 3/2014 |
| JP | 2014-120400 A | 6/2014 |
| JP | 2014-228783 A | 12/2014 |
| WO | 2010/044204 A1 | 4/2010 |
| WO | 2016/104257 A1 | 6/2016 |

OTHER PUBLICATIONS

Japanese Office Action received in corresponding Japanese Application No. 2018-128344 dated May 21, 2019.
Japanese Office Action received in corresponding Japanese Application No. 2018-128344 dated Feb. 4, 2020.

* cited by examiner

FIG. 8
(A)
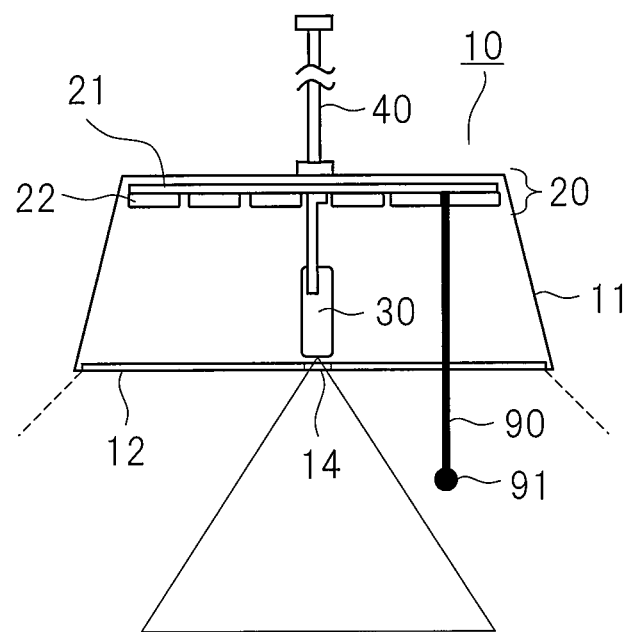
(B)
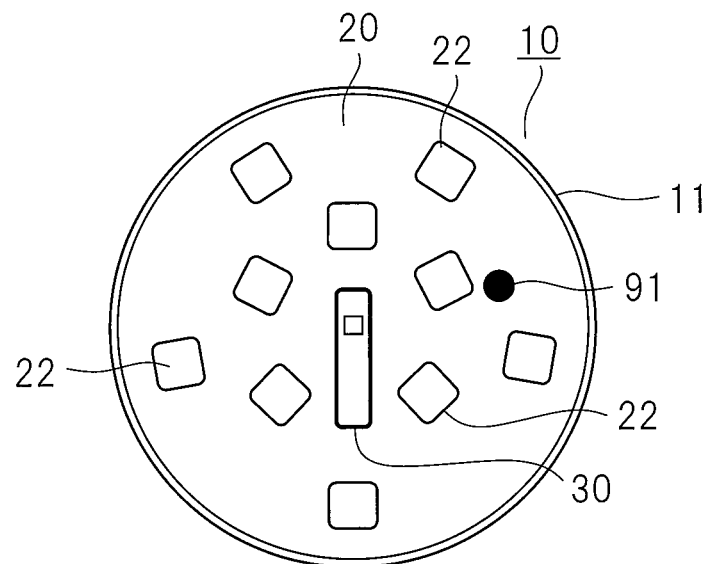

FIG. 9
(A)
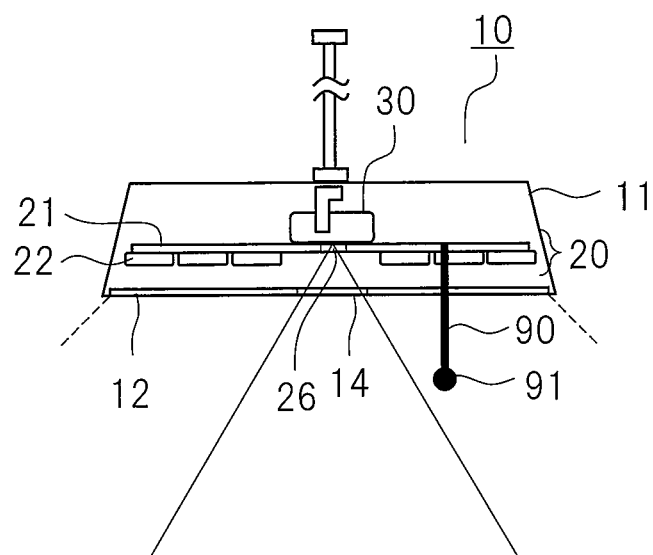
(B)
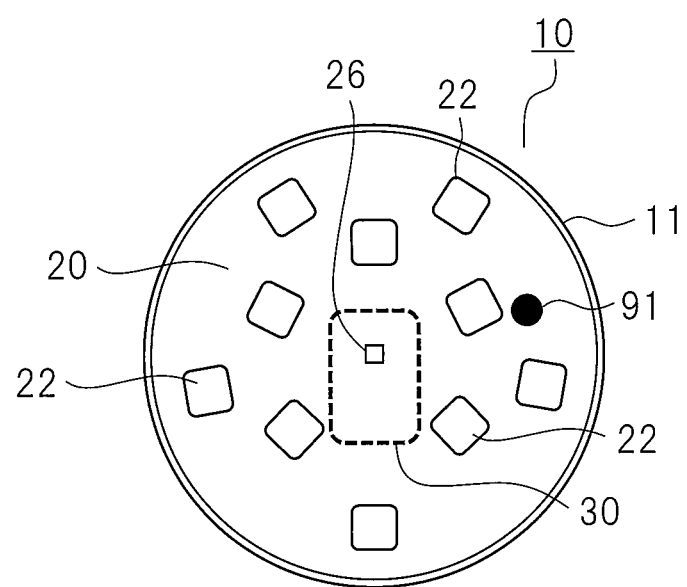

FIG. 10
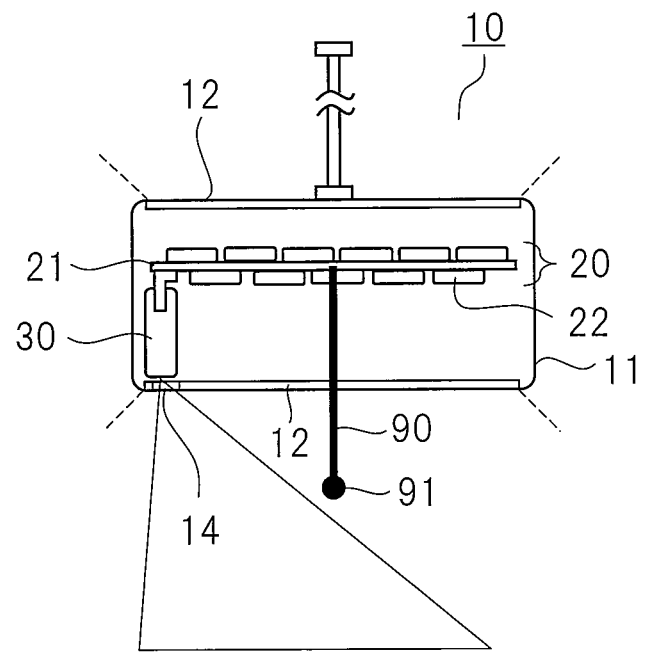
(A)
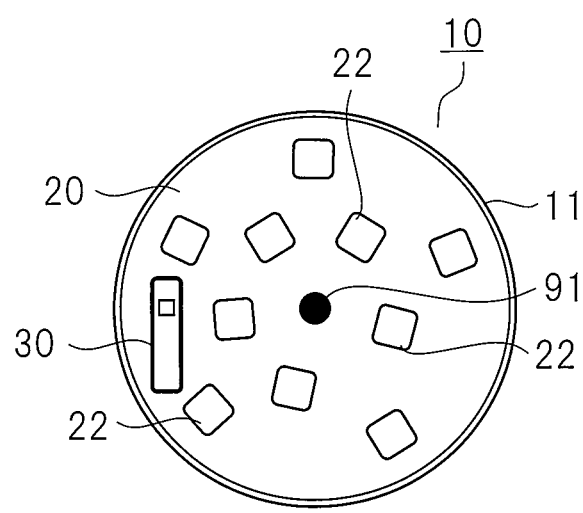
(B)

FIG. 11
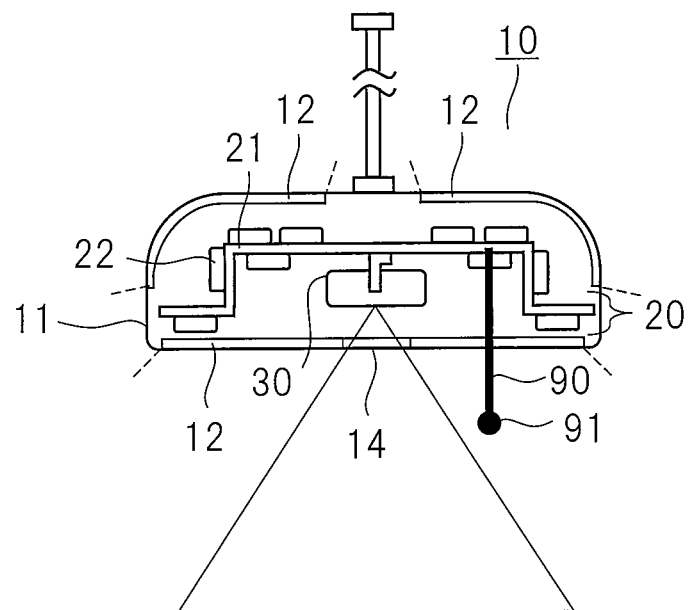
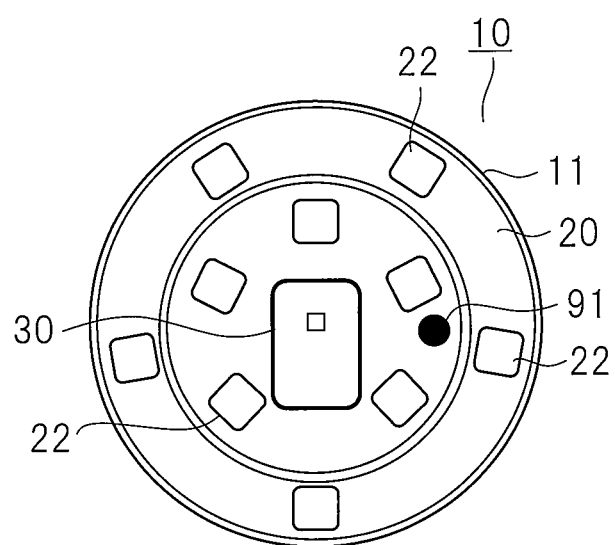

FIG. 12
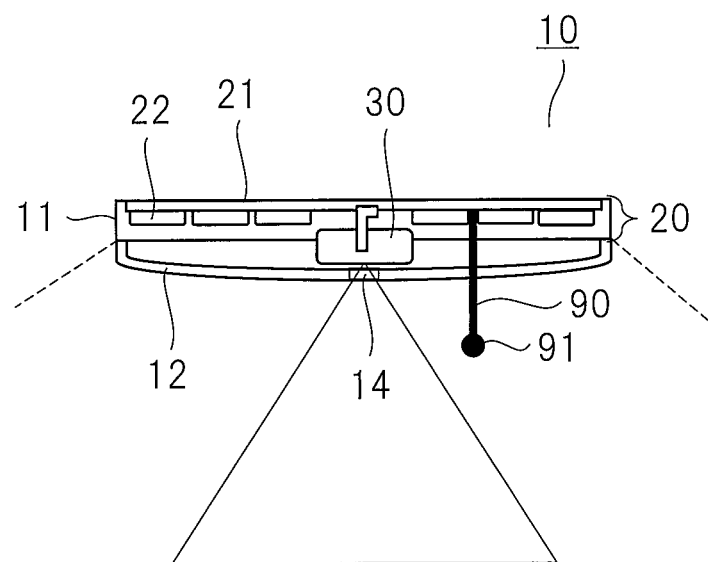
(A)
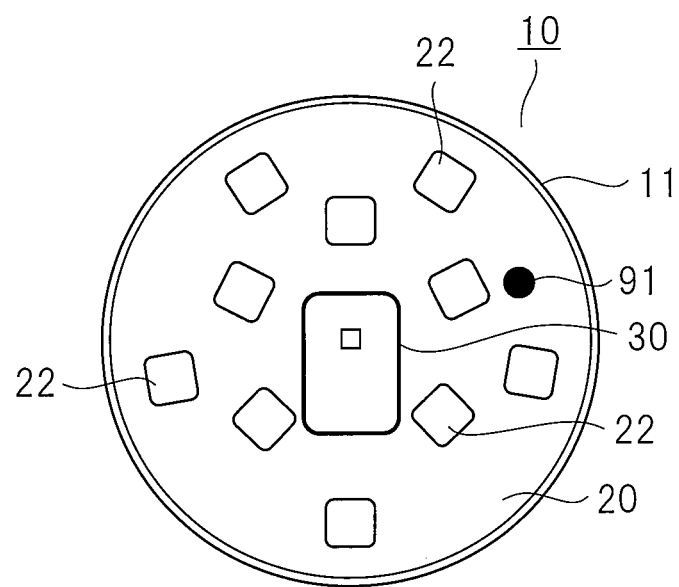
(B)

FIG. 13
(A)
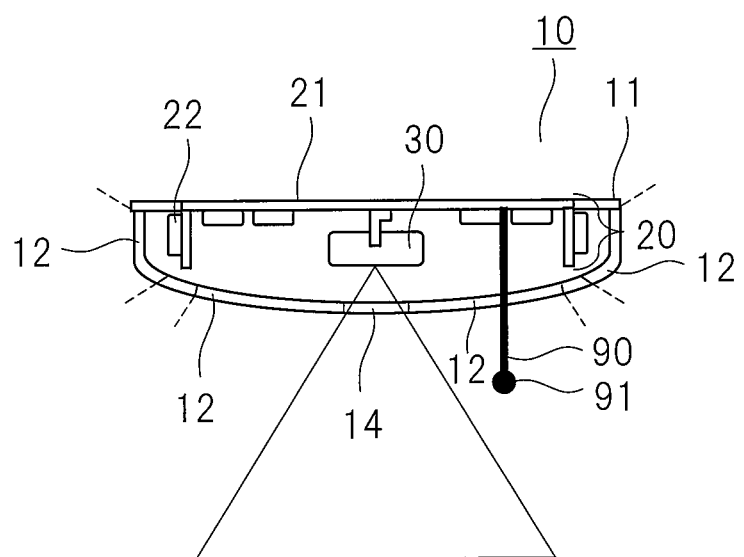
(B)
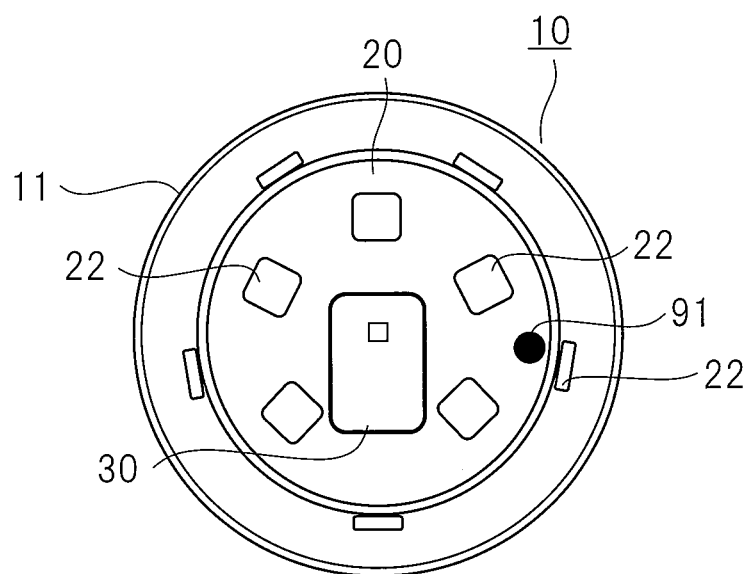

FIG. 14

ILLUMINATING UNIT   PROJECTOR (PJ) UNIT   LIGHTING CONTROL EXAMPLE

| | OPERATION HARD | CONFIGURATION AND CONTROL |
|---|---|---|
| LIGHTING CONTROL EXAMPLE 1 | OPERATION INPUT UNIT 301 or WALL-MOUNTED OPERATION INPUT UNIT or REMOTE CONTROLLER | PROVIDE ANY OR EACH OF OPERATION HARD WITH ILLUMINATING UNIT ON/OFF OPERATION BUTTON AND PJ UNIT ON/OFF OPERATION BUTTON |
| LIGHTING CONTROL EXAMPLE 2 | OPERATION INPUT UNIT 301 or WALL-MOUNTED OPERATION INPUT UNIT (TOUCH SENSOR) | PROVIDE RESPECTIVE TOUCH SENSING AREAS OF ILLUMINATING UNIT AND PJ UNIT TO TURN ON/OFF EACH OF THEM |
| LIGHTING CONTROL EXAMPLE 3 | OPERATION INPUT UNIT 301 or WALL-MOUNTED OPERATION INPUT UNIT (TOUCH SENSOR) | SHARE TOUCH SENSING AREAS OF ILLUMINATING UNIT AND PJ UNIT TO CHANGE ON/OFF OF THEM BY TOGGLE-SWITCHING OPERATION INCLUDING ON/OFF OF ILLUMINATING UNIT AND ON/OFF OF PJ UNIT |
| LIGHTING CONTROL EXAMPLE 4 | OPERATION INPUT UNIT 301 or WALL-MOUNTED OPERATION INPUT UNIT (ROTARY SWITCH) | CHANGING OPERATION INCLUDING ON/OFF OF ILLUMINATING UNIT AND ON/OFF OF PJ UNIT BY ROTARY SWITCH |
| LIGHTING CONTROL EXAMPLE 5 | OPERATION INPUT UNIT 301 (DRAWSTRING TOGGLE SWITCH) | TOGGLE-SWITCHING OPERATION INCLUDING ON/OFF OF ILLUMINATING UNIT AND ON/OFF OF PJ UNIT BY DRAWSTRING TOGGLE SWITH |
| LIGHTING CONTROL EXAMPLE 6 | WALL-MOUNTED OPERATION INPUT UNIT HAVING SINGLE ON/OFF OPERATION UNIT, REMOTE CONTROLLER TURNS ON/OFF EACH OF ILLUMINATING/PJ UNITS | TURN ON ONLY ILLUMINATING UNIT BY ON OPERATION FROM WALL-MOUNTED OPERATION INPUT UNIT → MAKE POSSIBLE PJ ON/OFF OPERATION AND ILLUMINATING ON/OFF OPERATION FROM REMOTE CONTROLLER → TURN OFF ILLUMINATING AND PJ UNITS BY OFF OPERATION FROM WALL-MOUNTED OPERATION INPUT UNIT |

FIG. 15

ILLUMINATING UNIT PROJECTOR (PJ) UNIT LIGHTING STATE EXAMPLES

| | ILLUMINATING UNIT | PJ UNIT | MODIFICATION MODE ETC. |
|---|---|---|---|
| LIGHTING STATE 1 | OFF | OFF | |
| LIGHTING STATE 2 | ON | OFF | MODIFICATION MODES AS FOLLOWS ARE CONSIDERED AS LIGHTING STATE OF ILLUMINATING UNIT: (1) SAME AS LIGHTING STATE 2; BESIDES IT, (2) SMALLER IN LIGHT AMOUNT THAN LIGHTING STATE 2; (3) SMALLER IN NUMBER OF LIGHTING LIGHT-EMITTING ELEMENTS THAN LIGHTING STATE 2; (4) CHANGE TO LIGHT DISTRIBUTION CHARACTERISTICS DIFFERENT FROM LIGHTING STATE 2; AND ETC. FURTHER, IN MODIFICATION MODES (2), (3), AND (4), PLURAL LIGHTING STATES MAY BE DIFFERENT IN LIGHT AMOUNT, NUMBER OF LIGHTING LIGHT-EMITTING ELEMENTS, AND LIGHT DISTRIBUTION CHARACTERISTICS. ALSO, ILLUMINATING UNIT MAY HAVE NO LIGHTING STATE 3. |
| LIGHTING STATE 3 | ON | ON | |
| LIGHTING STATE 4 | OFF | ON | |

FIG. 16
CHANGED EXAMPLES BY TOGGLE-SWITCHING OPERATION
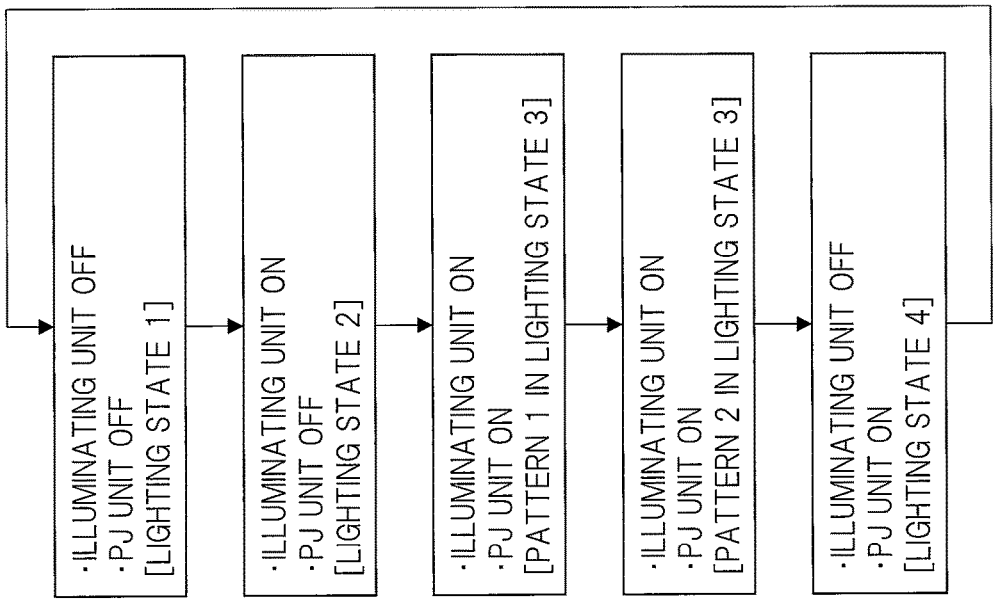
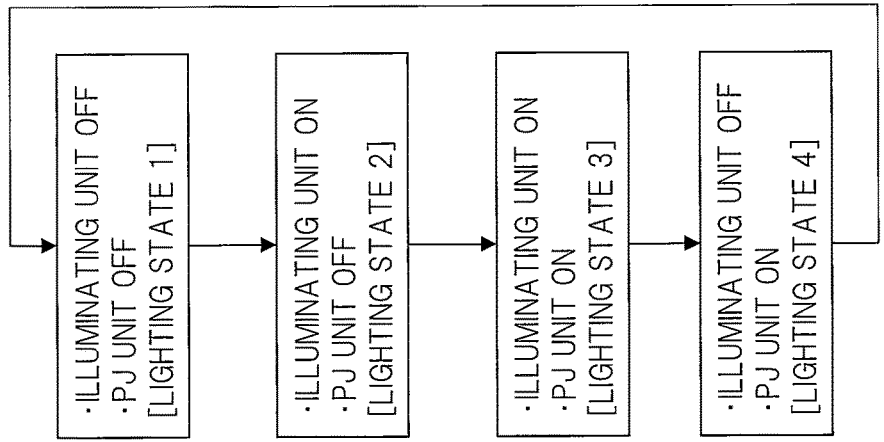
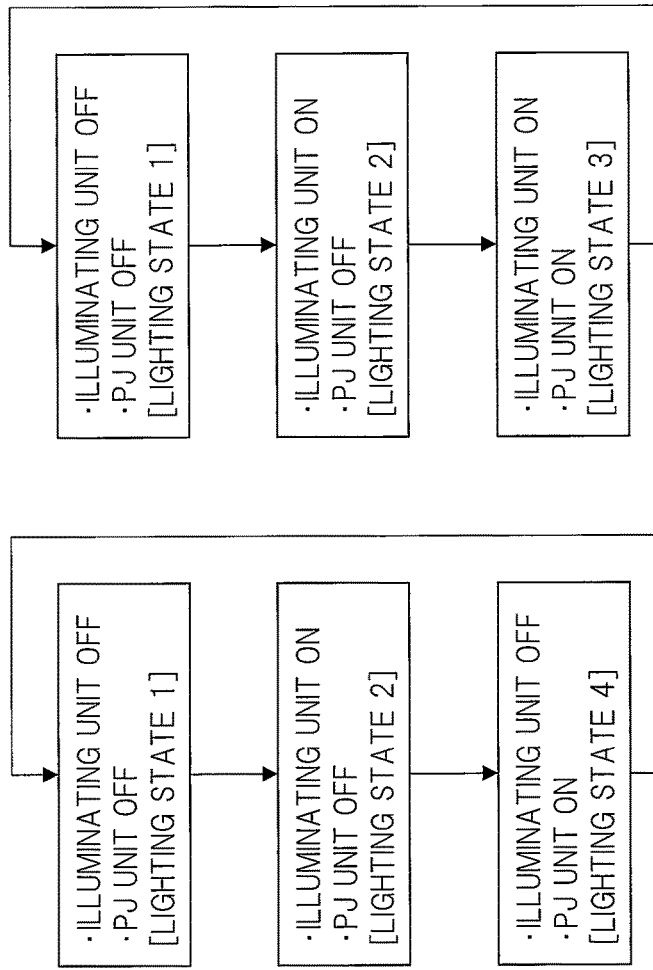

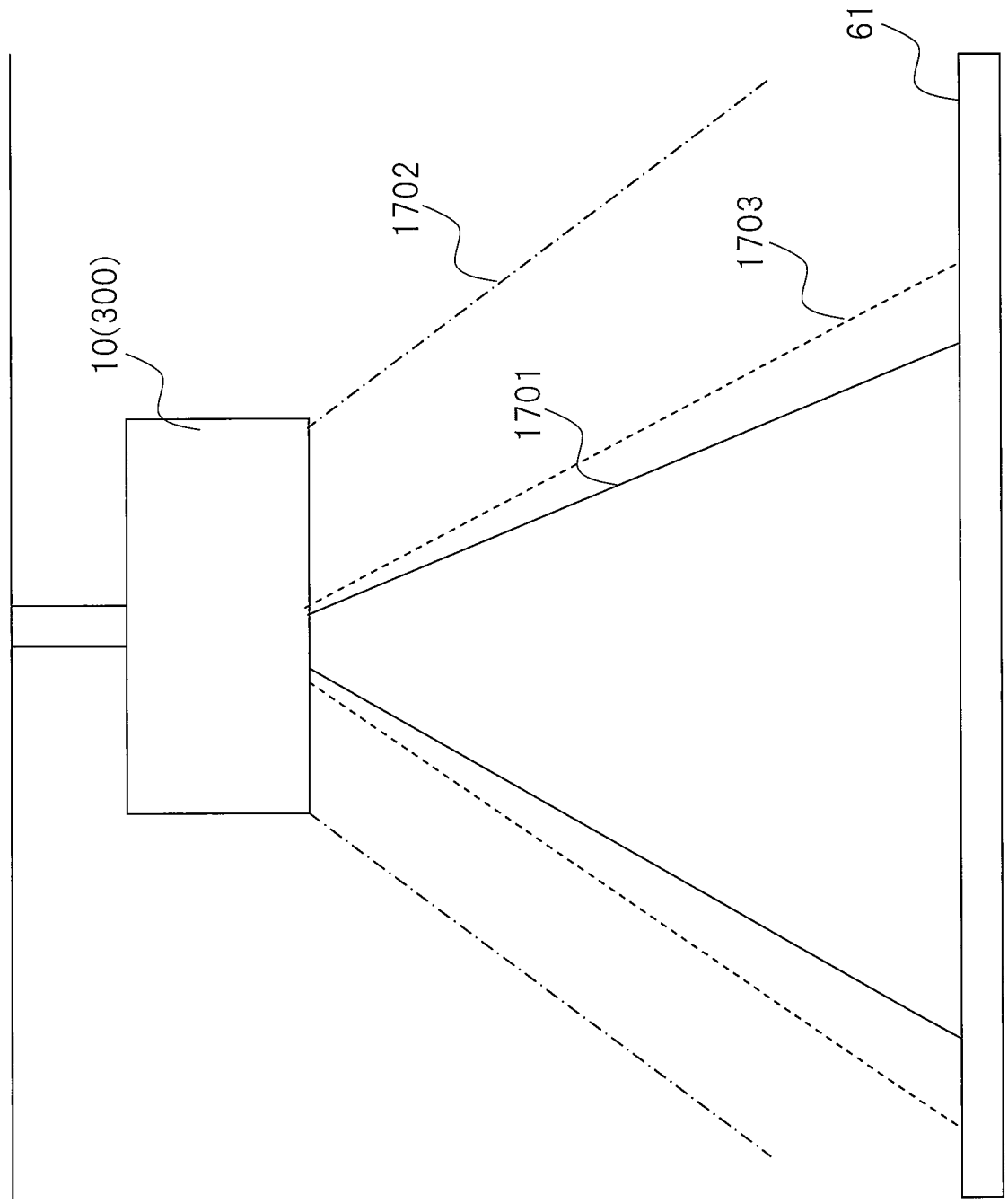

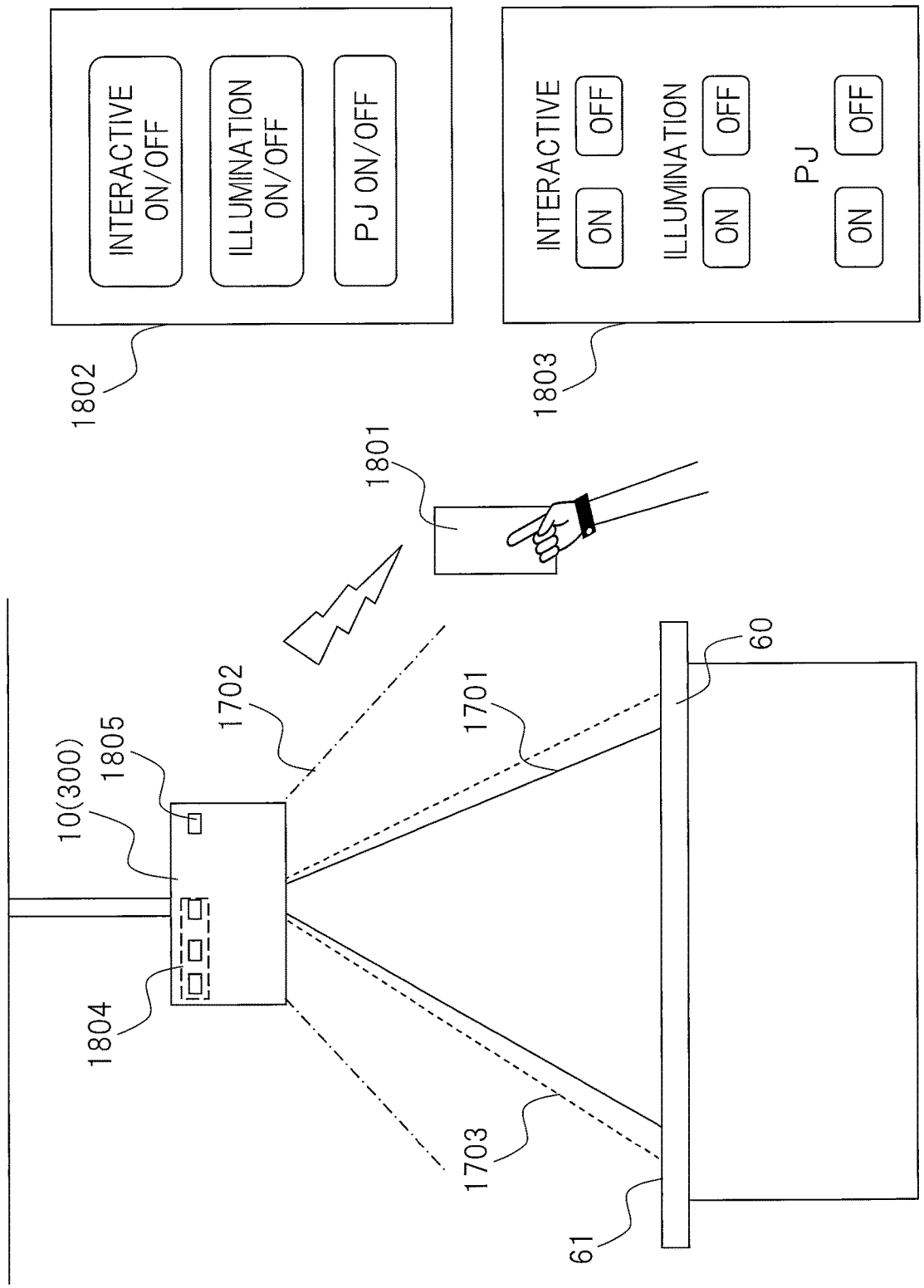

FIG. 18B

| | INTERACTIVE FUNCTION | ILLUMINATING UNIT | PJ UNIT |
|---|---|---|---|
| INTERACTIVE BUTTON A ON PROCESS | SENSING LIGHT ON OPERATION DETECTION START | STATE CONTINUITY | STATE CONTINUITY |
| INTERACTIVE BUTTON A OFF PROCESS | SENSING LIGHT OFF OPERATION DETECTION FINISH | STATE CONTINUITY | STATE CONTINUITY |
| ILLUMINATING UNIT BUTTON B ON PROCESS | STATE CONTINUITY | ILLUMINATION LIGHT ON | (1) STATE CONTINUITY OR (2) IMAGE PROJECTION OFF |
| ILLUMINATING UNIT BUTTON B OFF PROCESS | STATE CONTINUITY | ILLUMINATION LIGHT OFF | STATE CONTINUITY |
| PJ UNIT BUTTON C ON PROCESS | (1) STATE CONTINUITY OR (2) SENSING LIGHT ON OPERATION DETECTION START | STATE CONTINUITY | IMAGE PROJECTION ON |
| PJ UNIT BUTTON C OFF PROCESS | (1) STATE CONTINUITY OR (2) SENSING LIGHT OFF OPERATION DETECTION FINISH | STATE CONTINUITY | IMAGE PROJECTION OFF |

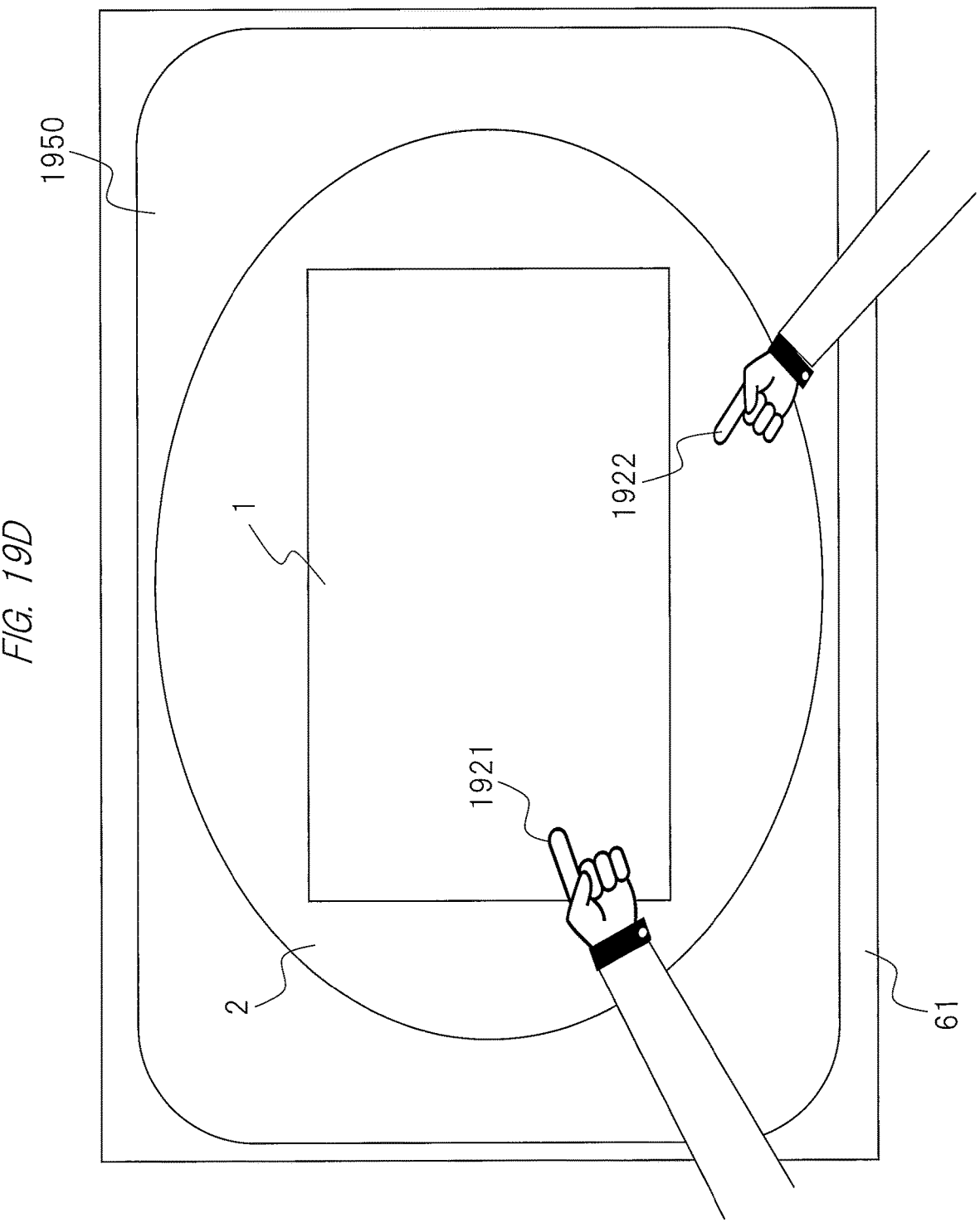

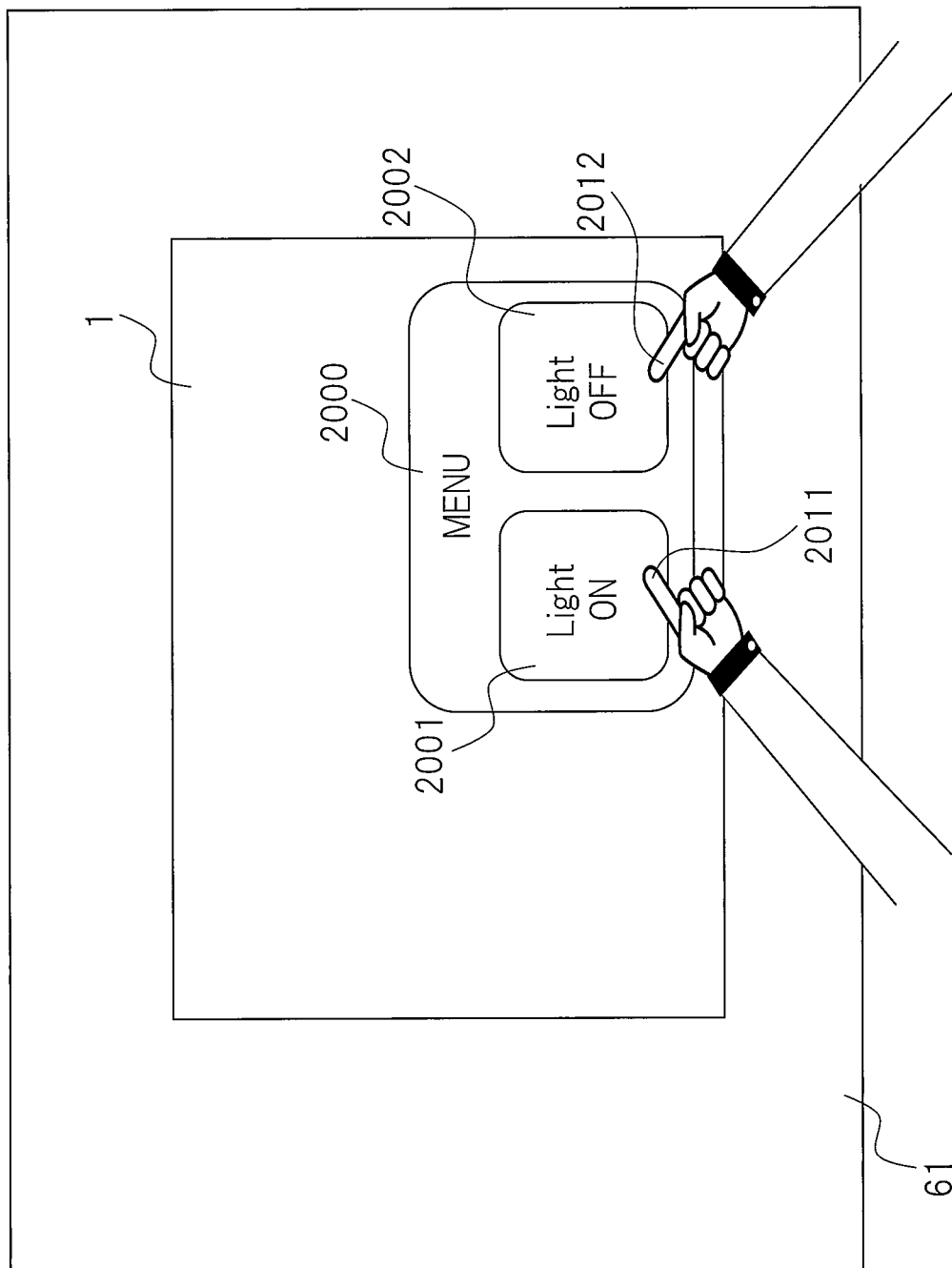

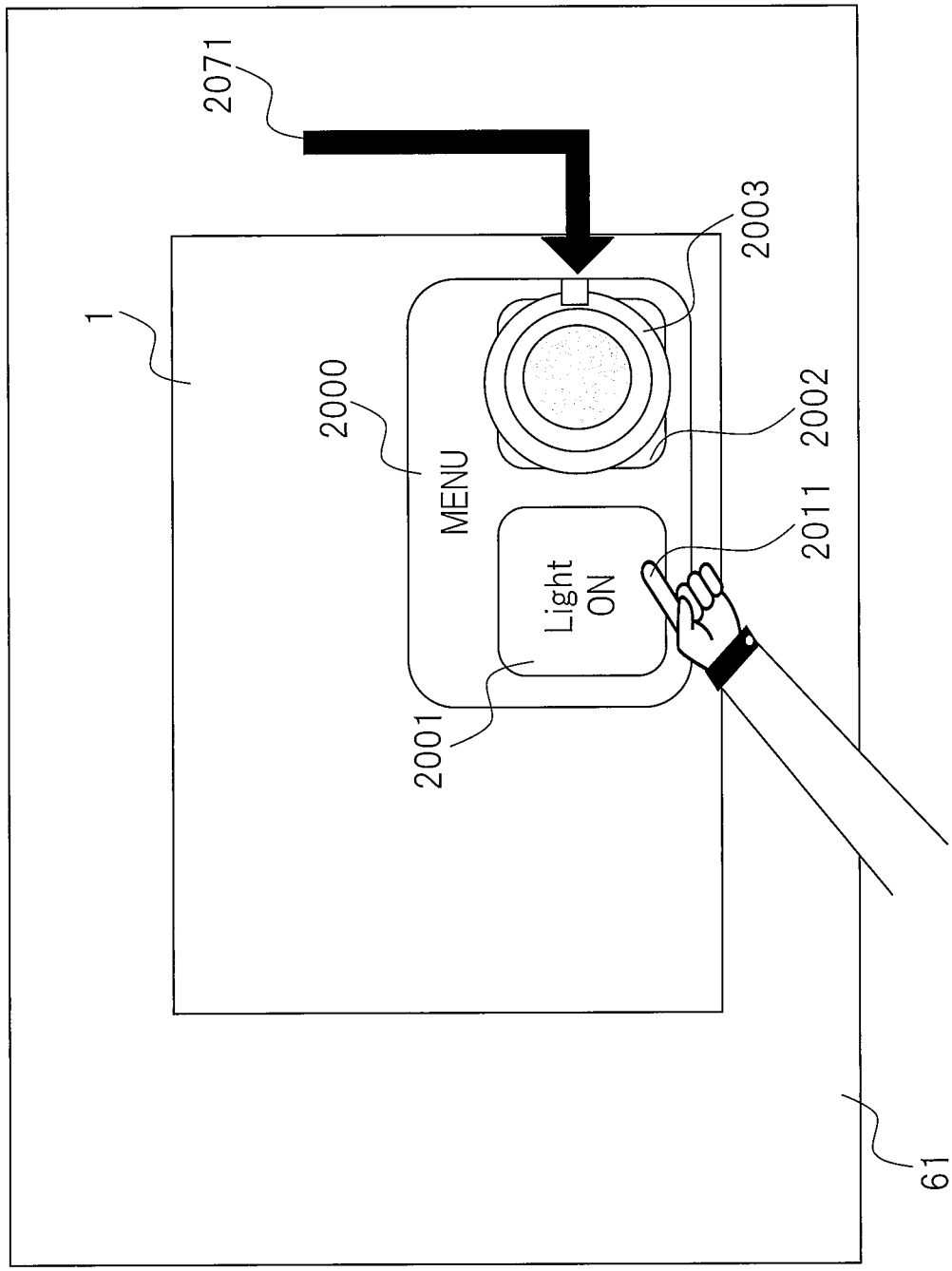

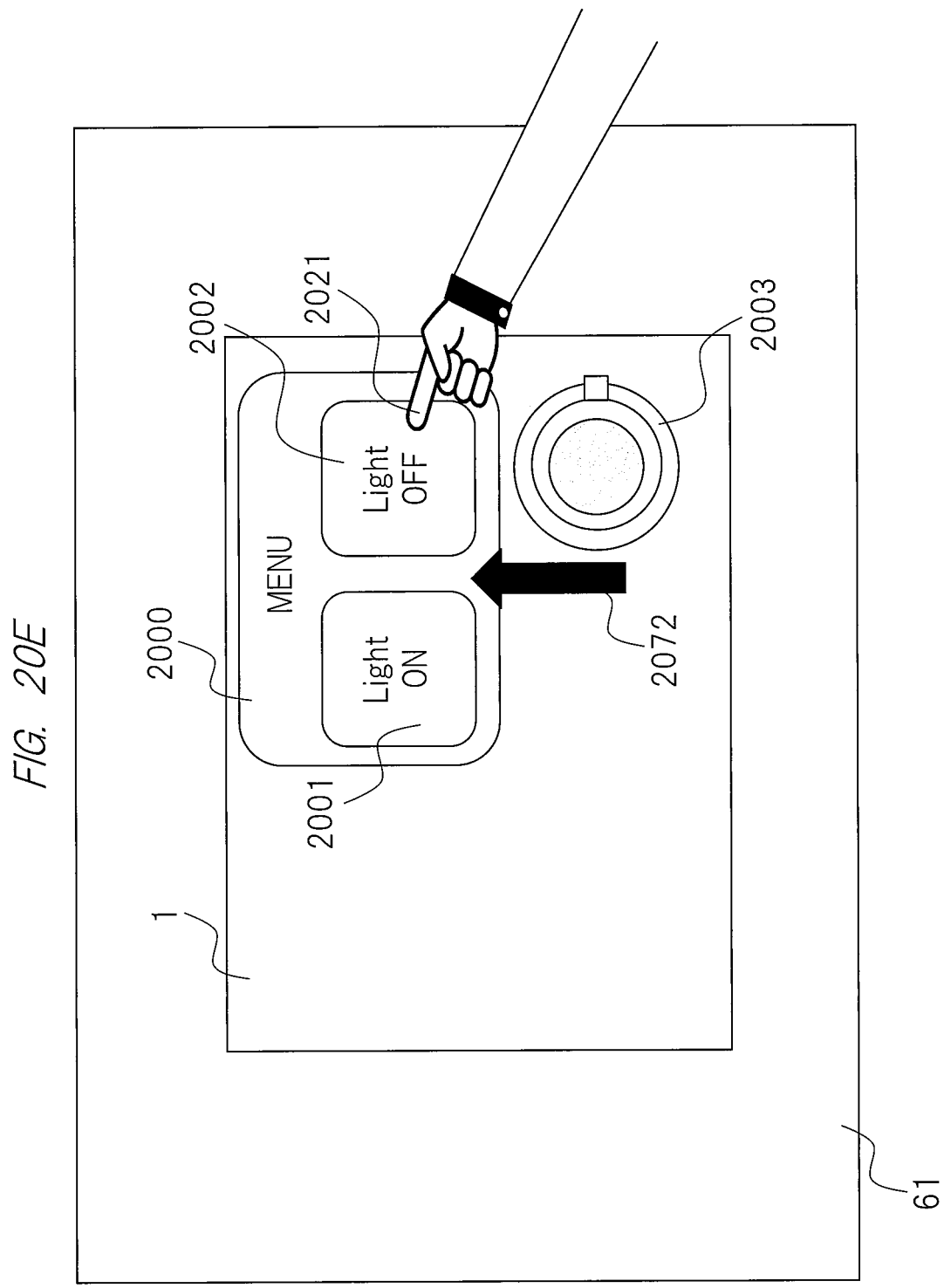

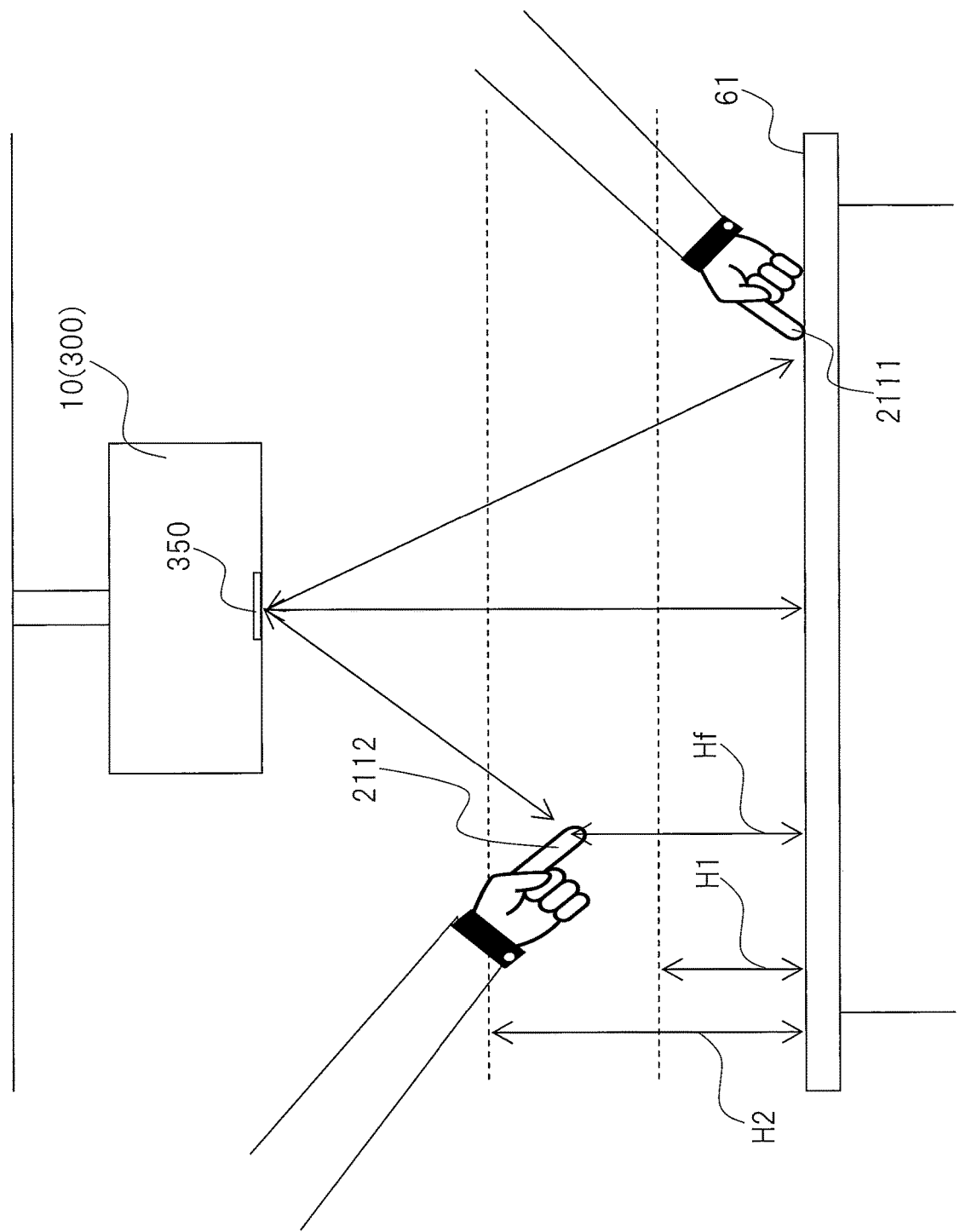

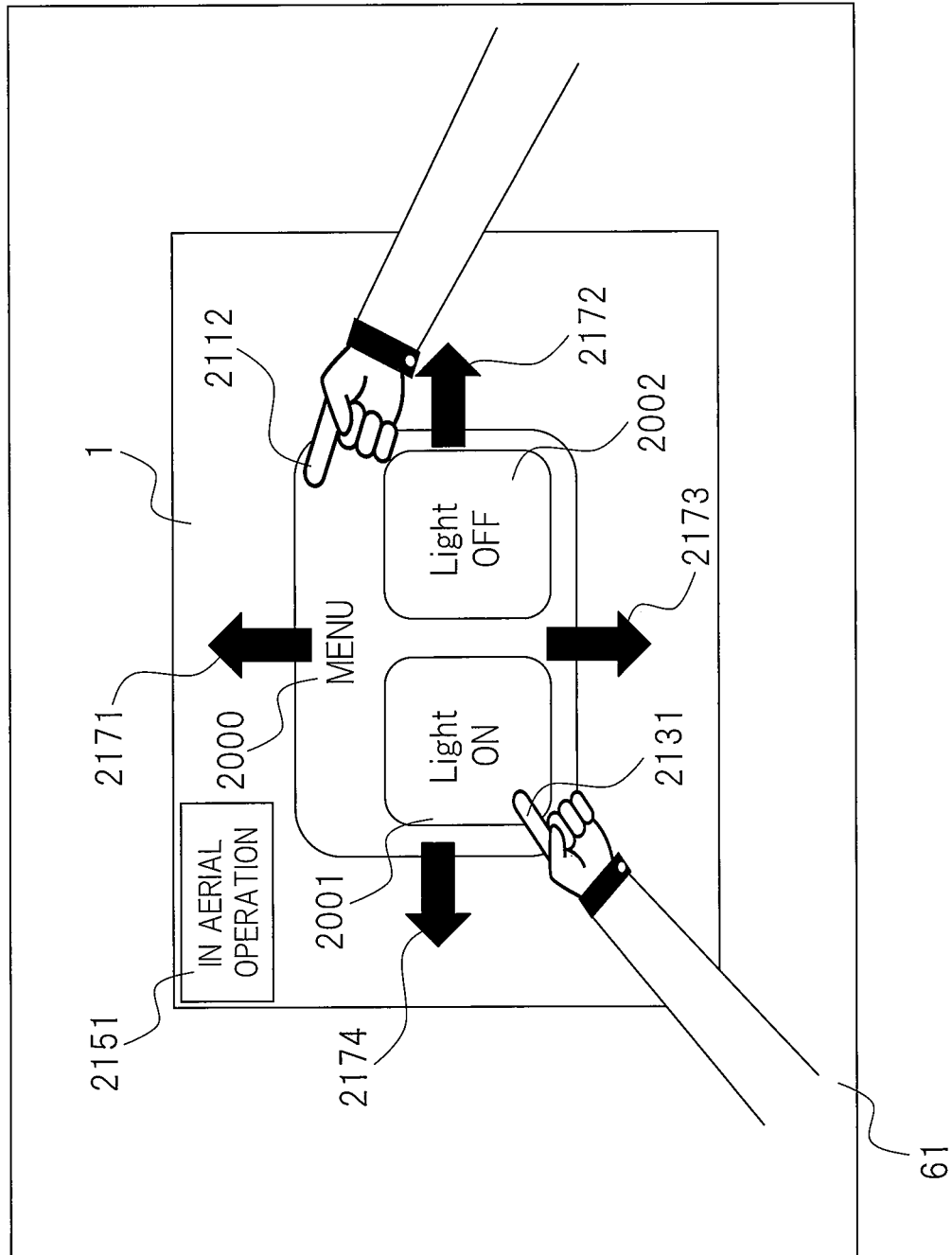

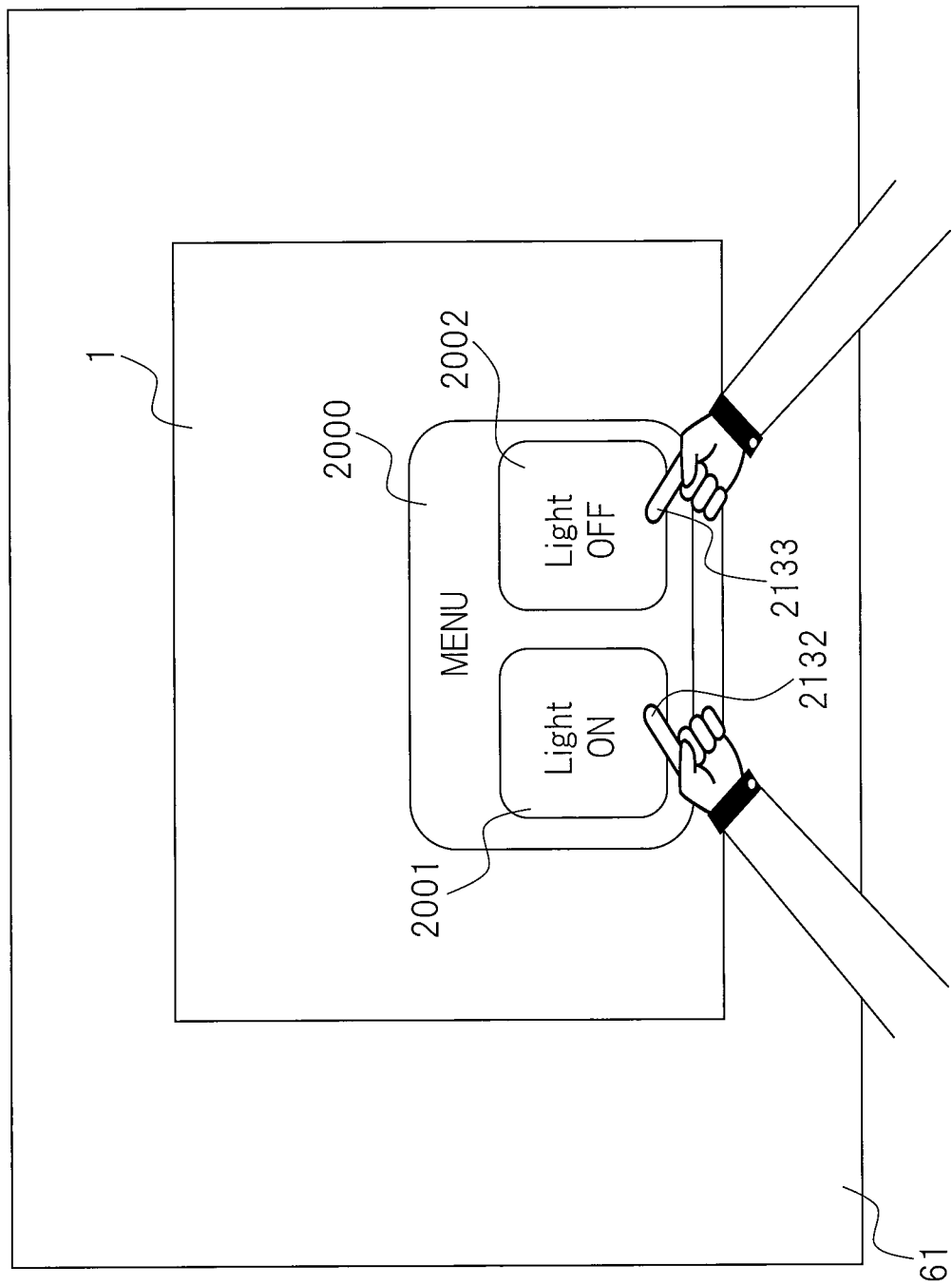

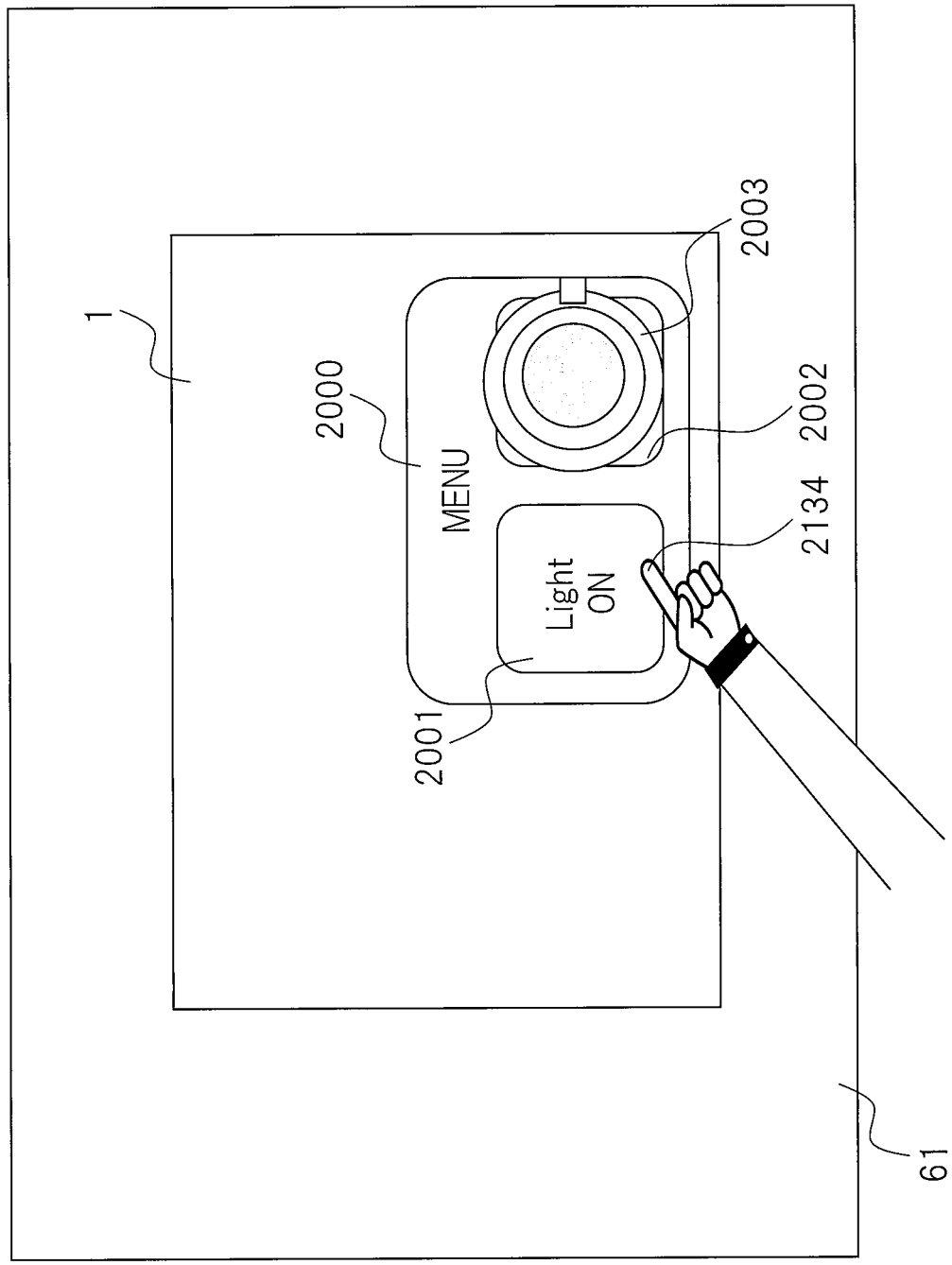

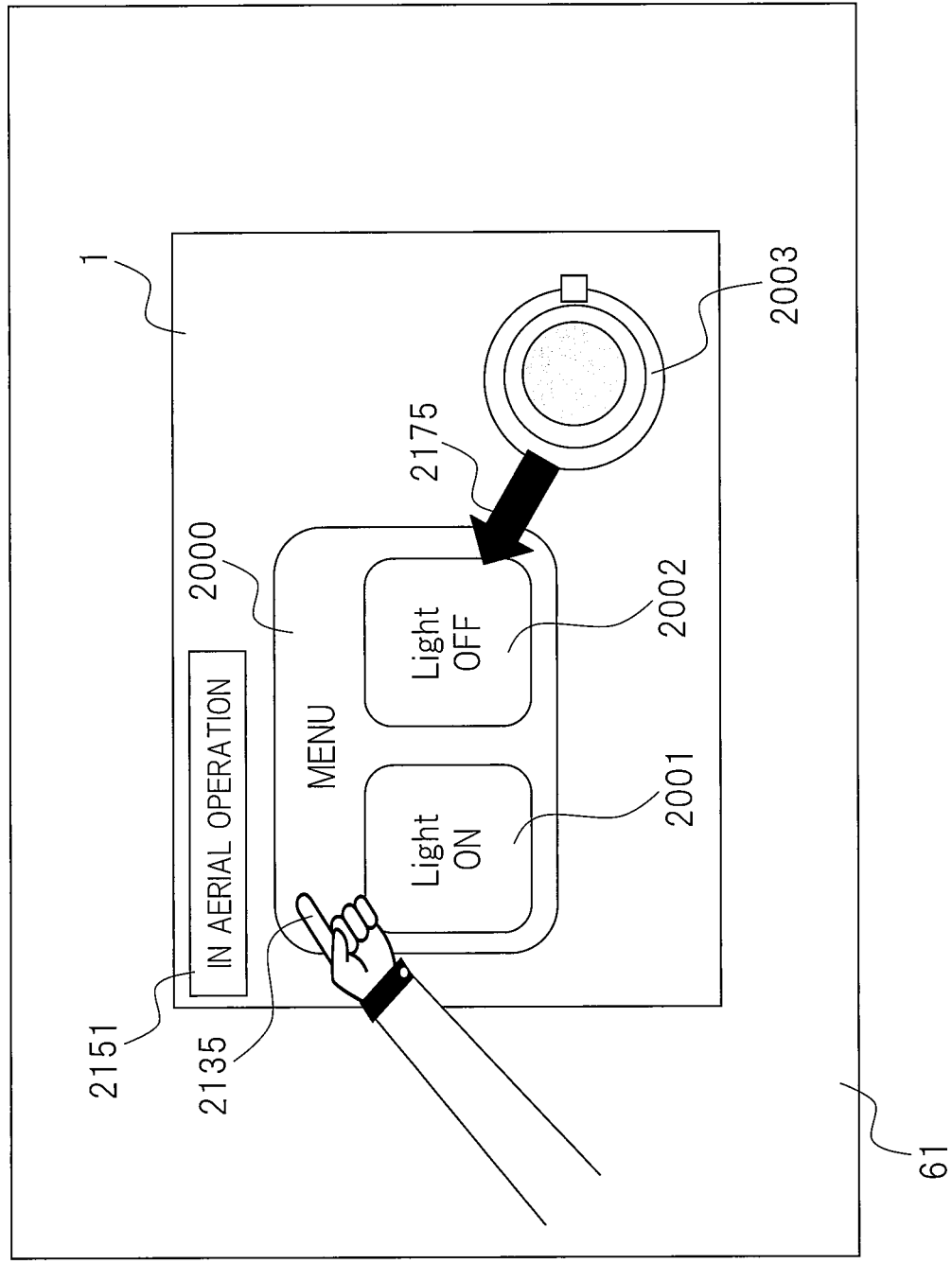

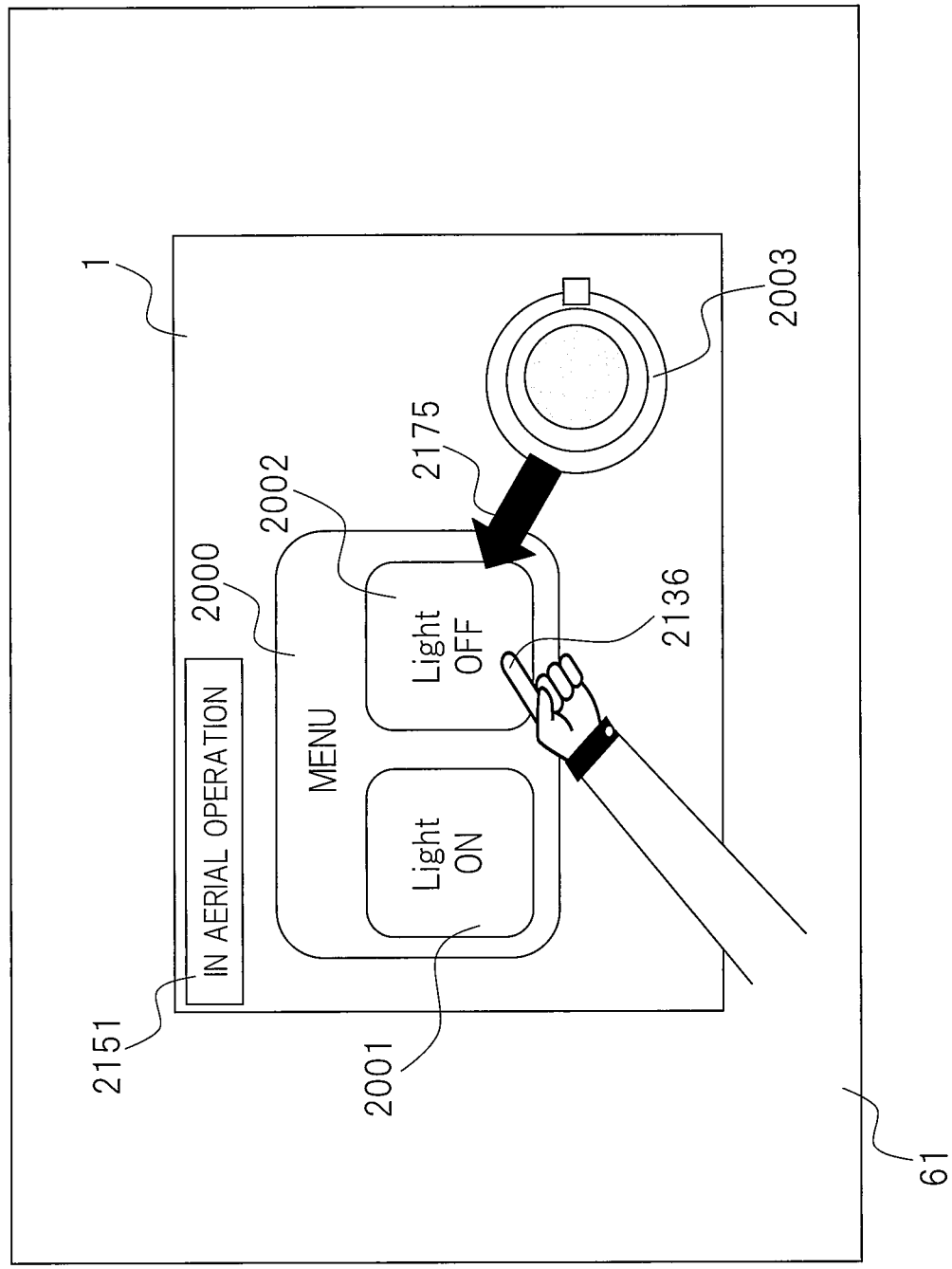

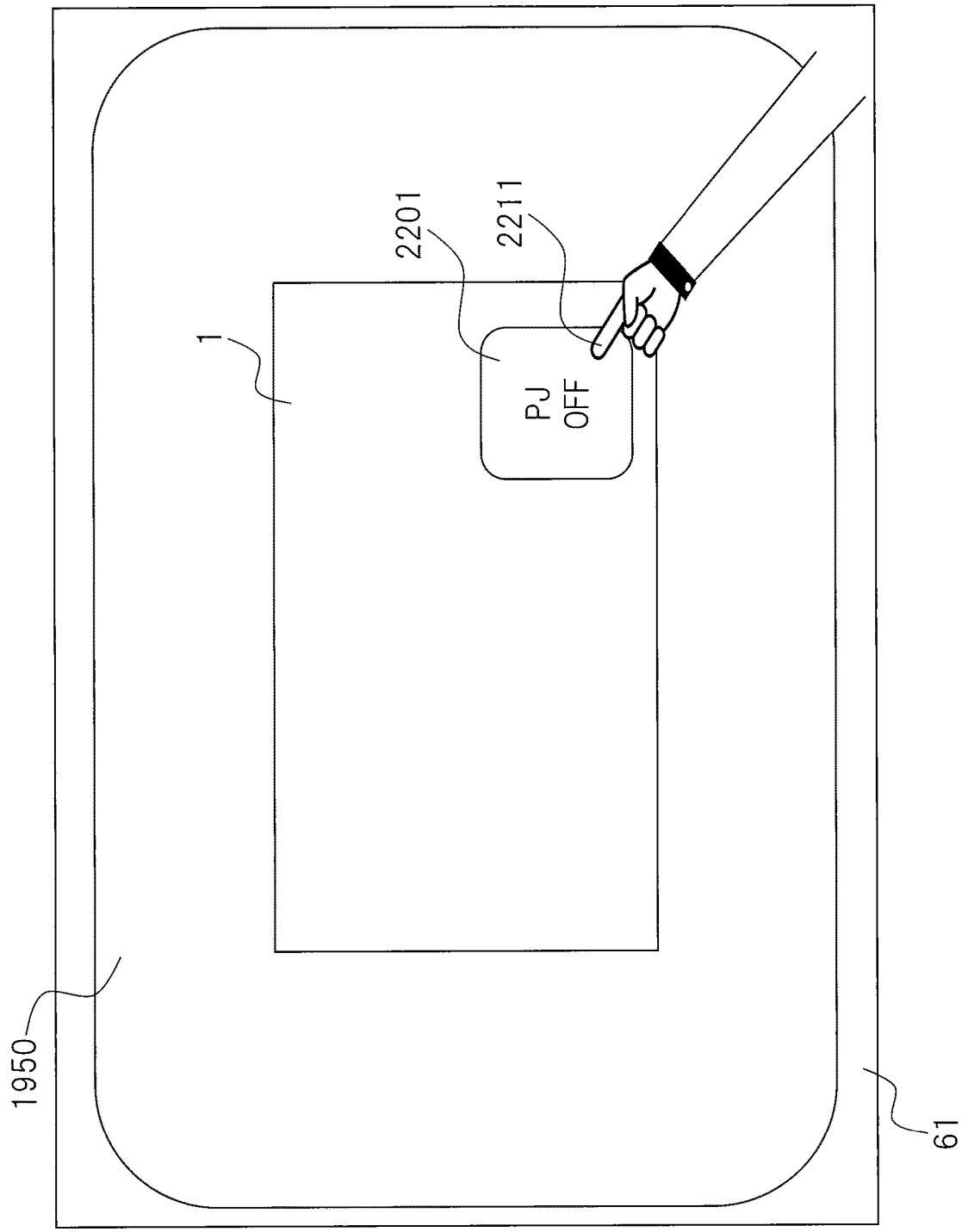

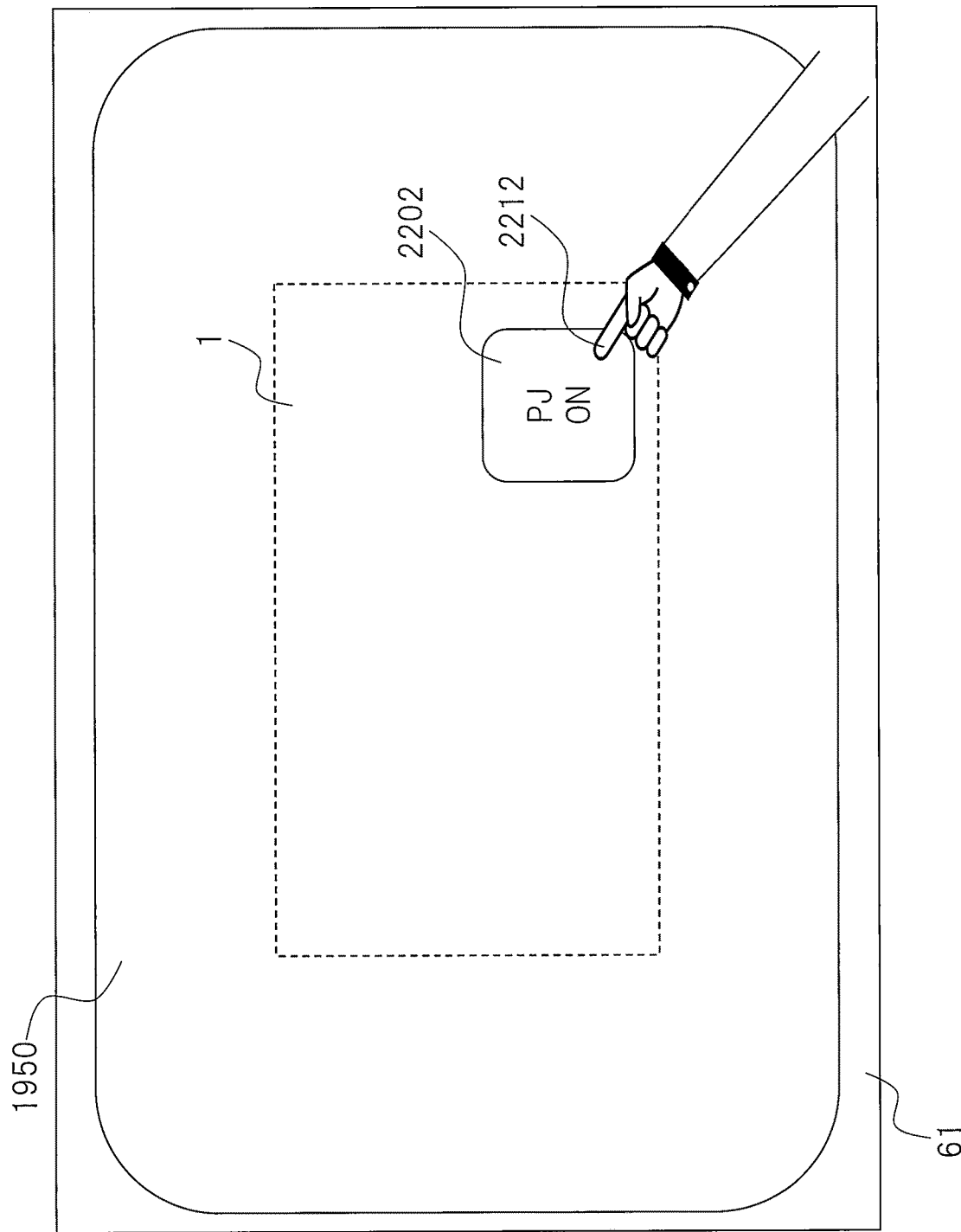

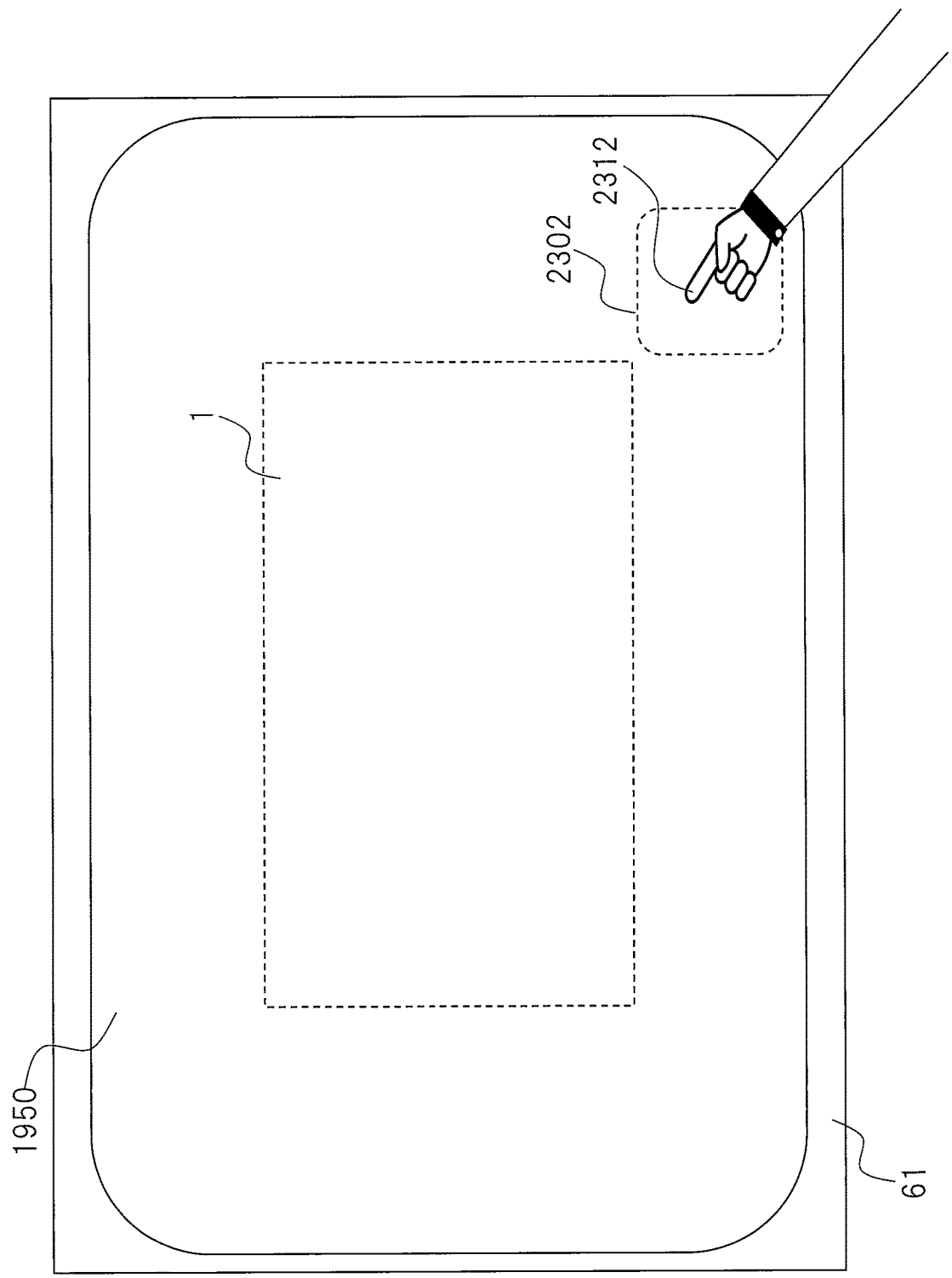

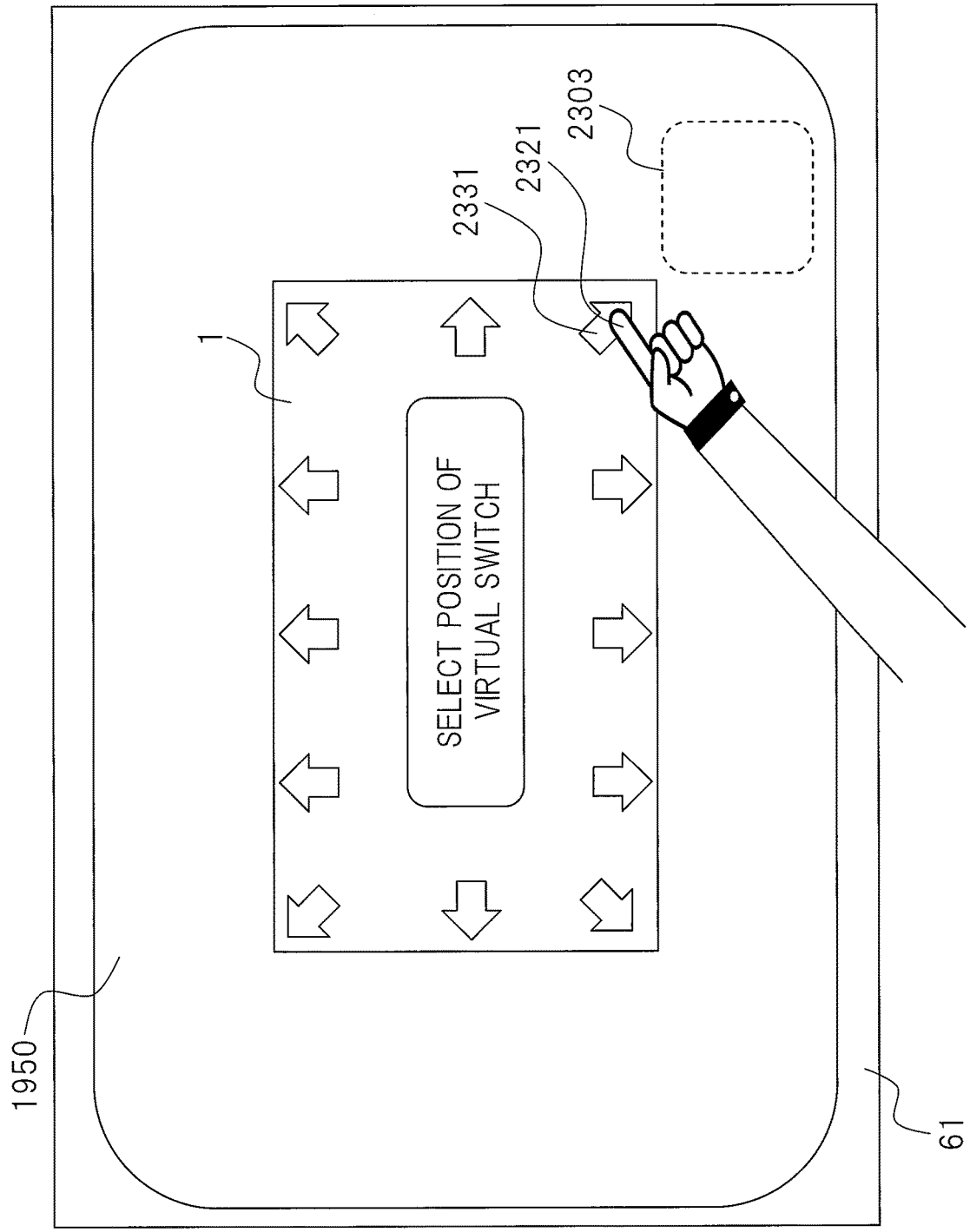

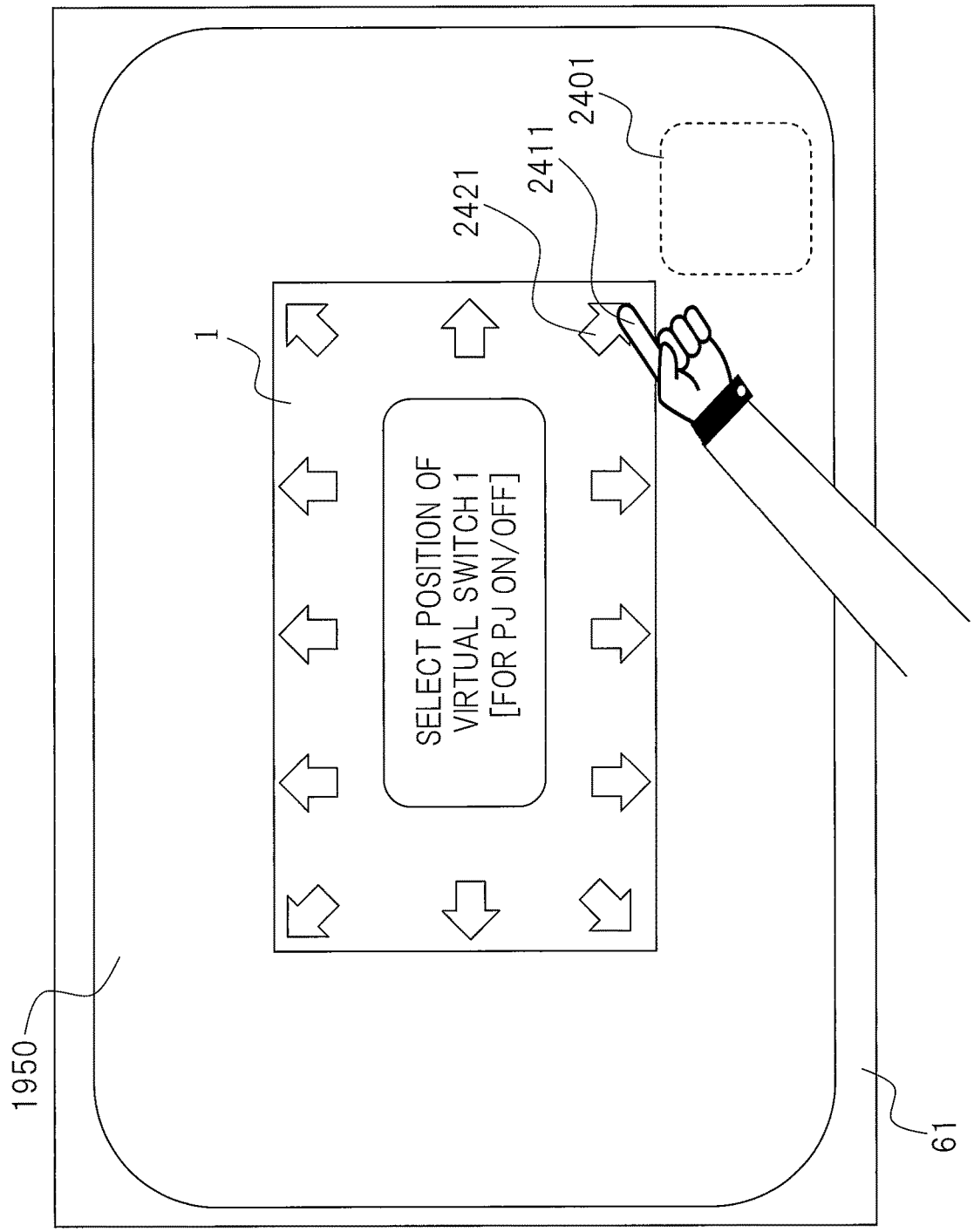

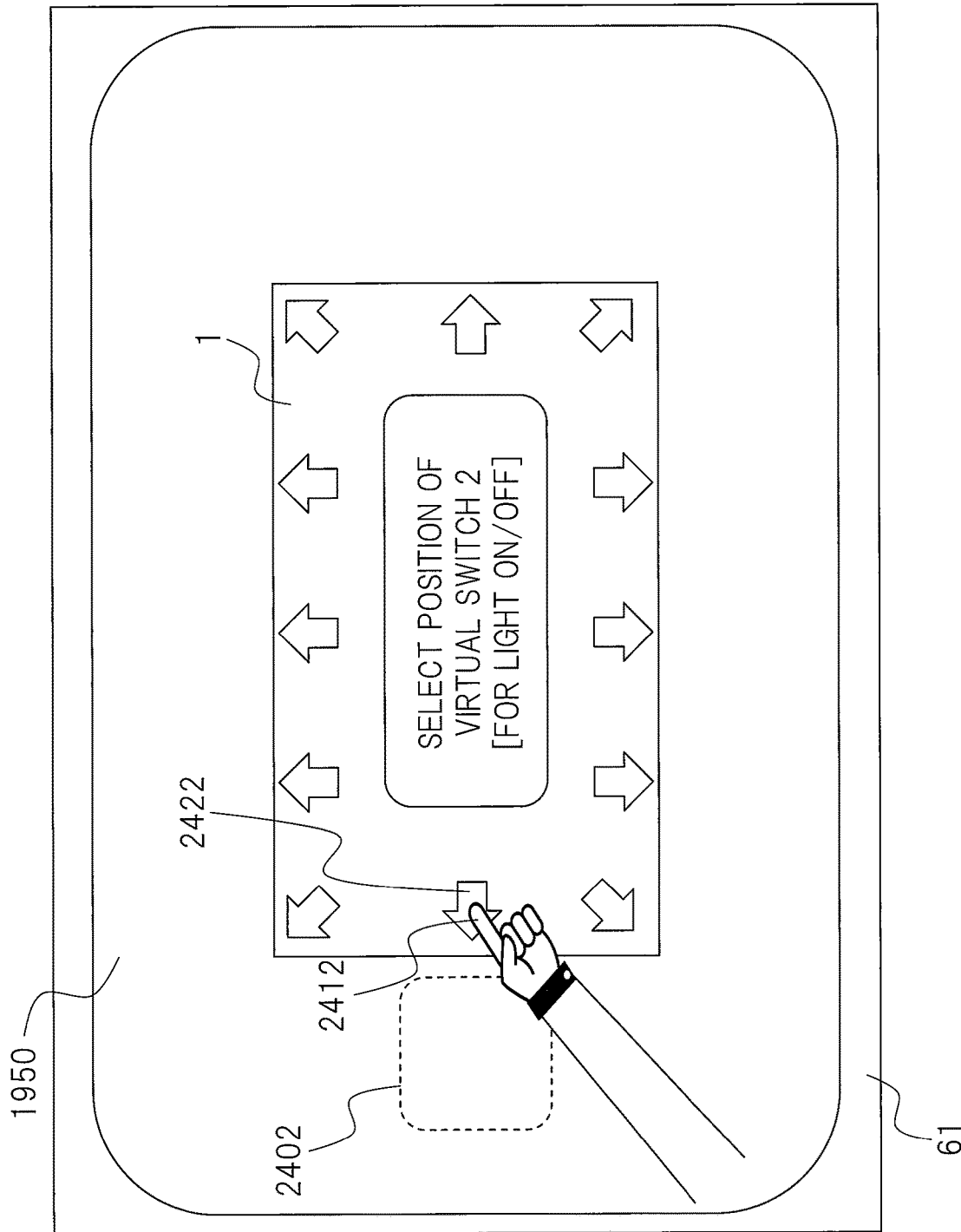

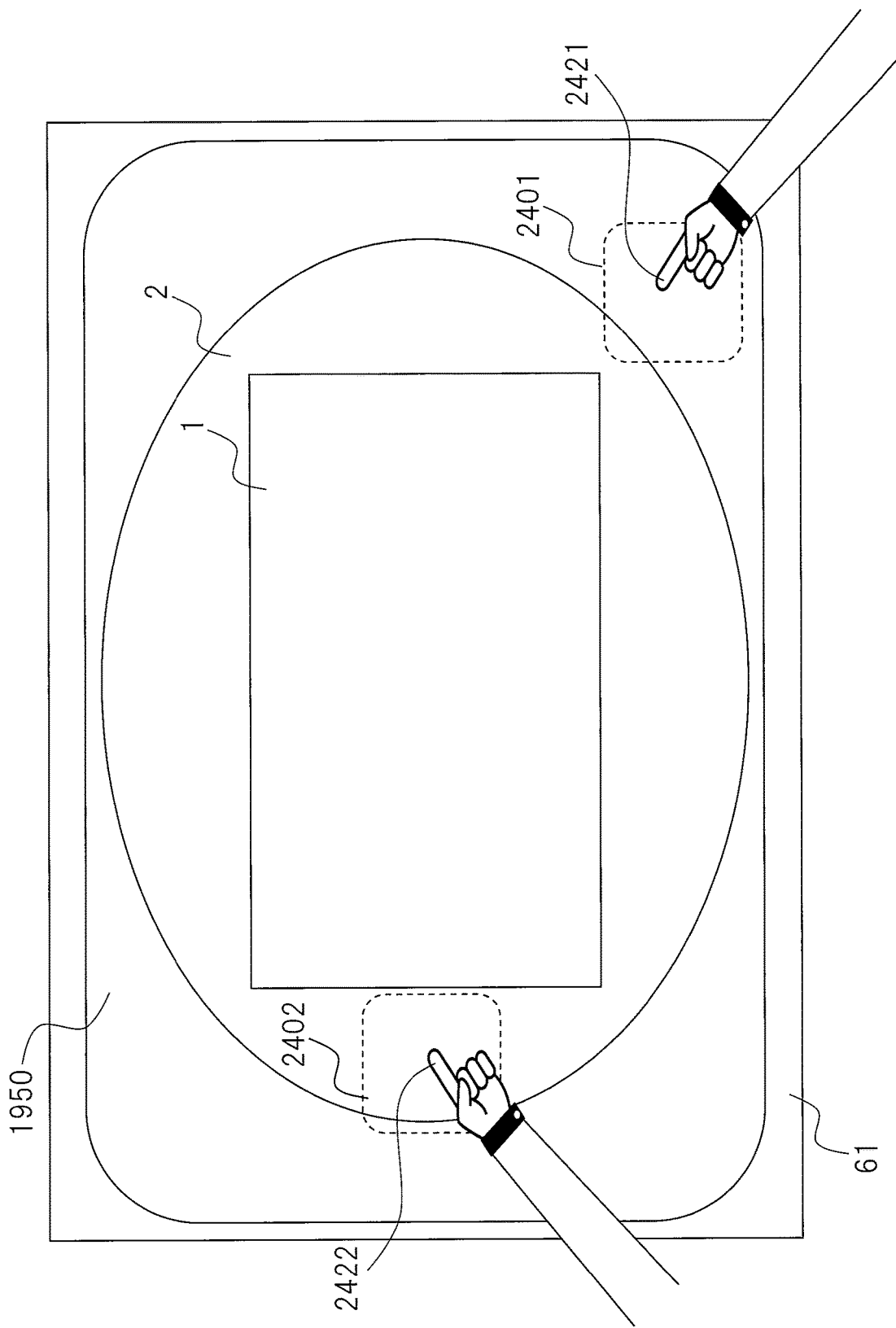

LIGHTING APPARATUS

TECHNICAL FIELD

The present invention relates to a lighting apparatus.

BACKGROUND ART

A technique of attaching a communication function module to a ceiling light, the communication function module being mounted on a ceiling or a wall surface and allowing use of the module's various functions, is disclosed in Patent Document 1 as described below.

RELATED ART DOCUMENTS

Patent Documents

Patent document 1: Japanese Patent Application Laid-open No. 2003-16831

SUMMARY OF THE INVENTION

Problems to be Solved by the Invention

Patent document 1, however, does not disclose any technique concerning control of lighting of a projector and light emission from an illumination light source. Patent document 1, therefore, does not disclose any technique concerning control of: image projection by the projector, which serves as an image-projecting function in a lighting apparatus having an image-projecting function; and light emission from an illumination light source which is incorporated in the lighting apparatus having the image-projecting function. Patent Document 1 merely discloses a block diagram and simple outline of the projector and does not disclose a layout of an optical system and optical element making up the projector in the lighting apparatus or a layout of an optical unit in which arrangement of the optical system and optical element is taken into consideration. Thus, with regard to control of: image projection by the projector which serves as the image-projecting function in the lighting apparatus having the image-projecting function; and light emission from the illumination light source, which is incorporated in the lighting apparatus having the image-projecting function, Patent Document 1 does not disclose any layout of the optical system and optical element making up the projector in the lighting apparatus or any control in which the arrangement of the optical system and optical element is taken into consideration.

Patent document 1 dose not disclose a so-called interactive function for carrying out a gesture operation etc. as an operation of the lighting apparatus with the image-projecting function.

In the conventional technique, thus, there is insufficient consideration to user's convenience about control of lighting of the light source, or about an interactive function by the lighting apparatus with the image-projecting function.

The present invention has been achieved in view of the above problems with the conventional technique, and it is therefore an object of the invention to provide a lighting apparatus with an image-projecting function that is further convenient for a user.

Means for Solving the Problems

As an aspect of one embodiment for achieving the above object, a lighting apparatus includes: an illuminating unit that emits illumination light; a projection-type image display unit that emits image-projecting light for projecting an image; and a sensor that emits operation-detecting light for operation detection, and is capable of detecting an operation by an operation object in a range including an image projection area of the projection-type image display unit. The illumination light, the image-projecting light, and the operation-detecting light have respective different wavelength distribution characteristics. A light amount in the wavelength range of light used by the sensor for the operation detection is determined so that the light amount of the operation-detecting light may be structurally the largest among those of the illumination light, the image-projecting light, and the operation-detecting light.

Effects of the Invention

The present invention described above provides a lighting apparatus with an image-projecting function that is further convenient for the user.

BRIEF DESCRIPTIONS OF THE DRAWINGS

FIG. 8 is a side view and a bottom view for explaining an example of layout (arrangement) of the optical unit and an illumination light source in a casing of the lighting apparatus according to the present invention;

FIG. 9 is a side view and a bottom view for explaining an example of layout (arrangement) of the optical unit and the illumination light source in the casing of the lighting apparatus according to the present invention;

FIG. 10 is a side view and a bottom view for explaining an example of layout (arrangement) of the optical unit and the illumination light source in the casing of the lighting apparatus according to the present invention;

FIG. 11 is a side view and a bottom view for explaining an example of layout (arrangement) of the optical unit and the illumination light source in the casing of the lighting apparatus according to the present invention;

FIG. 12 is a side view and a bottom view for explaining an example of layout (arrangement) of the optical unit and the illumination light source in the casing of the lighting apparatus according to the present invention;

FIG. 13 is a side view and a bottom view for explaining an example of layout (arrangement) of the optical unit and the illumination light source in the casing of the lighting apparatus according to the present invention;

FIG. 14 is a drawing for explaining examples of control of lighting of a projector unit and an illuminating unit in the lighting apparatus according to the present invention;

FIG. 15 is a drawing for explaining examples of image projection by the projector unit and lighting states of the illumination light source of the illuminating unit in the lighting apparatus according to the present invention;

FIG. 16 is a drawing for explaining examples of processings of changing, by a toggle-switching operation, image projection by the projector unit and lighting states of the illumination light source of the illuminating unit in the lighting apparatus according to the present invention;

FIG. 17 is an explanatory view of an example about a configuration of an interactive function of the lighting apparatus according to the present invention;

FIG. 18A is an explanatory view of an example about control by the interactive function of the lighting apparatus according to the present invention;

FIG. 18B is an explanatory view of an example about control by the interactive function of the lighting apparatus according to the present invention;

FIG. 19D is an explanatory view of an example about the interactive function of the lighting apparatus according to the present invention;

FIG. 20A is an explanatory view of an example about the interactive function of the lighting apparatus according to the present invention;

FIG. 20D is an explanatory view of an example about the interactive function of the lighting apparatus according to the present invention;

FIG. 20E is an explanatory view of an example about the interactive function of the lighting apparatus according to the present invention;

FIG. 21A is an explanatory view of an example about the interactive function of the lighting apparatus according to the present invention;

FIG. 21B is an explanatory view of an example about the interactive function of the lighting apparatus according to the present invention;

FIG. 21C is an explanatory view of an example about the interactive function of the lighting apparatus according to the present invention;

FIG. 21D is an explanatory view of an example about the interactive function of the lighting apparatus according to the present invention;

FIG. 21E is an explanatory view of an example about the interactive function of the lighting apparatus according to the present invention;

FIG. 21F is an explanatory view of an example about the interactive function of the lighting apparatus according to the present invention;

FIG. 22A is an explanatory view of an example about the interactive function of the lighting apparatus according to the present invention;

FIG. 22B is an explanatory view of an example about the interactive function of the lighting apparatus according to the present invention;

FIG. 23B is an explanatory view of an example about the interactive function of the lighting apparatus according to the present invention;

FIG. 23C is an explanatory view of an example about the interactive function of the lighting apparatus according to the present invention;

FIG. 24A is an explanatory view of an example about the interactive function of the lighting apparatus according to the present invention;

FIG. 24B is an explanatory view of an example about the interactive function of the lighting apparatus according to the present invention; and FIG. 24C is an explanatory view of an example about the interactive function of the lighting apparatus according to the present invention.

DETAILED DESCRIPTION OF PREFERRED EMBODIMENTS

Figure 1:
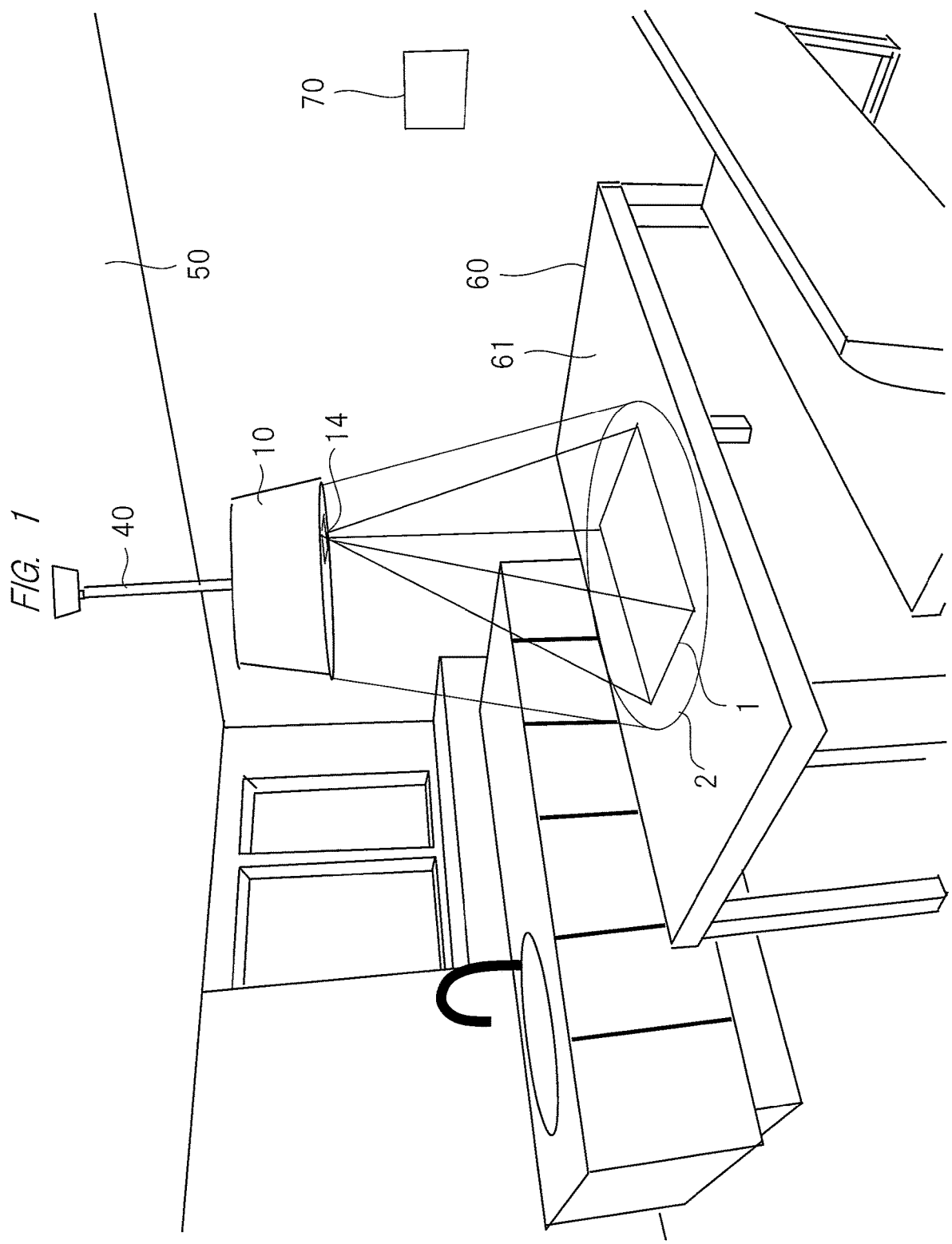
FIG. 1 is a perspective view showing an external configuration of a pendant-type lighting apparatus according to an embodiment of the present invention along with its service environment.

Embodiments of the present invention will hereinafter be described in detail in reference to the accompanying drawings. Configurations, which are denoted by common reference numerals in the respective drawings and are not particularly explained, mean the same that have been already explained in explanation about the other drawings, and thereof explanation will be omitted.

<Pendant-Type Lighting Apparatus with Image-Projecting Function and Ceiling-Type Lighting Apparatus with Image-Projecting Function>

Figure 2:
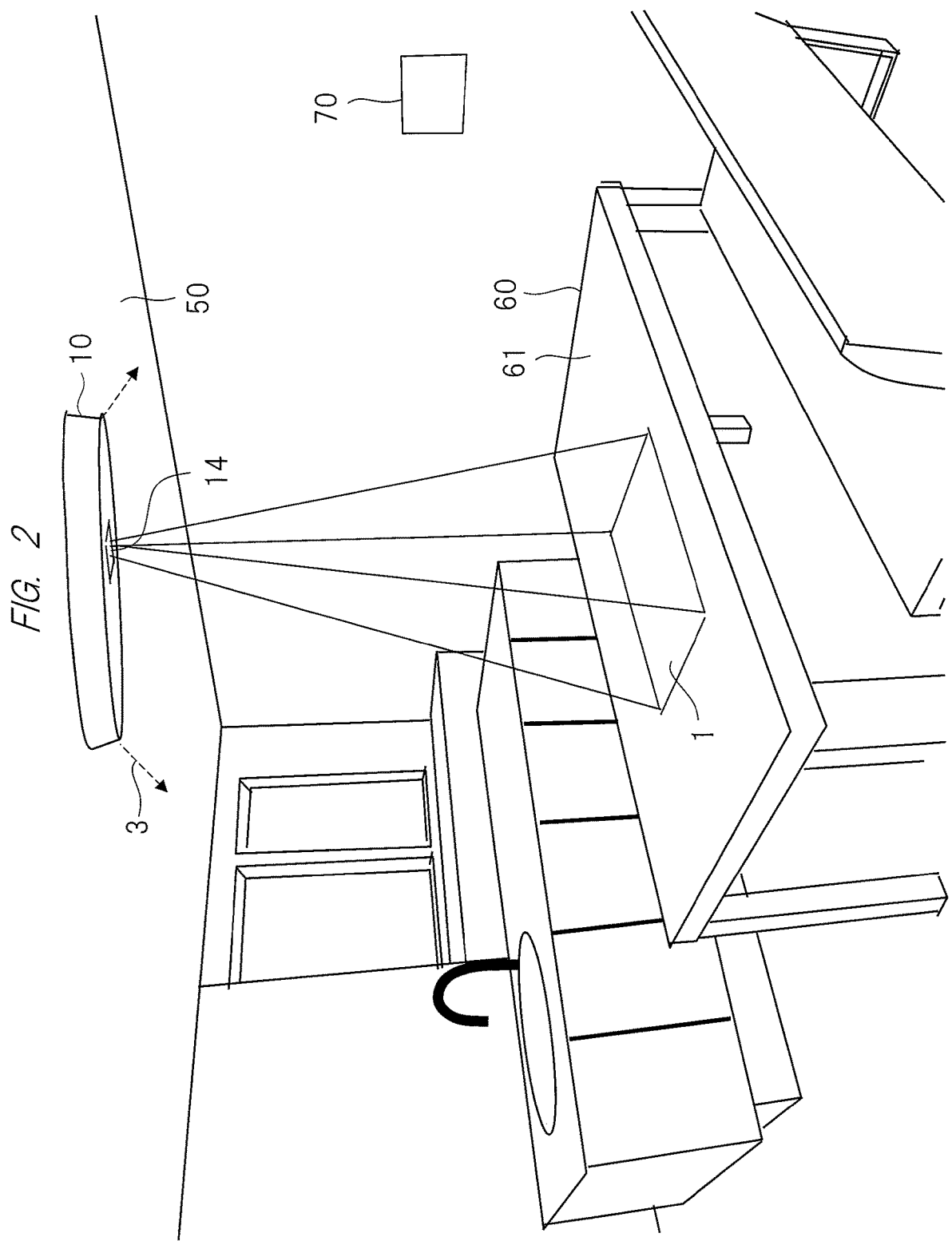
FIG. 2 is a perspective view showing an external configuration of a ceiling lighting apparatus according to an embodiment of the present invention along with its service environment.

FIGS. 1 and 2 of the accompanying drawings depict external configurations of lighting apparatuses with an image-projecting function according to one embodiment of the present invention. FIG. 1 shows a lighting apparatus with an image-projecting function, which is so-called a pendant-type lighting apparatus equipped with an image-projecting function, the pendant-type lighting apparatus being hung from a ceiling surface. FIG. 2 shows a lighting apparatus with an image-projecting function, which is so-called a ceiling-type lighting apparatus equipped with an image-projecting function, the ceiling lighting apparatus being mounted on the ceiling surface.

It is clearly understood from FIGS. 1 and 2 that each of these lighting apparatuses 10 with the image-projecting function is attached to, for example, a wall surface or a ceiling surface 50 making up a space in a kitchen, dining room, living room, and office, etc., and is used thereon. More specifically, as shown in FIGS. 1 and 2, the lighting apparatus 10 is hung with a given height above a desk or a table 60 located in a room across or is mounted integrally on the ceiling surface. The lighting apparatus 10 with the image-projecting function is a lighting apparatus that has both of an illuminating function of emitting illumination light 2 or illumination light 3 onto an upper surface of the desk or the table, a wall surface, or the like, and an image-projecting function of projecting various images 1 onto the upper surface (display surface or projection surface) 61 of the desk or the table 60 to display the images on the upper surface 61. Incidentally, reference numeral 40 in FIG. 1 shows a holder that holds the pendant-type lighting apparatus 10 hung at a desired location from the ceiling surface. An aperture or a light-transmission window 14 will be described later.

A desk or a table with a horizontal surface, on which an image is to be projected by the image-projecting function, is highly likely to be a target of illumination by the illumination function when the lighting apparatus 10 is used without exerting its image-projecting function. For this reason, it is preferable that an area in which the image 1 is projected by the image-projecting function and an illuminated range of illumination light 2 by the illuminating function overlap at least partially each other.

It is also preferable that the lighting apparatus with the image-projecting function includes various control units, which will be described later, so as to be able to switch ON/OFF about each of the illumination by the illumination function and the image projected by the image-projecting function.

Operation signals may be transmitted from an operation panel 70 (wall-mounted operation input unit) attached to a wall, etc., to the various control units of the lighting apparatus with the image-projecting function through wired or wireless communication to control switching-ON/OFF of the illumination light by the illumination function and the image projected by the image-projecting function.

Figure 3:
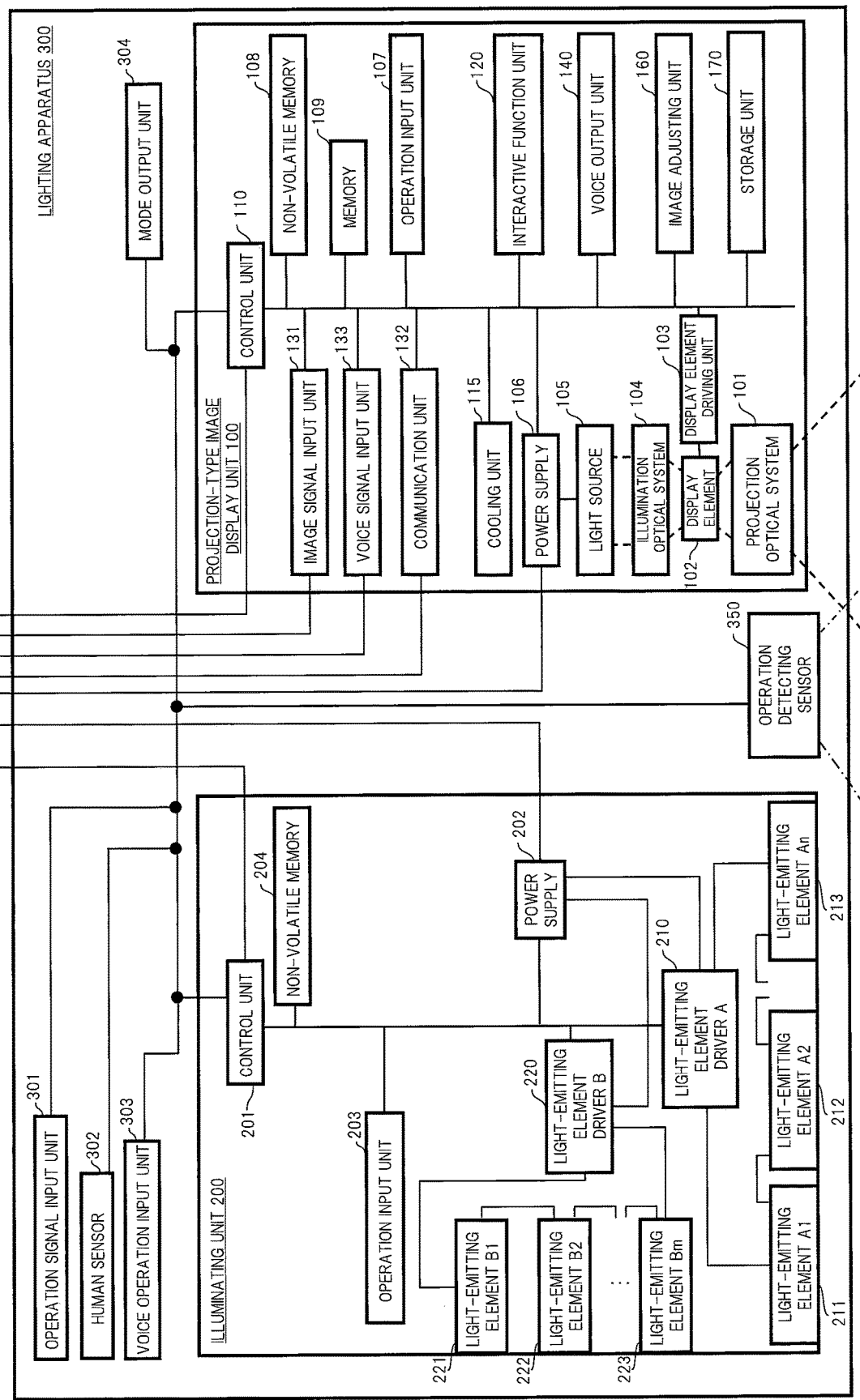
FIG. 3 is a block diagram of an example of an internal configuration of the lighting apparatus of the present invention.

FIG. 3 is a block diagram of an example of an internal configuration of a lighting apparatus 300 with an image-projecting function (corresponding to the lighting apparatus 10 with an image-projecting function shown in FIG. 1 and FIG. 2). The lighting apparatus 300 with the image-projecting function includes a projection-type image display unit 100 having an image-projecting function, and an illuminating unit 200 having an illumination light emitting function.

An operation signal input unit 301 is an operation button or a light-receiving portion of a remote controller. The operation signal input unit 301 receives an operation signal inputted by a user. A human sensor 302 is a sensor that determines the presence/absence of a human around the lighting apparatus 300 with the image-projecting function or in a room, in which the lighting apparatus 300 is placed, using infrared rays, ultrasonic waves, and visible light, etc. The human sensor 302 itself, unless otherwise specified in the following description, may be used as a human sensor fabricated by an existing technique. A voice operation input unit 303 collects voices around the lighting apparatus 300 with the image-projecting function, carries out a voice recognition processing, and converts a result of the voice recognition processing into an operation signal. An operation signal created by the voice operation input unit 303 is used for an operation by each unit making up the lighting apparatus 300 with the image-projecting function.

An operation detecting sensor 350 is a camera that captures an image in a range including an image projection area on a display surface 61. The operation detecting sensor 350 detects non-visible light, such as an infrared component, and thereby detects reflected light from an operated object. Incidentally, setting a cutoff wavelength of an optical filter of the operation detecting sensor 350 within a visible light wavelength range (e.g., within a red visible light range) allows the operation detecting sensor 350 to capture some visible light components other than infrared rays (i.e., projected image on the display surface) together with an infrared component. An input from the operation detecting sensor 350 is used for a processing of identifying, near the image projection area, a user's hand(s) or a gesture operation by an operation object such as an emission light pen that emits light to be detected.

A mode output unit 304 outputs or displays (1) a lighting state in which the illumination light of the illuminating unit 200 is ON/OFF etc., (2) a stand-by mode in which the illumination light of the illuminating unit 200 is turned off, but the illumination unit 200 itself is in operation, (3) an error mode of the illuminating unit 200, (4) a lighting state in which the light source of the projection-type image display unit 100 is ON/OFF etc., (5) a stand-by mode in which the light source of the projection-type image display unit 100 is turned off, but the projection-type image display unit 100 itself is in operation, (6) an error mode of the projection-type image display unit 100, (7) an operation mode of the human sensor 302 (whether the human sensor 302 is in operation or not), (8) an operation mode of the voice operation input unit 303 (whether the voice operation input unit 303 is in operation or not), and (9) an operation mode of the operation detecting sensor 350 (whether the operation detecting sensor 350 is in operation or not).

The mode output unit 304 may be structured in such a way as to indicate a plurality of kinds of those modes by changing colors, and light emission frequencies, etc. of a plurality of LED indicators. The mode output unit 304 may also be structured in such a way as to indicate this plurality of kinds of modes in the form of characters, and marks, etc. on a liquid crystal monitor, an organic EL monitor, or other types of monitors.

Each of the above described operation signal input unit 301, human sensor 302, voice operation input unit 303, operation detecting sensor 350, and mode output unit 304 may be structured in such a way as to be capable of transmitting/receiving information to/from a control unit of the projection-type image display unit 100 and a control unit of the illuminating unit 200. This allows an input to the signal input unit 301, human sensor 302, voice operation input unit 303, operation detecting sensor 350, etc., to be used by the projection-type image display unit 100 and illuminating unit 200 for their respective processings. It also allows the mode output unit 304 to collectively indicate respective modes of the projection-type image display unit 100 and illuminating unit 200 on the same LED indicator or monitor.

A configuration of the projection-type image display unit 100 will then be described. The projection-type image display unit 100 is an optical system that projects an image onto the display surface 61, and includes a lens and/or a mirror. A display element 102 is an element that modulates light passing therethrough or reflected thereon to generate an image, and uses, for example, a transmissive liquid crystal panel, and reflective liquid crystal panel, DMD (Digital Micromirror Device: registered trademark) panel, etc. A display element driving unit 103 sends, to the display element 102, a drive signal corresponding to an image signal.

A light source 105 generates light for image projection, and uses a high-pressure mercury lamp, xenon lamp, LED light source, and laser light source, etc. A power supply 106 converts incoming external AC current into DC current to supply the light source 105 with DC current. The power supply 106 also supplies each of other units with necessary DC current.

An illumination optical system 104 condenses light generated by the light source 105 into a uniform beam of light and emits it onto the display element 102. A cooling unit 115 cools a unit that comes to have a high temperature, such as the lighting source 105, power supply 106, and display element 102, by an air-cooling method or a liquid-cooling method as the need arises. An operation signal input unit 107 is an operation button or a light-receiving unit of a remote controller. The operation signal input unit 107 receives an operation signal inputted by a user. The operation signal input unit 107 may receive an infrared signal, and radio signal, etc. from the operation panel 70 of FIG. 1. When a signal from the operation signal input unit 301 of the lighting apparatus 300 is inputted to the projection-type image display unit 100, the projection-type image display unit 100 may dispense with operation signal input unit 107.

An image signal input unit 131 is connected to an external image output device and receives image data inputted from the image output device. A voice signal input unit 133 is connected to an external voice output device and receives voice data inputted from the voice output device. A voice output device 140 can perform a voice output based on the voice data inputted to the voice signal input unit 133. The voice output device 140 may output an operation sound or an error alarm sound stored therein. A communication unit 132 is connected to, for example, an external information processor and inputs/outputs various control signals. The communication unit 132 may carry out wired or wireless communication with the operation panel 70 of FIG. 1.

A non-volatile memory 108 stores various data used for the projector function. Data stored in the non-volatile memory 108 includes data of various kinds of operations carried out by an interactive function that will be described later, display icon data, and calibration data that will be described later. A memory 109 stores data of an image to be projected, and data for controlling the apparatus. A control unit 110 controls the operation of each of units connected to the control unit 110. The control unit 110 may input/output information from/to the operation signal input unit 301, human sensor 302, voice operation input unit 303, and operation detecting sensor 350, etc. to control them.

An interactive function unit 120 is a unit that executes an interactive action, such as the user's manipulating a light-emitting pen or a finger, for writing a character and figure, etc. in an image area. To execute the interactive action, the interactive function unit 120 has: a function of analyzing an infrared image acquired from the operation detecting sensor 350 to calculate the position of the light-emitting pen or the finger (position at which the user manipulates the pen or the finger); and a function of executing application programs capable of being manipulated by the light-emitting pen or the finger such as an application program for synthesizing an operation icon in a projected image or carrying out a graphic processing, etc. based on the user's operation and an application program for handling an image, etc., input by an external image output device.

It is hardly conceivable that the image-capturing range of the operation detecting sensor 350 matches a range of an image projected on the display surface 61 (optical image on the display surface 61 in the image area of the display element 102). For this reason, when the location of an operation (drawing) by the user is calculated, coordinates in the image-capturing range of the operation detecting sensor 350 must be transformed into coordinates of the image projected on the display surface 61. The interactive function unit 120, therefore, has a function of carrying out a processing of the transformation and a processing of creating transformation table data (calibration data) for the transformation processing.

An image adjusting unit 160 carries out an image processing to image data inputted by the image signal input unit 131. The image processing includes, for example, a scaling processing of magnifying, demagnifying, or deforming an image, a brightness adjusting processing of changing brightness, a contrast adjusting processing of changing the contrast curve of an image, and a retinex processing of decomposing an image into optical components and changing the amount of weighting of each component.

A storage unit 170 stores pictures, images, voices, and various data. For example, the storage unit 170 may store pictures, images, voices, and various data in advance when the apparatus is shipped as a product, and may store pictures, images, voices, and various data that are acquired from an external device, and server, etc. through the communication unit 132. Pictures, images, and various data, etc. stored in the storage unit 170 may be outputted as projected images through the display element 102 and projection optical system 101. A voice recorded in the storage unit 170 may be outputted as a voice message from the voice output unit 140.

As described above, the projection-type image display unit 100 may be equipped with various functions. The projection-type image display unit 100, however, does not always need to have all of the above functions. The projection-type image display unit 100 may have any configuration on the condition that it has the function of projecting an image.

A configuration of the illuminating unit 200 will then be described.

A control unit 201 controls each of units connected to the control unit 201. The control unit 201 may input/output information from/to the operation signal input unit 301, human sensor 302, voice operation input unit 303, and operation detecting sensor 350, etc. to control them. An operation signal input unit 203 is an operation button or a light-receiving unit of a remote controller. The operation signal input unit 203 receives an operation signal inputted by the user. The operation signal input unit 203 may receive an infrared signal, or a radio signal, etc. from the operation panel 70 of FIG. 1. When a signal from the operation signal input unit 301 of the lighting apparatus 300 is inputted to the illuminating unit 200, the illuminating unit 200 may dispense with operation signal input unit 203. A non-volatile memory 204 stores various data used by the illuminating unit 200.

A power supply 202 converts incoming external AC current into DC current to supply light-emitting element drivers (210 and 220, etc.) with the DC current. The power supply 202 also supplies other units with necessary DC current. The light-emitting element drivers (210 and 220, etc.) use current supplied from the power supply 202 to cause light-emitting elements (211, 212, 213, 221, 222, and 223, etc.) to emit light based on control by the control unit 201. These light-emitting elements serve as a light source(s) for illumination light emitted by the illuminating unit 200.

For example, in the example of FIG. 3, the light-emitting element driver A 210 collectively drives n light-emitting elements A1 211, A2 212, . . . , An (211, 212 and 213, etc.) that are connected in series. Based on control by the control unit 201, the light-emitting element driver A 210 changes the brightness and colors of these light-emitting elements. In the same manner, the light-emitting element driver B 220 collectively drives m light-emitting elements B1, B2, . . . , Bn (221, 222 and 223, etc.) that are connected in series. Based on control by the control unit 201, the light-emitting element driver B 220 changes the brightness and colors of these light-emitting elements. Therefore, this configuration can control changes in the brightness and colors of the light-emitting elements for each of light-emitting element drivers. The example of FIG. 3 indicates two sets of the light-emitting element driver and the plurality of light-emitting elements. One set or three or more sets of the same are also possible. The number of sets of the light-emitting element driver and the plurality of light-emitting elements may be increased or decreased as the need arises.

According to the configuration as described above, the illuminating unit 200 can emit illumination light that is variable in brightness and/or color.

Then, described will be layouts of an optical unit, which includes the projection optical system 101, display element 102, illumination optical system 104, and light source 105, etc. of the projection-type image display unit 100, and the light-emitting elements (211 and 221, etc.) which serve as the light source of the illuminating unit 200.

<Definition of Layouts of Projector Optical Unit>

This specification defines layouts of an optical unit (30) making up a projector in the following manner.

<Vertical Placement Position of Optical Unit>

Figure 4:
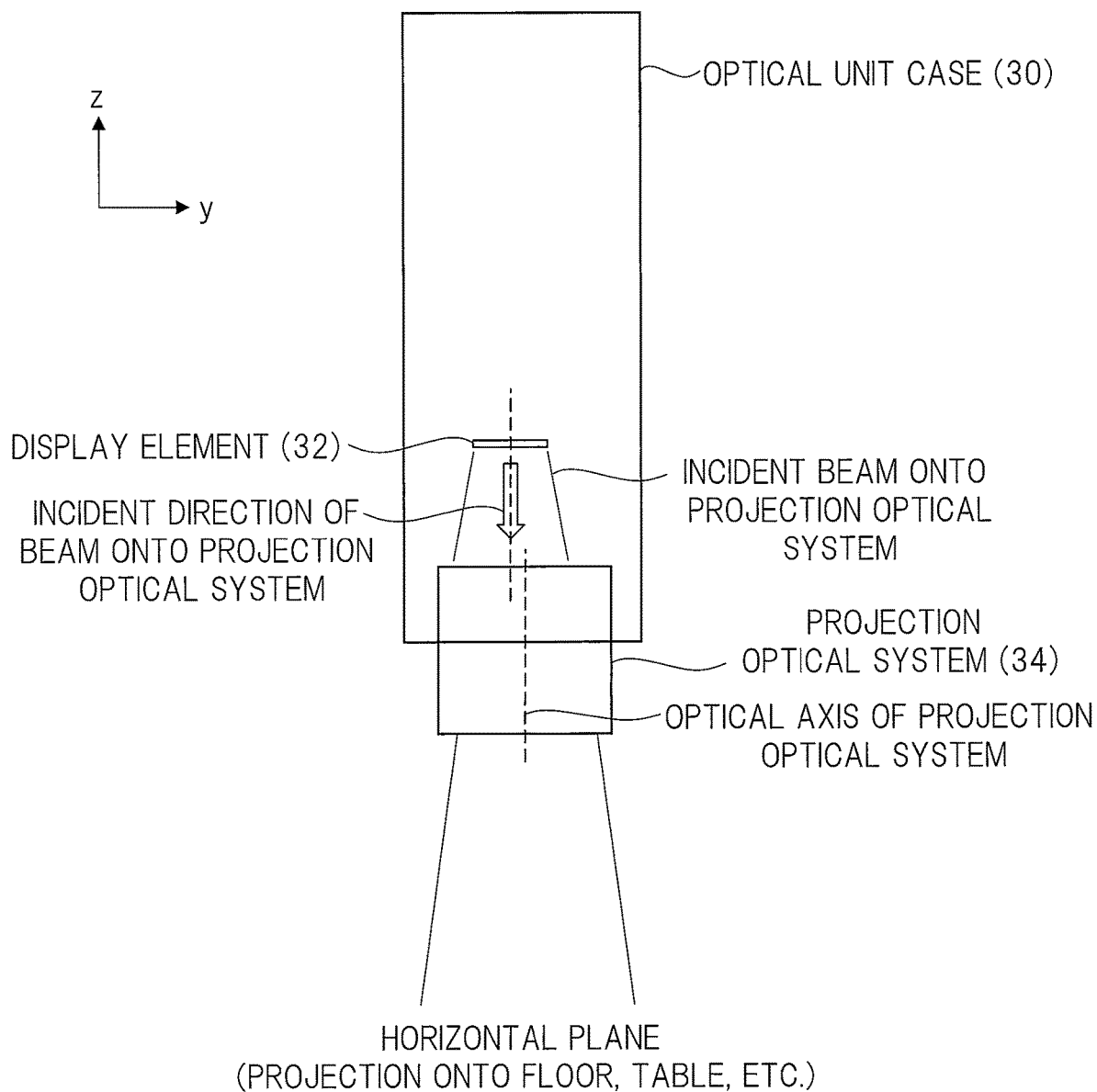
FIG. 4 is a side view for defining a vertical placement position at which an optical unit in the lighting apparatus according to the present invention is set.
Figure 5:
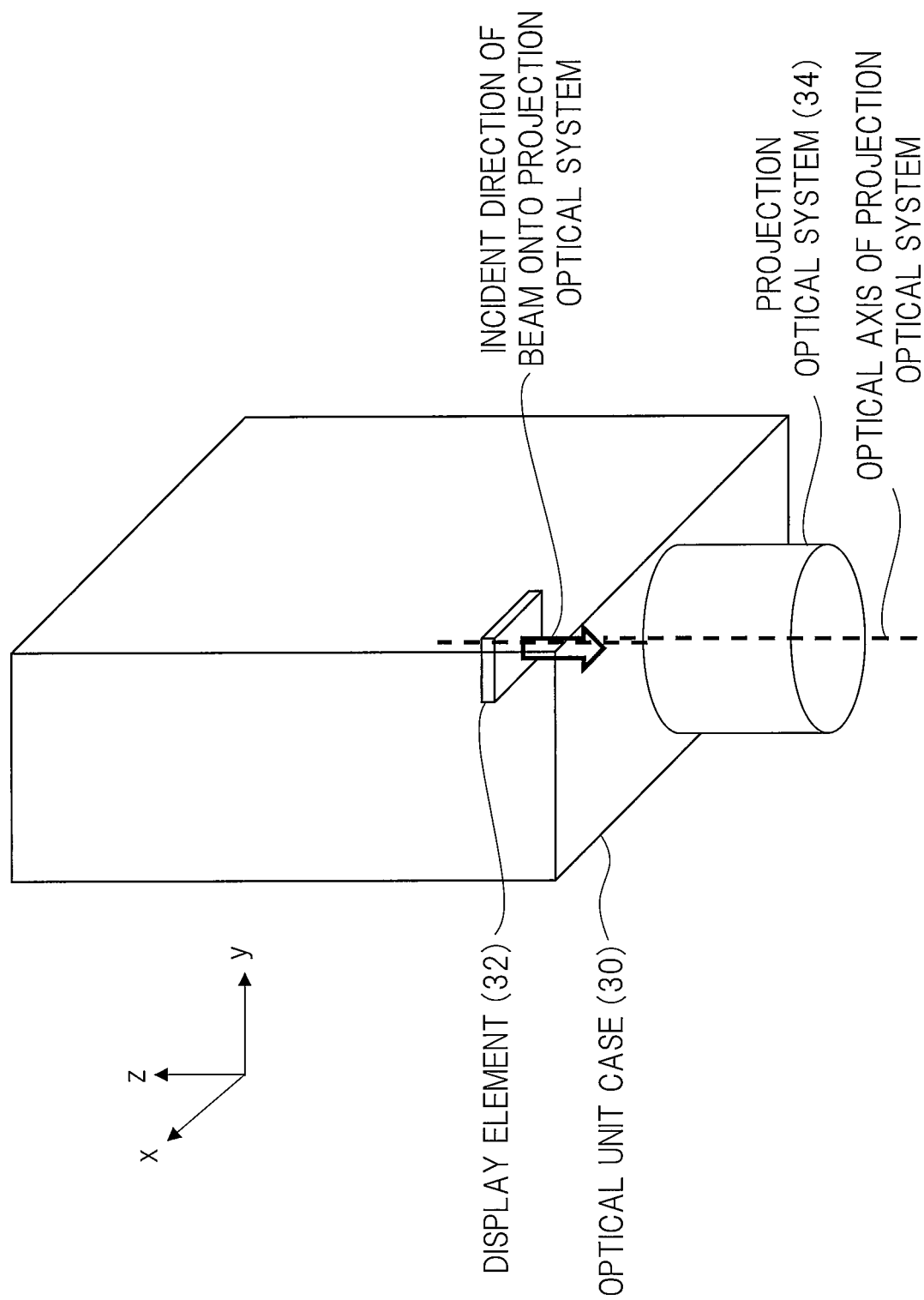
FIG. 5 is a perspective view for defining the vertical placement position at which the optical unit in the lighting apparatus according to the present invention is set.

A vertical placement position of the optical unit means a state in which, as shown in FIGS. 4 and 5, when a beam from a display element 32 (corresponding to the reference numeral 102 of FIG. 3) making up the projector is incident, for example, on a so-called projection optical system 34 (corresponding to the reference numeral 101 of FIG. 3) including various optical elements such as a lens, an incident direction of the beam or an optical axis of the projection optical system 34, on which the beam is incident, is arranged in a direction substantially perpendicular to a horizontal plane (which is perpendicular to a sheet surface on which Figure is drawn) or arranged in a direction closer to a vertical direction to the horizontal plane than a parallel direction to the horizontal plane. Incidentally, in FIGS. 4 and 5, a z direction is the vertical direction, i.e., the direction perpendicular to the horizontal plane.

According to this layout, light projected from the projection optical system 34 can form an optical image of the beam generated by the display element 32 on the horizontal plane. Various layouts are in optical systems from a light source (corresponding to the reference numeral 105 of FIG. 3) to the display element 32 although not illustrated. For example, as one example, there is a transmissive or a reflective element as the display element 32. Various optical systems such as a single element or a plurality of elements are known as the display element 32. However, in an attempt to miniaturize an optical unit case by its vertical placement position shown in FIGS. 4 and 5, reducing a size of the optical unit in the z direction of FIGS. 4 and 5 is not easy when the layout of the display element 32 and projection optical system 34 is taken into consideration.

The optical unit 30 in its vertical placement position can be reduced in size more easily in its y direction than in other directions. When an attempt to miniaturize the optical unit case in its vertical placement position is made, therefore, an optical unit reduced in size to a greater extent in the y direction than in the z direction is formed as shown in a perspective view of FIG. 5.

Incidentally, as indicated by broken lines in FIGS. 4 and 5, by changing the setting of a relative position between a central position of the display element 32 and an optical axis of the projection optical system 34 on the x-y plane, the position of the optical image by the display element on the horizontal plane can be changed. In this manner, the position of the projected image on the horizontal plane can be freely set as the need arises.

<Horizontal Placement Position of Optical Unit>

Figure 6:
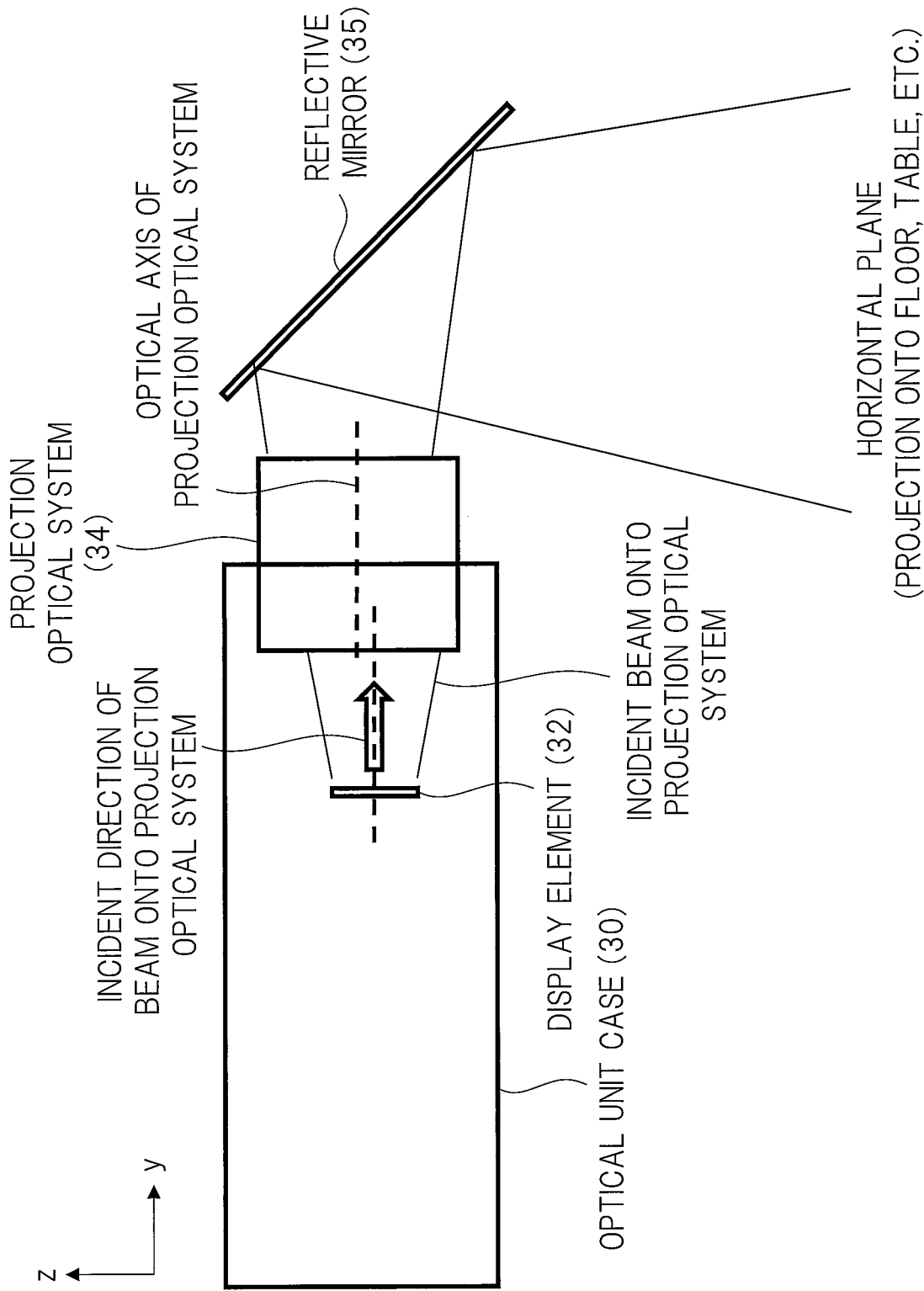
FIG. 6 is a side view for defining a horizontal placement position at which the optical unit in the lighting apparatus according to the present invention is set.
Figure 7:
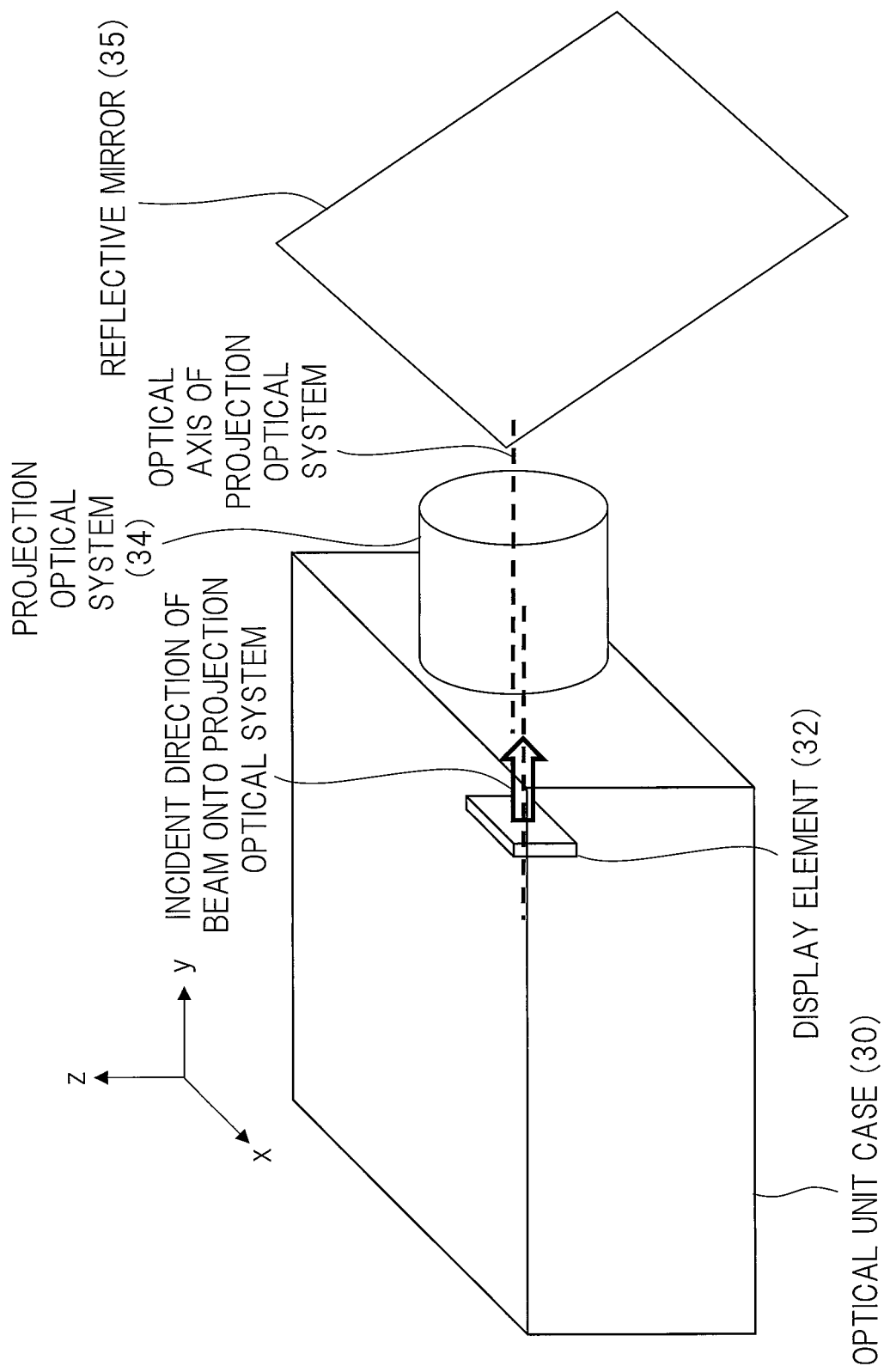
FIG. 7 is a perspective view for defining the horizontal placement position at which the optical unit in the lighting apparatus according to the present invention is set.

A horizontal placement position of the optical unit means a state in which, as shown in FIGS. 6 and 7, when a beam from the display element 32 (corresponding to the reference numeral 102 of FIG. 3) making up the projector is incident, for example, on a so-called projection optical system 34 (corresponding to the reference numeral 101 of FIG. 3) including various optical elements, such as a lens, the incident direction of the beam or the optical axis of the projection optical system 34, on which the beam is incident, is arranged in a direction substantially parallel with the horizontal plane or arranged in a direction closer to the parallel direction to the horizontal plane than the vertical direction. Incidentally, in FIGS. 6 and 7, the z direction is the vertical direction, i.e., the direction perpendicular to the horizontal plane.

According to this layout, the beam from the projection optical system 34 is reflected by a reflective mirror 35, etc., to form an optical image of the display element 32 on the horizontal plane. Various layouts are in optical systems from the light source (corresponding to the reference numeral 105 of FIG. 3) to the display element 32 although not illustrated. For example, as one example, there is a transmissive or a reflective element as the display element 32. Various optical systems such as a single element or a plurality of elements are known as the display eminent 32. However, in attempting to miniaturize the optical unit case in its horizontal placement position shown in FIGS. 6 and 7, reducing the size of the optical unit in the y direction of FIGS. 6 and 7 is not easy when the layout of the display element 32 and projection optical system 34 is taken into consideration.

However, the optical unit 30 in its horizontal placement position can be reduced in size more easily in its z direction than other directions. When an attempt to miniaturize the optical unit case in its horizontal placement position is made, therefore, an optical unit reduced in size to a greater extent in the z direction than in the y direction is formed as shown in a perspective view of FIG. 7.

Incidentally, as indicated by broken lines in FIGS. 6 and 7, by changing the setting of the relative position between the central position of the display element 32 and the optical axis of the projection optical system 34 on the x-z plane, the position of the optical image by the display element on the horizontal plane can be changed. In this manner, the position of the projected image on the horizontal plane after reflection by the beam reflected by the reflective mirror 35 can be set freely in its design as the need arises.

Incidentally, in the example of FIGS. 6 and 7, a reflective optical element such as the reflective mirror 35 is disposed at a rear stage to the projection optical system. The reflective optical element, however, may be disposed between optical elements such as a plurality of lenses making up the projection optical system.

Incidentally, in the example of FIGS. 6 and 7, the reflective mirror 35 may be regarded as an element separated from the optical unit or as an element included in a part of the optical unit.

Specific layouts (arrangements) of the optical unit 30 and illumination light source of the lighting apparatus with the image-projecting function will hereinafter be described in reference to FIGS. 8 to 13. Incidentally, in FIGS. 8 to 13, a plurality of semiconductor light-emitting elements (LED) 22 correspond to the light-emitting elements (211, 212, 213, 221, 222, and 223, etc.) of FIG. 3. The entire illumination light source, which includes a set of the plurality of semiconductor light-emitting elements (LED) 22, is described as an illumination light source 20.

Incidentally, in each of FIGS. 8 to 13, dotted lines in a side view show a range of diffusion of illumination light from the illuminating unit 200, and a triangle area spreading from the optical unit 30 represents, from its side surface, an area of projection of an image projected from the optical unit 30 of the projection-type image display unit 100.

Incidentally, FIGS. 8 to 13 also show, in addition thereto, examples in which a drawstring-type toggle switch as described later in FIG. 14 is attached to the lighting apparatus. In each of Figures, a drawstring portion 90 (which may be formed by a fiber string, a metal chain, or the like) of the drawstring-type toggle switch and a front end of the drawstring portion 90 are shown. When the drawstring toggle switch is attached to the lighting apparatus, the drawstring-type toggle switch should preferably have such a layout that, as shown in each of FIGS. 8 to 13, the front end 91 is within the range of diffusion of illumination light from the illuminating unit 200 and is outside the area of projection of the image projected from the optical unit 30 of the projection-type image display unit 100. Attaching the drawstring-type toggle switch in a lower direction of the casing (shade) 11 allows miniaturization of the lighting apparatus with the image-projecting function. Therefore, the drawstring portion 90 and front end 91 of the drawstring-type toggle switch are located within the range of diffusion of illumination light from the illuminating unit 200.

At this time, as shown in FIGS. 8 to 13, when the plurality of semiconductor light-emitting elements are used as the light source for illumination light from the illuminating unit 200, the drawstring portion 90 and front end 91 of the drawstring-type toggle switch are illustrated by beams of light coming in a plurality of directions. As a result, shadows that are created by the drawstring portion 90 and front end 91 of the drawstring-type toggle switch relative to the light source for illumination light from the illuminating unit 200 are thinned by a plurality of incoming beams of light with different incident angles and, consequently, become less noticeable. A problem is, therefore, difficult to cause in quality. Meanwhile, any image-projecting light from the optical unit 30 comes out of an outgoing port of the optical unit 30. If the drawstring portion 90 and front end 91 of the drawstring-type toggle switch are present in the area of projection of the image projected from the optical unit 30, therefore, shadow portions created by the drawstring portion 90 and front end 91 of the drawstring-type toggle switch over the projected image bring a lack of the image, and its quality becomes very poor.

When the drawstring-type toggle switch is attached to the lighting apparatus with the image-projecting function, therefore, the drawstring-type toggle switch preferably have such a layout that, as shown in each of Figures, the front end 91 is within the range of diffusion of the illumination light from the illuminating unit 200 and is outside the area of projection of the image projected from the optical unit 30 of the projection-type image display unit 100.

<Pendant-Type Lighting Apparatus with Image-Projecting Function>

FIG. 8(A) is a side sectional view of a pendant-type lighting apparatus 10 with the image-projecting function, and FIG. 8(B) is a bottom view of the same. In this example, the optical unit 30 is positioned at the vertical placement layout. Attached to an interior bottom surface of the casing (shade) 11, which is a body of the lighting apparatus, is a board 21 for the illuminating light source 20, which has the plurality of semiconductor light-emitting elements (LED) 22. Attached to an opening surface on a lower side of the casing (shade) 11 of Figure is a diffusing panel 12 so as to cover it.

In a space formed by the casing (shade) 11 and the diffusing panel 12, the optical unit 30 is placed so that it is located substantially at a center of illumination beams. In the example of FIG. 8, provided in the diffusing panel 12 is an aperture or a light-transmission window 14 formed at a position at which the optical unit 30 emits projection light downward. This is because if the diffusing panel 12 has no aperture or no light-transmission window and exerts a diffusion effect across its entire surface, it results in diffusion of an image projected from the optical unit 30, in which case no image is formed on an image projection surface such as a surface of a desk or a table.

The aperture or the light-transmission window 14 may be an opening cut out of the diffusing panel 12 or may be a portion made of a transmissive material such as glass having no diffusion effect. The light-transmission window made of a transmissive material, etc., may be given a structure that is difficult to pass dust etc. into the diffusing panel 12. To avoid affecting the image projected from the optical unit 30 as much as possible, the light-transmission window should be subjected to a coating having spectral characteristics as flat as possible in a wavelength range of projection light emitted from the optical unit 30.

Incidentally, a periphery of the aperture or the light-transmission window 14 needs not be connected directly to the diffusing panel 12. To make a shadow of the optical unit 30 over the diffusing panel 12 less noticeable, an area for a decorative panel etc. may be provided between the aperture or the light-transmission window 14 and the diffusing panel 12. That is, the aperture or the light-transmission window 14 is a light-passage port or a light-transmission port necessary for emitting image-projecting light from the optical unit 30 placed in a space formed by the casing (shade) 11 and the diffusing panel 12, and its location may be in the diffusing panel 12 or a part of another structure.

According to such a layout (arrangement), the optical unit 30 can be reduced in size in the direction parallel with the horizontal plane, and so a ratio of a shadow formed by the optical unit 30 to an area of illumination light from the illumination light source 20 to the diffusing panel 12 can be reduced. This makes it possible to suppress the degradation of the quality apparently viewed as the lighting apparatus due to an influence to the shadow of the optical unit 30 formed over the diffusion plate 12 (i.e., a sense of incongruity as the lighting apparatus due to the shadow over the diffusing panel 12). Even if the casing (shade) 11 is formed in the diffusing panel, the shadow of the optical unit 30 is made less noticeable, thus making it possible to suppress the degradation of the quality apparently viewed as the lighting apparatus.

In an example of FIGS. 9(A) and 9(B), the optical unit 30 is positioned at a horizontal placement layout. In this example, the optical unit 30 is located above the board 21 for the illuminating light source 20, and may be mounted, for example, on an upper surface of the board 21 or attached to the casing (shade) 11. The lighting apparatus with the image-projecting function as a whole is further reduced in size in the vertical direction, and therefore the lighting apparatus with the image-projecting function having a thinner structure can be achieved. Incidentally, in this modification, an aperture or a light-transmission window for transmitting image-projecting light from the optical unit 30 is formed on the diffusing panel 12 attached so as to cover the opening below the illuminating light source 20, and becomes larger in size than the above aperture or the light-transmission window. On a part of the diffusing panel 12, that is, at a part on which the optical unit 30 is mounted, an aperture (or a light-transmission window) 26 for transmitting light projected from the optical unit 30 is formed.

In such a configuration, the lighting apparatus with the image-projecting function having a thinner structure can be achieved, and the optical unit 30 is located at a rear side of the board 21 relative to the illumination range, and therefore the optical unit 30 blocks the illumination light from the illumination light source 20 to create no shadow. This prevents the degradation of the quality apparently viewed as the lighting apparatus (i.e., a sense of incongruity as the lighting apparatus due to the shadow over the diffusing panel 12).

At this time, by setting the lower surface of the optical unit 30 substantially in contact with the upper surface of the board 21, the size of the aperture (or the light-transmission window) 26 of the board 21 can be reduced as much as possible. This allows the plurality of semi-conductor light-emitting elements (LED) 22 to be arranged more efficiently on the board 21.

FIG. 10(A) is a side sectional view of the pendant-type lighting apparatus 10 with the image-projecting function, and FIG. 10(B) is a bottom view of the same. In this example, the optical unit 30 is positioned at a vertical placement layout. The optical unit 30 is attached inside the casing (shade) 11 is arranged so as to be located at an end of illumination beams.

In this layout (arrangement), the optical unit 30 is arranged so as to be located at the end of illumination beams, and the optical axis of the projection optical system and the center of the display element in the optical unit 30 are relatively shifted in position horizontally to each other. Therefore, an image is projected so that its center is brought closer to the center of illumination beams from the illumination light source 20 relative to the outgoing port of the projection optical system of the projector.

The arrangement of FIG. 10 allows a so-called stationary-type projector, which is usually placed on a table and is used there, to be used as the projector of the lighting apparatus as it is. This is because, in many stationary-type projectors, the optical axis of the projection optical system and the center of the display element are already set with them shifted in position relative to each other. The lighting apparatus with the image-projecting function of FIG. 10 thus has a structure suitable for cost reduction. This cost reduction effect is achieved also in other configuration examples in which the optical unit 30 is located at the end of downward illumination beams.

In the layout of FIGS. 10(A) and 10(B), the plurality of semiconductor light-emitting elements (LED) 22 are arranged so as to be mounted on both surfaces of the board 21 for the illumination light source 20. This allows the illumination light to be emitted not only in the downward direction but also in the upward direction. According to such a configuration, the lighting apparatus 10 with the image-projecting function can emit illumination light upward, thus functioning also as an indirect illumination (ceiling-side indirect illumination function) since being able to illuminate a ceiling etc. in upward illumination light. Incidentally, in this example, in addition to the diffusing panel 12 (lower diffusing panel) covering the opening surface on the lower surface of the casing (shade) 11, another diffusing panel 12 (upper diffusing panel) is attached so as to cover an opening surface on the upper surface of the casing (shade) 11.

Such a configuration having an illumination function of emitting the illumination light in a plurality of different directions and an image-projecting function allows switching of a plurality of combination modes of the illumination light emission and the image-projecting light projection. For example, control may be performed to switch a mode in which only the image-projecting light is projected downward, a mode in which illumination light is emitted downward while the image-projecting light is not projected, a mode in which the illumination light is emitted upward while the image-projecting light is not projected, and in a mode in which the illumination light is emitted upward while the image-projecting light is projected downward.

Incidentally, in FIG. 10, the optical unit 30 is located at the end of beams of downward illumination light, but the optical unit 30 may be located at a central portion etc. of beams of downward illumination light.

In an example of FIGS. 11(A) and 11(B), the optical unit 30 is positioned at the horizontal placement layout. An end of the board 21 for the illumination light source 20 is extended vertically to be formed into a cylindrical shape as well as extended also horizontally therefrom to form a flange. The plurality of semiconductor light-emitting elements (LED) 22 are structurally mounted on the upper and lower surfaces of the board 21, on the outer peripheral surface of a cylindrical shape portion, and on a lower surface of the flange. Also in this example, the optical unit 30 is located substantially at the center of beams of downward illumination light. Incidentally, the location of the optical unit 30 may be not substantially at the center of beams of downward illumination light. It may be arranged on an end side of beams of downward illumination light, i.e., near a side face of the cylindrical shape.

In addition to the diffusing panel 12 (lower diffusing panel) on the lower surface of the casing (shade) 11, another diffusing panel (upper peripheral diffusing panel) is attached to the casing (shape) 11 so as to cover the upper surface of the casing (shape) 11 and a part (upper part) of its outer periphery. In such a configuration, in addition to the above effect, the illumination light can be emitted not partiality but peripherally including the upper surface and sides of the lighting apparatus 10 with the image-projecting function, and functions also as indirect illumination (ceiling-side indirect illumination function+wide range illuminating function) since a ceiling etc. can be illuminated by the upward illumination light.

Such a configuration having an illumination function of emitting the illumination light in the plurality of different directions and an image-projecting function allows changes of the plurality of combination modes of the illumination light emission and the image-projecting light projection. For example, control may be performed to switch a mode in which only the image-projecting light is projected downward, a mode in which the illumination light is emitted downward while the image-projecting light is not projected, a mode in which the illumination light is emitted sideways while the image-projecting light is not projected, a mode in which the illumination light is emitted downward and sideways while the image-projecting light is not projected, and a mode in which the illumination light is emitted sideways and the image-projecting light is projected downward.

<Ceiling-Type Lighting Apparatus with Image-Projecting Function>

FIG. 12(A) is a side sectional view of a ceiling-type lighting apparatus 10 with the image-projecting function, and FIG. 12(B) is a bottom view of the same. In this example, the optical unit 30 is positioned at the horizontal placement layout. Attached to an interior bottom surface of the casing 11 which is the body of the lighting apparatus is the board 21 for the illuminating light source 20 which has the plurality of semi-conductor light-emitting elements (LED) 22. Simultaneously therewith, attached to the opening surface side on the lower side of the enclosure 11 of Figure is the diffusing panel 12 so as to cover it. Arranged inside is the optical unit 30 so as to be positioned substantially at the center of beams of illumination light.

In such a layout (arrangement), the lighting apparatus with the image-projecting function as a whole is reduced in size vertically, that is, the lighting apparatus with the image-projecting function having a thin structure can be achieved.

In many cases, an ordinary ceiling-type lighting apparatus without an image-projecting function is structured to be thin and wide along a ceiling surface. By realizing the lighting apparatus with the image-projecting function having the thin structure as shown in FIGS. 12(A) and 12(B), replacement with the conventional and ordinary ceiling-type lighting apparatus is readily made, and thus a greater product value can be enhanced.

In an example of the ceiling lighting apparatus 10 with the image-projecting function as shown in FIGS. 13(A) and 13(B), the optical unit 30 is positioned at the horizontal placement layout. Such a structure thereof is an example that the end of the board 21 for the illumination light source 20 is extended vertically to be formed into a cylindrical shape, the plurality of semiconductor light-emitting elements (LED) 22 are mounted on its bottom surface, and also on the outer peripheral surface of the cylindrically shaped board 21. This allows the illumination light to be emitted not only in the downward direction but also in the sidewise direction.

Incidentally, in this example, the optical unit 30 is arranged so as to be positioned substantially at the center of beams of downward illumination light. Incidentally, the position of the optical unit 30 may be not substantially at the center of beams of downward illumination light. Its location may be an end side of beams of downward illumination light, i.e., near a side face of the cylindrical shape. In addition to the diffusing panel 12 (lower diffusing panel) covering the opening surface on the lower surface of the casing 11, another diffusing panel 12 (side diffusing panel) is attached also to the periphery of the casing 11. In such a configuration, in addition to the above effect by the horizontal placement of the optical unit, the illumination light can be illuminated also in the sidewise direction (wide-range illumination function) of the lighting apparatus 10 with the image-projecting function.

Such a layout (arrangement) of the lighting apparatus with the image-projecting function can achieve the lighting apparatus with the image-projecting function having a vertically thin structure, and the illumination light can be illuminated also in the sidewise direction (wide-range illumination function) of the lighting apparatus 10.

Similarly to FIG. 10 or FIG. 11, the example of FIG. 13 has the illuminating function of emitting the illumination light in a plurality of different directions, and therefore may perform the control for changing a plurality of modes about the illumination light emitted in a plurality of directions by the illuminating function and the image-projecting light by the image-projecting function as described in FIG. 10 or FIG. 11.

Next, described by using FIG. 14 will be about examples of lighting control over an illumination light source of the illuminating unit (the reference numeral 200 in FIG. 3) and an image-projecting light source of the projection-type image display unit (the reference numeral 100 in FIG. 3) that are included in the lighting apparatus with the image-projecting function (the reference numeral 300 in FIG. 3) having the above configurations. Incidentally, in the following description and drawings, "PJ unit" is an abbreviation of the projector unit, i.e., projection-type image display unit.

Listed in FIG. 14 are examples of lighting control by the lighting apparatus with the image-projecting function according to one embodiment of the present invention. In the list of FIG. 14, "OPERATION HARD" represents configurations for user operations. "CONFIGURATION AND CONTROL" represents respective configurations and control examples. The lighting apparatus with the image-projecting function according to the one embodiment of the present invention may be equipped with a function of one of a plurality of lighting control examples shown in the list of FIG. 14. Or, it may be equipped with functions of two or more of the plural lighting control examples shown in the list.

Lighting control example 1 is an example in which one or each of the operation input unit 301, the wall-mounted operation input unit, and the remote controller is provided with an illuminating unit ON/OFF operation button and a PJ unit ON/OFF operation button, and thereby the user is allowed to arbitrarily change lighting ON/OFF of each of the illuminating unit and PJ unit.

Lighting control example 2 is an example in which: the operation input unit 301 or the wall-mounted operation input unit is configured by a touch sensor; touch sensing areas for the illuminating unit and PJ unit are provided to each of them; and the user is allowed to change the lighting ON/OFF of each of the illuminating unit and PJ unit according to the touched areas.

Lighting control example 3 is an example in which: the operation input unit 301 or the wall-mounted operation input unit is provided as a touch sensor; a touch sensing area for the illuminating unit and a touch sensing area for the PJ unit are shared; and a plurality of lighting states including the lighting ON/OFF of the illuminating unit and the lighting ON/OFF of the PJ unit can be changed by a toggle-switching operation depending on the detected number of times of touches made in the sensing area.

Lighting control example 4 is an example in which the operation input unit 301 or the wall-mounted operation input unit is provided with a rotary switch; and a plurality of lighting states including the lighting ON/OFF of the illuminating unit and the lighting ON/OFF of the PJ unit can be changed depending on a rotation angle or a position of the rotary switch.

Lighting control example 5 is an example in which: the operation input unit 301 is configured by a drawstring-type toggle switch; and a plurality of lighting states including the lighting ON/OFF of the illuminating unit and the lighting ON/OFF of the PJ unit can be changed by a toggle-switching operation depending on the number of drawstring times by the drawstring-type toggle switch.

In the configurations of lighting control examples 2, 3, 4, and 5, even use of an operation means similar to that by a conventional lighting apparatus without the image-projecting function such as a touch sensor, drawstring-type toggle switch, and a rotary switch enables a change in the lighting ON/OFF of the PJ unit. Therefore, there is an effect of allowing the user to intuitively understand how to operate the lighting apparatus, even if the user first uses it without a need of leaning a new, specific operation.

Lighting control example 6 is an example in which the wall-mounted operation input unit has one ON/OFF switch and the remote controller is provided with a button for the lighting ON/OFF of the illuminating unit as well as a button for the lighting ON/OFF of the PJ unit. In this case such control becomes possible that: only the illuminating unit is turned on by an ON operation on the wall-mounted operation input unit; during an ON state of the wall-mounted operation input unit, the lighting ON/OFF of the PJ unit as well as the illuminating unit by the remote controller can be operated; and then both of the illuminating unit and the PJ unit are turned OFF (extinguished) by an OFF operation of the wall-mounted operation input unit. In this case, if the wall-mounted operation input unit is simplified in configuration and such a wall-mounted operation input unit is solely used, the lighting apparatus with the image-projecting function can be handled as an equivalent to the conventional lighting apparatus without the image-projecting function. This makes the lighting apparatus of the present invention highly compatible with the conventional lighting apparatus, thus allowing the user to handle the lighting apparatus of the present invention easily.

The lighting apparatus with the image-projecting function according to the one embodiment of the present invention can change a plurality of lighting states including the lighting ON/OFF of the illuminating unit and the lighting ON/OFF of the PJ unit by the lighting control described in FIG. 14. Specific examples of the plurality of lighting states will then be described in reference to FIG. 15. In a list shown in FIG. 15, ON/OFF of "illuminating unit" represents a mode in which the illumination light source of the illuminating unit is turned on/off, and ON/OFF of "PJ unit" represents a mode in which the image-projecting light source of the projection-type image display unit is turned on/off. In a "MODIFICATION MODES ETC." column, explanation is made when there are a plurality of kinds in an ON mode or an OFF mode.

The lighting states changed by the lighting apparatus with the image-projecting function according to the one embodiment of the present invention include, for example, lighting states 1, 2, 3, and 4, etc. shown in the list of FIG. 15. The lighting state 1 is a mode in which the illumination light source of the illuminating unit and the image-projecting light source of the projection-type image display unit are both OFF. The lighting state 2 is a mode in which the illumination light source of the illuminating unit is on while the image-projecting light source of the projection-type image display unit is OFF. The lighting state 4 is the mode in which the illumination light source of the illuminating unit is OFF while the image-projecting light source of the projection-type image display unit is ON. It is preferable that the lighting apparatus with the image-projecting function be capable of changing these lighting states 1, 2, 3, and 4. The lighting apparatus with the image-projecting function may have (or may not have) the lighting state 3 in which the illumination light source of the illuminating unit and the image-projecting light source of the projection-type image display unit are both on.

The lighting state 3 includes various phases. For example, (1) in the lighting state 3, the illumination light source of the illuminating unit is set at a lighting state of the lighting state 2, the image-projecting light source of the projection-type image display unit is set in the lighting state 4, and then both sources may be turned on as it is.

(2) The illumination light source of the illuminating unit in the lighting state 3 may be smaller in a light amount of the lighting (lower brightness) than the illumination light source of the illuminating unit in the lighting state 2. This is for making a projected image formed by the projection-type image display unit seen more easily. This light amount change process is made possible by the control unit 201 of the illuminating unit 200 of FIG. 3 controlling the light-emitting element drivers.

(3) The lighting of the illumination light source of the illuminating unit in the lighting state 3 may be changed in the number of lighting light-emitting elements in comparison with that of the illumination light source of the illuminating unit in the lighting state 2 (reduction in the number of lighting light-emitting elements). This is also for making the projected image by the projection-type image display unit seen more easily. A process of changing the number of lighting light-emitting elements is made possible by the control unit 201 of the illuminating unit 300 of FIG. 3 controlling the light-emitting element drivers to change the number of driven light-emitting element drivers. For example, some of the plural light-emitting element drivers may be driven while the rest of the light-emitting element drivers may not be driven.

(4) The lighting of the illumination light source of the illuminating unit in the lighting state 3 may be changed so as to have a light distribution characteristic different from that of the lighting of the illumination light source of the illuminating unit in the lighting state 2. Changing the light distribution characteristic means that when the lighting apparatus with the image-projecting function having the layout shown in FIG. 10, FIG. 11, or FIG. 13, etc. can emit beams of illumination light in a plurality of directions, the respective light amounts of beams of illumination light emitted in the plurality of directions are changed. For example, in the lighting state 2, the beams of illumination light in a peripheral direction or a ceiling direction are emitted simultaneously in addition to those in a lower direction. In the lighting state 3, the light amount of beams of illumination light in the peripheral direction or the ceiling direction may be kept as it is or reduced while only the beams of illumination light in the lower direction may be turned off.

In the lighting state 2, beams of illumination light in the peripheral direction or the ceiling direction are emitted simultaneously in addition to those in the lower direction. In the lighting state 3, the light amount of beams of illumination light in the peripheral direction or the ceiling direction is reduced, but the light amount of beams of illumination light in the lower direction may be reduced larger than that of the beams of illumination light in the peripheral direction or the ceiling direction. In the lighting state 2, the beams of illumination light in the lower direction are emitted, and in the lighting state 3, the beams of illumination light in the lower direction are turned OFF while the beams of illumination light in the peripheral direction or the ceiling direction may be turned ON. Even in any of them, a ratio of the light amount of beams of illumination light in the lower direction to those of all the beams of illumination light in the peripheral direction or the ceiling direction and the lower direction in the lighting state 3 is reduced lower than that in the lighting state 2, and thereby the projected image formed by the projection-type image display unit is made to seen more easily.

The process of changing the number of lighting light-emitting elements is made possible so that: light-distribution directions of sets of light-emitting elements controlled by the plurality of light-emitting element drivers are made different from each other in the illuminating unit 200 of FIG. 3; and the control unit 201 controls each light-emitting element driver to vary the brightness and the number of light-emitting elements in the lighting states 2 and 3.

Incidentally, when the light amount or the light distribution characteristic is changed in switching the lighting state 2 to the lighting state 3, the change may be made instantaneously gradually. The gradual changing may make it possible for the user to recognize that operation quality is high as a product in comparison therewith.

Specific examples of switching a plurality of lighting states through the toggle-switching operations in the lighting control examples by the lighting apparatus with the image-projecting function of FIG. 14 will then be described.

FIG. 16(A) is a first toggle-switching operation example. Each of the lighting states described in FIG. 15 may be configured so as to repeat the lighting state 1→lighting state 2→lighting state 4→lighting state 1.

FIG. 16(B) is a second toggle-switching operation example. Even of the lighting states described in FIG. 15 may be configured so as to repeat the lighting state 1→lighting state 2→lighting state 3→lighting state 4→lighting state 1.

FIG. 16(C) is a third toggle-switching operation example. The lighting state 3 of the second toggle-switching operation example may be divided into a plurality of lighting states (patterns 1 and 2) different in light amount, number of lighting light-emitting elements, and light distribution characteristic, and a change therebetween may be made. When the lighting state 3 is divided into the plurality of lighting states different in light amount, number of lighting light-emitting elements, and light distribution characteristic in the third toggle-switching operation example, if the illumination light overlaid on the light projected from the PJ unit is made equal to or lower than that in a state immediately before the state each time the switch is changed, a change in the light amount of illumination light leads naturally to the lighting state 4 of making the illumination light turned OFF, and thus the user hardly has a sense of incongruity about the change.

According to the configurations and control of the lighting apparatus with the image-projecting function according to the one embodiment of the present invention, which have been described in reference to FIGS. 14 to 16, the lighting and extinction of the illumination light source of the illuminating unit and of the image-projecting light source of the projector-type image display unit can be changed preferably, and this makes the lighting apparatus convenient for the user.

Next, an interactive function of the lighting apparatus with the image-projecting function according to the one embodiment of the present invention (which, for simpler explanation, may be simply referred to as "lighting apparatus" below will then be described using FIG. 17. In the following description, the interactive function unit 120 may be referred also to as a control unit that controls the interactive function.

When the operation detecting sensor 350, which is used for the interactive function unit 120 of the lighting apparatus 10 (300) with the image-projecting function, is a type of sensor that emits sensing emission light (operation-detecting emission light) for detecting the user's operation, the lighting apparatus 300 emits, onto the image projection surface 61, three kinds of light of: image-projecting light 1701 from the projection-type image display unit 100; illumination light 1702 of the illuminating unit 200; and sensing emission light 1703 for the operation detecting sensor. To make the image-projecting function of the projection-type image display unit 100, the illumination function of the illuminating unit 200, and the interactive function of the interactive function unit 120 compatible with one another, the wavelengths of the above three kinds of light must be devised in the following manner.

For example, if the image-projecting light 1701 from the projection-type image display unit 100 does not include a visible light component, a person cannot visually recognize an image. If the illumination light of the illuminating unit 200 does not include a visible light component, a person cannot perceive its brightness. If the sensing emission light 1703 for the operation detecting sensor 350 includes a visible light component, on the other hand, the sensing emission light 1703 becomes an obstacle in viewing the image projected by the projection-type image display unit 100. For this reason, by light having passed through an optical filter that cuts wavelengths in the visible light range or by a light source that locally emits light with a wavelength in the non-visible light range (light source with a biased wavelength range such as an LED and laser), the sensing emission light 1703 for the operation detecting sensor 350 should use light that has less influence on the visible light wavelength range and that mainly has the non-visible light wavelength range such as infrared rays.

Next, if the operation detection function is considered, the operation detecting sensor 350 needs to have a sensor that is difficult to be affected by visible light and that targets sensing light mainly having the non-visible light wavelength range. For example, when an image-capturing element that can image even visible light and that has a wide wavelength range is used in the operation detecting sensor 350, the operation detecting sensor 350 may have an optical filter that cuts wavelengths in the visible light range on a light-receiving path light-receiving by the image-capturing element. Even when the operation detecting sensor 350 is configured as a sensor that targets the sensing light mainly having the non-visible light wavelength range, there is a fear of deterioration in the operation detection function such as an increase in wrong detection if influences on the image-projection light 1701 from the projection-type image display unit 100 and illumination light 1702 of the illuminating unit 200 are large.

The image-projection light 1701 from the projection-type image display unit 100 and the illumination light 1702 of the illuminating unit 200, therefore, need to be reduced in their light amounts in the non-visible light wavelength range. For this reason, the projection-type image display unit 100 may have an optical filter, which cuts off or reduces the wavelength having the non-visible light range, at any position on an optical path of the optical system in the projection-type image display unit 100, or use a light source that emits light with a biased wavelength range such as an LED and laser as the light source 105 of the projection-type image display unit 100 to realize the image-projection light 1701 whose amount in the non-visible light wavelength range is extremely small.

The illumination light 1702 of the illuminating unit 200 also needs to be reduced in the light amount in the non-visible light wavelength range. The illuminating unit 200 may be configured so as to have an optical filter function of cutting off or reducing the wavelength in the non-visible light range, at any position before the light emitted from the illumination light source is changed into the illumination light 1702, by causing the diffusing panel 12 to be subjected to a reflective film coating etc. that cuts the wavelength in the non-visible light range. Or, a light source with a biased wavelength range such as an LED and laser may be used as the light-emitting element of the illuminating unit 200 to realize the illumination light 1702 whose amount in the non-visible light wavelength range is extremely small.

According to the above configuration, regarding a relation among the sensing emission light 1703 for the operation detecting sensor 350, the image-projecting light 1701 from the projection-type image display unit 100, and the illumination light 1702 of the illuminating unit 200, whose three kinds are outputted to the maximum, the light amount of the sensing emission light 1703 for the operation detecting sensor 350 may be made the maximum among those of three kinds in a wavelength range to which the operation detecting sensor 350 is sensitive (e.g., the wavelength range of light to which the operation detecting sensor 350 is sensitive can be defined based on a 50%-cut-wavelength of the optical filter that the operation detecting sensor 350 has). In this manner, it is preferable that the sensing emission light 1703 for the operation detecting sensor 350, the image-projecting light 1701 from the projection-type image display unit 100, and the illumination light 1702 of the illuminating unit 200 have respective different wavelength distribution characteristics depending on their differences in use.

The wavelength range to which the operation detecting sensor 350 is sensitive, and the wavelength characteristics of the sensing emission light 1703 for the operation detecting sensor 350, the image-projecting light 1701 from the projection-type image display unit 100, and the illumination light 1702 of the illuminating unit 200 are thus set in the above manner. This allows providing the lighting apparatus 300 in which the image-projecting light 1701 from the projection-type image display unit 100 has high visibility; the illumination function of the illuminating unit 200 works preferably; and the operation detection function of the operation detecting sensor 350 works preferably.

A more preferable example to a user about a relation among irradiation areas (irradiation angles) of the above three kinds of light will then be described. In making the irradiation area of the image-projecting light 1701 from the projection-type image display unit 100 an criterion, the irradiation area of the sensing emission light 1703 from the operation detecting sensor 350 should be set to be wider than the irradiation area of the image-projecting light 1701 from the projection-type image display unit 100. This is because an operation detection range for the interactive function preferably covers the whole range of the projected image from the projection-type image display unit 100, and detecting the user's operation in an outside area of the projected image further increases a degree of freedom of the user's operation.

In contrast, to realize the illumination function of the illuminating unit 200 as a function of illuminating a room, it is preferable to be set to be wider than the irradiation range of the sensing emission light 1703 for the operation detecting sensor 350 and the irradiation range of the image-projecting light 1701 from the projection-type image display unit 100. This, however, does not apply to a case where the illumination function of the illuminating unit 200 is limited to a so-called spot light function.

The ON/OFF control for changing an active state/non-active state of the interactive function will then be described. The lighting ON/OFF control of the projection-type image display unit 100 and the lighting ON/OFF control of the illuminating unit 200 have been described referring to FIGS. 14, 15, and 16. In contrast, when the lighting apparatus 300 has the interactive function 120 using the operation detecting sensor 350, an interface that can be operated by the user about ON/OFF of action of the interactive function 120 using the operation detecting sensor 350 is desirably provided anywhere in the system independent of the lighting ON/OFF operation of about the projected image of the projection-type image display unit 100 and the lighting ON/OFF operation of the illuminating unit 200.

An example of it will be described referring to FIG. 18A. For example, a remote controller 1801, which can transmit an operation signal to the operation signal input unit 301 of the lighting apparatus 300, is provided with a lighting ON/OFF operation button of the illuminating unit 200 and a lighting ON/OFF operation button of the projected image of the projection-type image display unit 100, and also a moving ON/OFF operation button of the interactive function 120 using the operation detecting sensor 350 may be provided independent of the above. As arrangement examples of these buttons on the remote controller 1801, an arrangement example 1802 and an arrangement example 1803 are shown. The arrangement example 1802 is an example in which each ON/OFF function button works as a toggle switch.

The arrangement example 1803 is an example in which ON buttons and OFF buttons are independently operated about respective ON/OFF functions. Incidentally, these buttons may be configured as physical buttons on the remote controller 1801, or as software buttons displayed on the display screen that functions as a touch panel on the remote controller 1801. Incidentally, keys, buttons, or a touch detection area 1804 corresponding to these three ON/OFF functions may be provided on its body side.

While both of the illumination light 1702 of the illuminating unit 200 and the image-projecting light 1701 of the projection-type image display unit 100 are mainly composed of visible light, the sensing emission light 1703 of the operation detecting sensor 350 used by the interactive function 120 is composed of non-visible light such as infrared rays, and so the user is difficult to judge whether the interactive function 120 is in an ON state or OFF state based on the sensing emission light. It is desirable, for this reason, that an indicator 1805 distinguishing an ON state and OFF state about the action of the interactive function 120 is located on the body side of the lighting apparatus 300.

Described using FIG. 18 will be a relation among: the respective operation buttons shown by FIG. 18A in the system according to this embodiment; the sensing emission light and start/finish actions of operation detection for the operation detecting sensor 350 by the interactive function 120; a lighting mode of the illuminating unit 200; and a lighting mode about the projected image of the projection-type image display unit 100. In Figure, operation processes based on operation of respective buttons are indicated by the left end column. In frames of the other respective columns, actions of the respective functions corresponding to the respective operation processes are shown. "State continuity" means that the action of each function does not change partially by the operation process.

For example, first, when an "ON" process by an operating button A for the interactive function is performed, the sensing emission light of the operation detecting sensor 350 is turned ON, and the operation detection by the operation detecting sensor 350 is started. However, the lighting state for the projected image of the projection-type image display unit 100 and the lighting state of the illuminating unit 200 are continued as they are. For example, an "OFF" process by the operation button A for the interactive function is performed, the sensing emission light of the operation detecting sensor 350 is turned OFF, and the operation detection is finished. However, the lighting state for image projection of the projection-type image display unit 100 and the lighting state of the illuminating unit 200 are continued as they are.

This configuration allows the user to change ON/OFF of the interactive function only by operating the button A and continue the lighting state for the projected image of the projection-type image display unit 100 and the lighting state of the illuminating unit 200 as they are. At this time, it also becomes possible that the interactive function only is in the ON state, the lighting state for the projected image of the projection-type image display unit 100 is kept in the OFF state, and the lighting state of the illuminating unit 200 is kept in the OFF state. Subsequently, the user can turn ON the lighting state for the projected image of the projection-type image display unit 100 and the lighting state of the illuminating unit 200 by the gesture operation for the operation detecting sensor 350 or a contact (touch) operation onto the operation surface, and so this is convenient for the user.

Next, for example, when an "ON" process is performed by an operation button B for the illuminating unit, the lighting state of the illuminating unit 200 becomes in the ON state. At this time, a state of the sensing emission light for the operation detecting sensor 350, and a state of the operation detection by the operation detecting sensor 350 may be continued as they are. The lighting state for the projected image of the projection-type image display unit 100 may be structurally continued as it is, but the lighting state for the projected image of the projection-type image display unit 100 may be configured, as a modification mode, so as to be in the OFF state. This configuration is premised on such an action that when the user turns ON the lighting state of the illuminating unit 200, viewing of the image projected by the projection-type image display unit 100 is finished and the room is lit up.

Also, for example, when an "OFF" process is performed by the operation button B for the illuminating unit, the lighting state of the illuminating unit 200 becomes in OFF state, but the state of the sensing emission light for the operation detecting sensor 350, the state of the operation detection by the operation detecting sensor 350, and the lighting state for the projected image of the projection-type image display unit 100 are continued as they are. The illumination function is sufficient if a user's request for lighting up or not lighting up such an illumination target as the room and the table, etc. is reflected. Therefore, the operation button B for the illuminating unit is sufficient if the illumination function can be operated, and there arises no problem even if the operation detecting sensor 350 or the projection-type image display unit 100 cannot be operated.

However, a plurality of ON states may be configured so as to be changed according to the number of times of pushing down the operation button B for the illuminating unit. This is, depending on the number of times of pushing down the operation button B for the illuminating unit, the light amount, the number of lighting light-emitting elements, and the light distribution characteristics may be structurally made changeable as described in the modification modes of the lighting state 3 of FIG. 15 about the ON state.

Next, for example, when an "ON" process is performed by an operation button C for the projection-type image display unit, the lighting state for the projected image of the projection-type image display unit 100 becomes in the ON state. At this time, the lighting state of the illuminating unit 200 may be continued as it is. As for the state of the sensing emission light for the operation detecting sensor 350 and the operation detection by the operation detecting sensor 350 may be configured so as to be continued as they are at that time. As a modification mode, however, it may be configured so that the sensing emission light of the operation detecting sensor 350 is turned ON, and the operation detection by the operation detecting sensor 350 is started.

When the projection-type image display unit 100 projects the image, an operation through the interactive function 120 based on the operation detection by the operation detecting sensor 350 facilitates an operation by the user. Starting the operation detection by the operation detecting sensor 350 in synchronization with turning ON of the lighting state for the projected image of the projection-type image display unit 100 becomes convenient for the user.

Also, for example, when the "OFF" process is performed by the operation button C for the projection-type image display unit, the lighting state for the projected image of the projection-type image display unit 100 is turned OFF. At this time, the lighting state of the illuminating unit 200 may be continued as it is. The state of the sensing emission light for the operation detecting sensor 350 and the operation detection by the operation detecting sensor 350 may be configured so as to be continued as they are at that time. In this case, if the state of the operation detection by the operation detecting sensor 350 is in the ON state, the operation detection continues even after the lighting state for the projected image of the projection-type image display unit 100 is turned OFF. Therefore, a process etc. of returning to the ON state of the lighting state for the projected image of the projection-type image display unit 100 through the operation detection by the operation detecting sensor 350 also become possible.

Also, as a modification mode, when the "OFF" process is carried out by the operation button C for the projection-type image display unit, the sensing emission light of the operation detecting sensor 350 may be turned OFF simultaneously therewith, and the operation detection for the operation detecting sensor 350 may be structurally finished. This configuration is premised that the operation detecting sensor 350 carries out its operation detection only when the lighting state for the projected image of the projection-type image display unit 100 is in the ON state.

As described above, the operation button C for the projection-type image display unit may be structurally performed so as to make the lighting state for the projected image of the projection-type image display unit 100 operatable independent of the lighting state of the illuminating unit 200 and the state for the sensing emission light of the operation detecting sensor 350 and the state of the operation detection by the operation detecting sensor 350. As a modification mode, however, a change of the lighting state for the projected image of the projection-type image display unit 100 may be structurally made in connection with a process of changing the state of the sensing emission light for the operation detecting sensor 350 and the state of the operation detection by the operation detecting sensor 350.

Configuration examples of the operation detecting sensor 350 will then be described referring to FIG. 19.

Figure 19A:
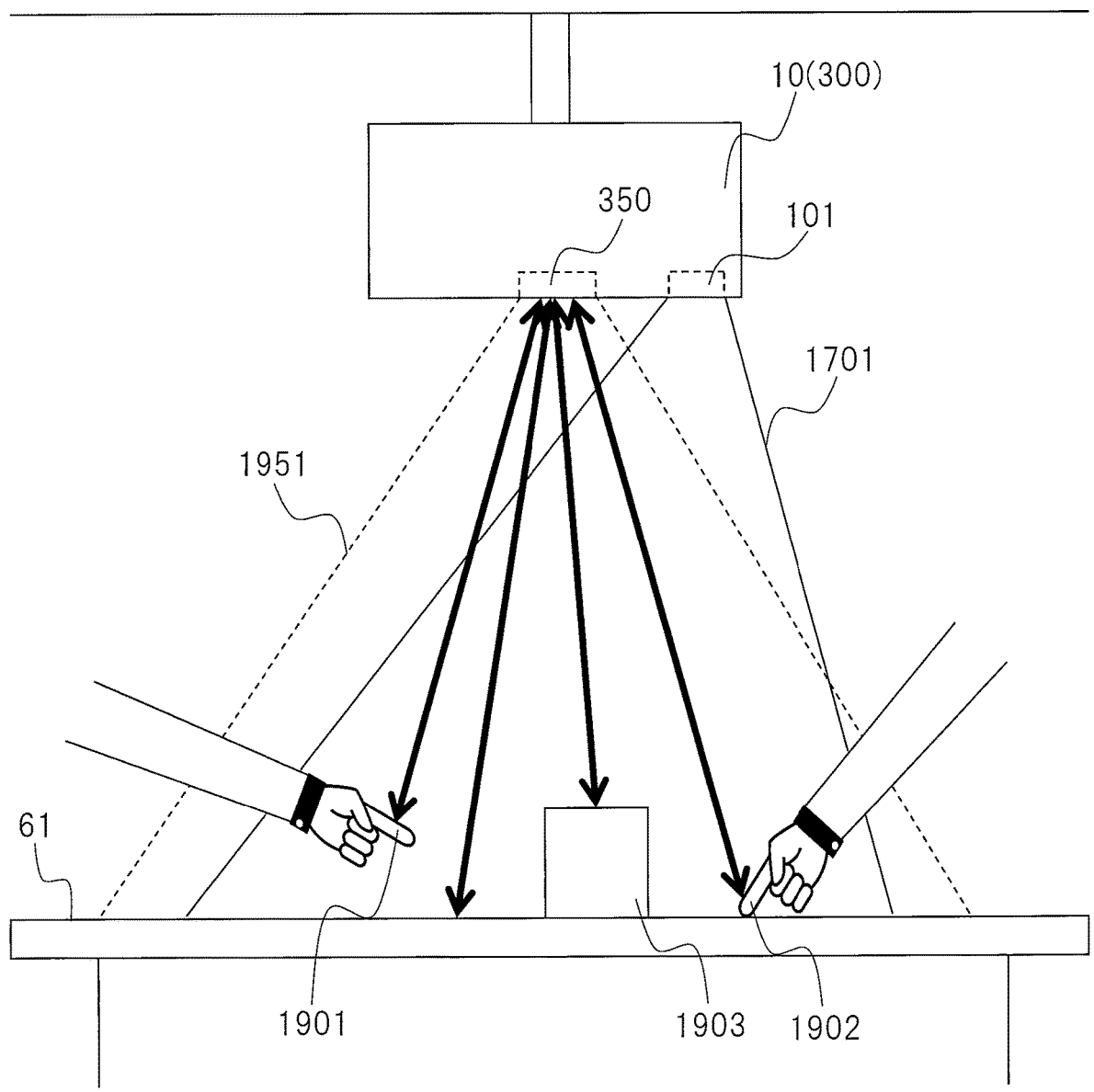
FIG. 19A is an explanatory view of an example about the interactive function of the lighting apparatus according to the present invention.

Explained in FIG. 19A will be a configuration example in which the operation detecting sensor 350 is composed of a combination of a TOF (Time of Flight) method distance sensor and an image-capturing sensor. The TOF (Time of Flight) method is a method of scanning a light beam and measuring a distance is determined based on a difference with a returning time of reflection light. In the example of FIG. 19A, to make Figure seen easily, such an example will be explained that an aperture of the projection optical system 101 is arranged in a lower right part of the lighting apparatus 10, and an aperture of the operation detecting sensor 350 is arranged near its center at a lower part of the lighting apparatus 10. The operation detecting sensor 350 runs scanning with non-visible light beams emitted from its apertures, and measures distances from the aperture of the operation detecting sensor 350 to the table surface 61 as an image projection surface, a user's finger 1901 or 1902, and a surface 1903 put on the table. A scanning range of the non-visible light beam is illustrated in Figure as a range of sensing emission light 1951.

Arrows within the range of the sensing emission light 1951 shown in Figure represent routes of emission and reflection of the scanning non-visible light beam. The non-visible-light image-capturing sensor takes an image through the non-visible light sensing, recognizes a finger shape by a process such as pattern matching, and thereby identifies a horizontal position of a tip of an operation object 1901 or 1902 such as a finger. Because a vertical position (height) of the tip of the operation object 1901 or 1902 can be calculated based on information from the distance sensor, the contact (touch) to the image projection surface 61 by the user's finger 1902 and its position can be identified.

Because the vertical position (height) of the tip of the finger 1901 or 1902 can be calculated based on information from the distance sensor, an aerial gesture, etc., made in a range of a height of 15 cm to 25 cm from the table surface 61 can be also recognized.

Figure 19B:
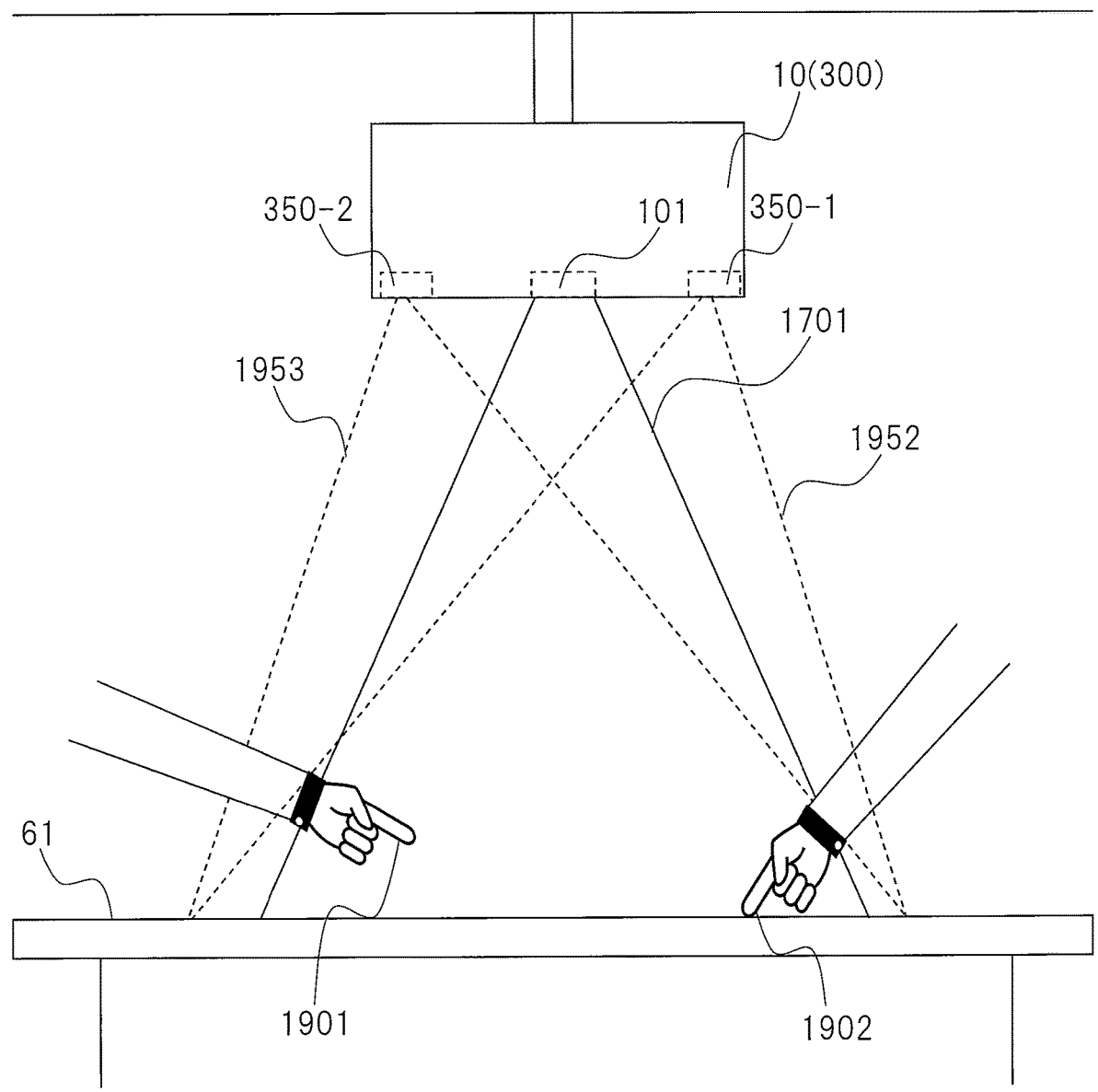
FIG. 19B is an explanatory view of an example about the interactive function of the lighting apparatus according to the present invention.

In FIG. 19B, explained will be a configuration example in which the operation detecting sensor 350 is configured by combining a plurality of sensing light sources and the image-capturing sensor. In an configuration of Figure, to make Figure seen easily, such as an example will be explained that the aperture of the projection optical system 101 is arranged near its center at the lower part of the lighting apparatus 10.

Figure 19C:
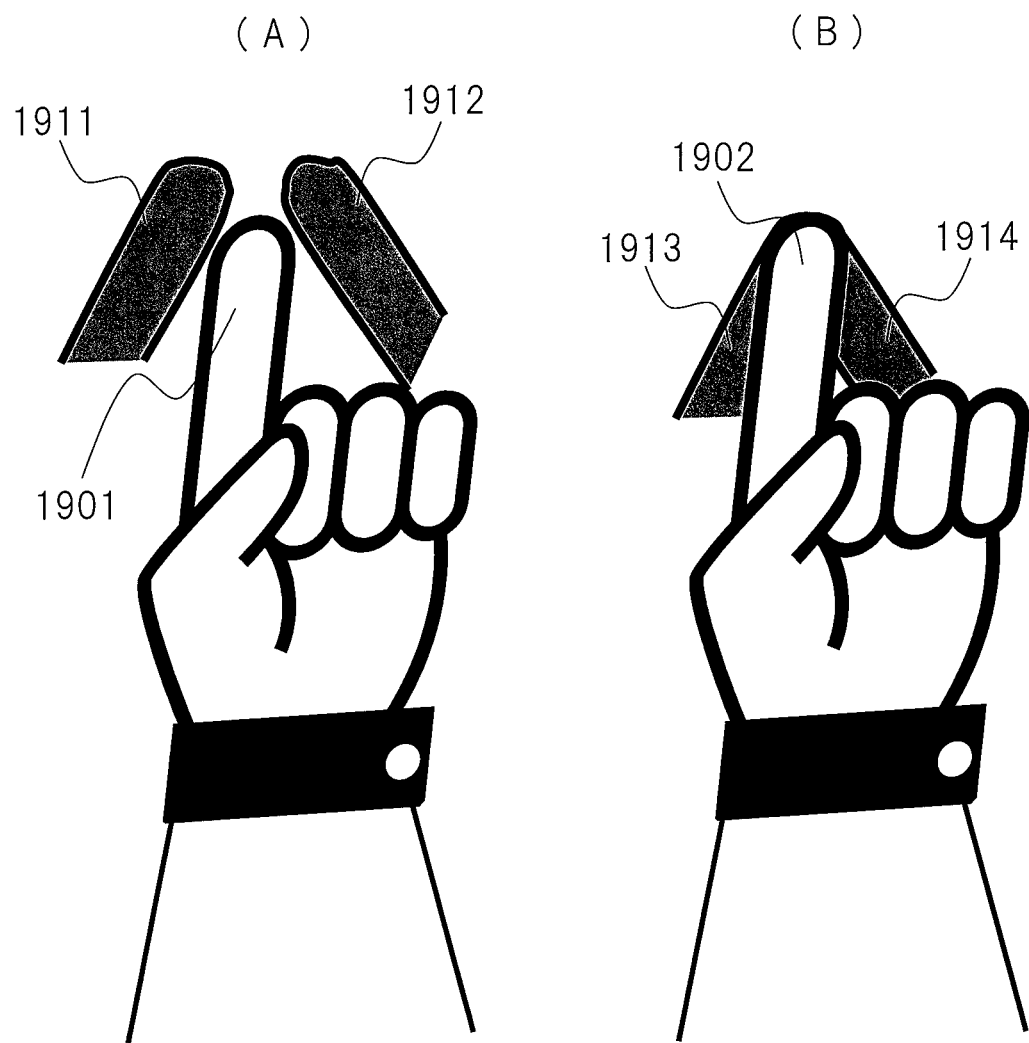
FIG. 19C is an explanatory view of an example about the interactive function of the lighting apparatus according to the present invention.

For example, two non-visible light sources 350-1 and 350-2 are provided as an example of the plurality of sensing light sources. These non-visible light sources 350-1 and 350-2 emit beams of non-visible light 1952 and 1953 different in angel onto the operation object surface 61. In this manner, by emitting a plurality of light beams from different angles, a plurality of shadows of a user's single finger, which is the operation object, on the operation surface as shown in FIG. 19C. The non-visible-light image-capturing sensor takes an image about such an operation object surface 61 on which the plurality of shadows are created.

In FIG. 19C, explained will be a distance between the user's finger that is the operation object and the operation surface (display surface 61), and states of the plurality of shadows. For example, the operation detecting sensor 350 may be configured as the non-visible-light image-capturing sensor to take the image. FIG. 19C(A) is in a state in which the user's finger 1901 is near the operation surface 61, but is not in a contact therewith. In this case, two shadows 1911 and 1912 are separated from the tip of the user's finger 1901. FIG. 19C(B) is, on the other hand, in a state in which the user's finger 1902 is in contact with the operation surface 61. In this case, two shadows 1913 and 1914 overlap the tip of the user's finger 1902. By an image analysis process, a contact state between the tip of the user's finger and the two shadows is differentiated, and contact or non-contact to the operation surface 61 by the user's finger and a position of the contact can be detected. Even when the user's finger is not in contact with the operation surface 61 and remains in the air, the distance between the user's finger and the operation surface 61 can be calculated based on the distance between respective tips of the two shadows, which is obtained by the image analysis process.

FIG. 19D is, on the upper surface 61 of the table 60 etc., an example of: a range 1 of the image-projecting light 1701 from the projection-type image display unit 100; an irradiation range 2 of the illumination light 1702 from the illuminating unit 200; and an operation detection range 1950 of the operation detecting sensor 350 (an irradiation range of the sensing light 1703 or a range in which the irradiation range overlaps an image-capturing range of the image-capturing sensor provided to the operation detecting sensor 350).

By setting the operation detection range 1950 of the operation detecting sensor 350 to be a wider range including the range 1 of the image-projecting light 1701 from the projection-type image display unit 100, the whole range of the image projected from the projection-type image display unit 100 can be defined as a range for detection of a user operation 1921, and further a user operation 1922 outside the range of the image projected from the projection-type image display unit 100 can be also detected.

Incidentally, the irradiation range 2 of the illumination light 1702 from the illuminating unit 200 is not limited to the example shown in this Figure, and may be set in any desirable manner. This Figure illustrates an example of so-called spot light illumination in which the irradiation range is narrow. The irradiation range may be set at a wider angle so that the whole of the room is set as the irradiation range.

Next, described using FIG. 20 will be a process in which the interactive function of the projection-type image display unit 100 detects an operation carried out by an operation object (e.g., user's finger) on the operation surface with respect to an operation menu displayed in a projected image using the operation detection function of the operation detecting sensor 350.

FIG. 20A displays an operation menu 2000 in a projected image, and is an example of displaying, in the operation menu 2000, a "Light ON" icon 2001 for an operation of lighting the illumination light of the illuminating unit 200, and a "Light OFF" icon 2002 for an operation of extinguishing the illumination light of the illuminating unit 200. Using the operation detection function of the operation detecting sensor 350, the interactive function unit 120 of the projection-type image display unit 100 detects approach of contact (touch) of the user's finger 2011 or 2012 onto these icons, and thereby can realize the respective operations.

More detailed explanation will be added as follows. That is, the menu 2000 and icons 2001 and 2002 for the interactive operations are generated by the interactive function unit 120 of the projection-type image display unit 100 and may be superposed on an image to be displayed by the display element 102. The interactive function unit 120 has a clear grasp of the ranges of the operation icons 2001 and 2002 in the image, and therefore can judge whether the approach or contact (touch) onto the operation surface 61 by the user's finger 2011 or 2012 is made within an operation target range of the operation icon 2001 or 2002. By such a series of processes, a selection process of the operation icon 2001 or 2002 is realized.

Figure 20B:
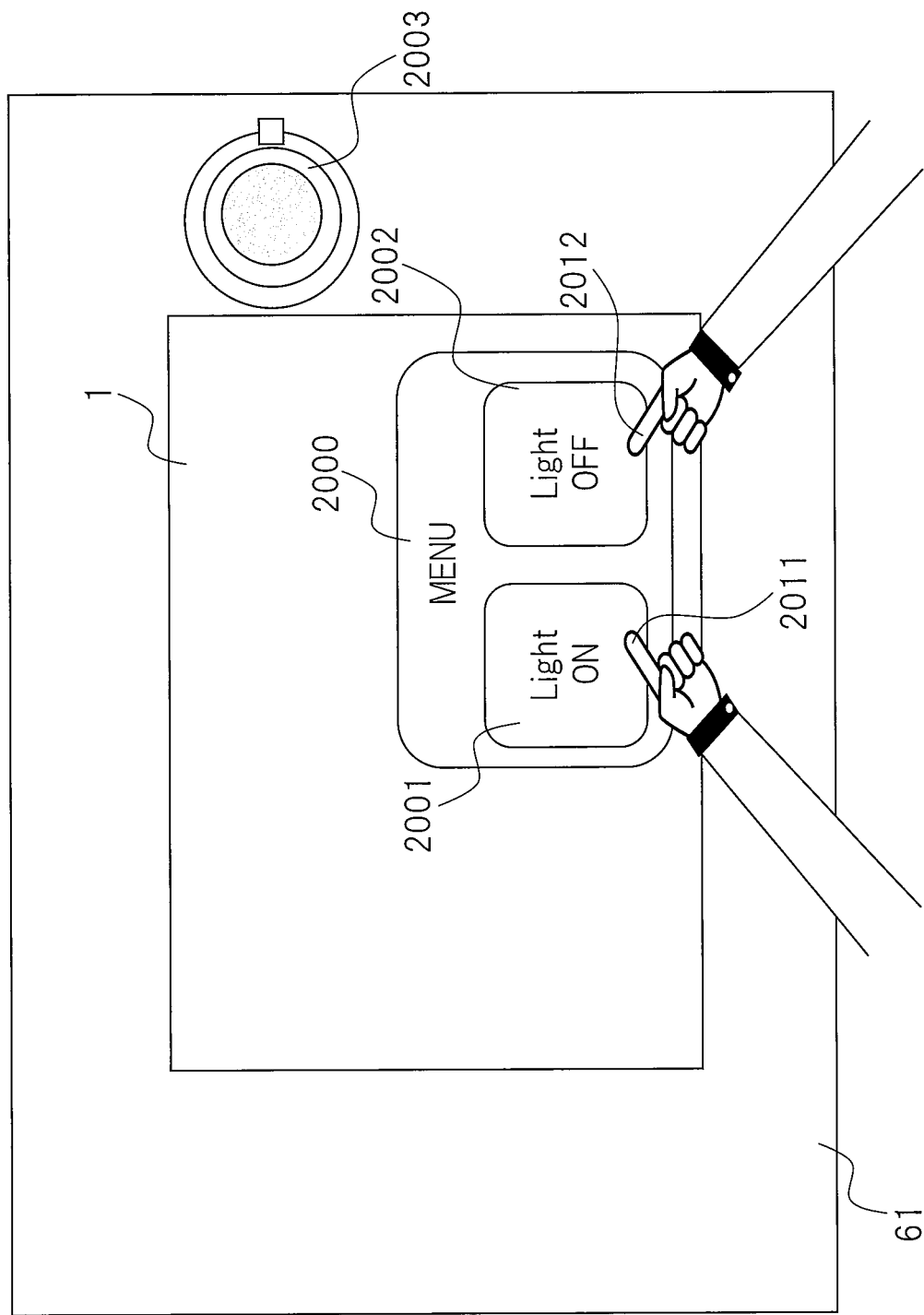
FIG. 20B is an explanatory view of an example about the interactive function of the lighting apparatus according to the present invention.

Here, it is assumed that an object 2003 is placed on the table surface 61 as shown in FIG. 20B. In FIG. 20B, shown is an example in which the object 2003 is a tea cup. As shown in FIG. 20B, if the object 2003 is at such a position as not to overlap the "Light ON" icon 2001 or "Light OFF" icon 2002 on the operation menu 2000, this does not affect a detection process of a user operation such as a finger touch or finger approach 2011 or 2012 using the operation detection function of the operation detecting sensor 350.

Figure 20C:
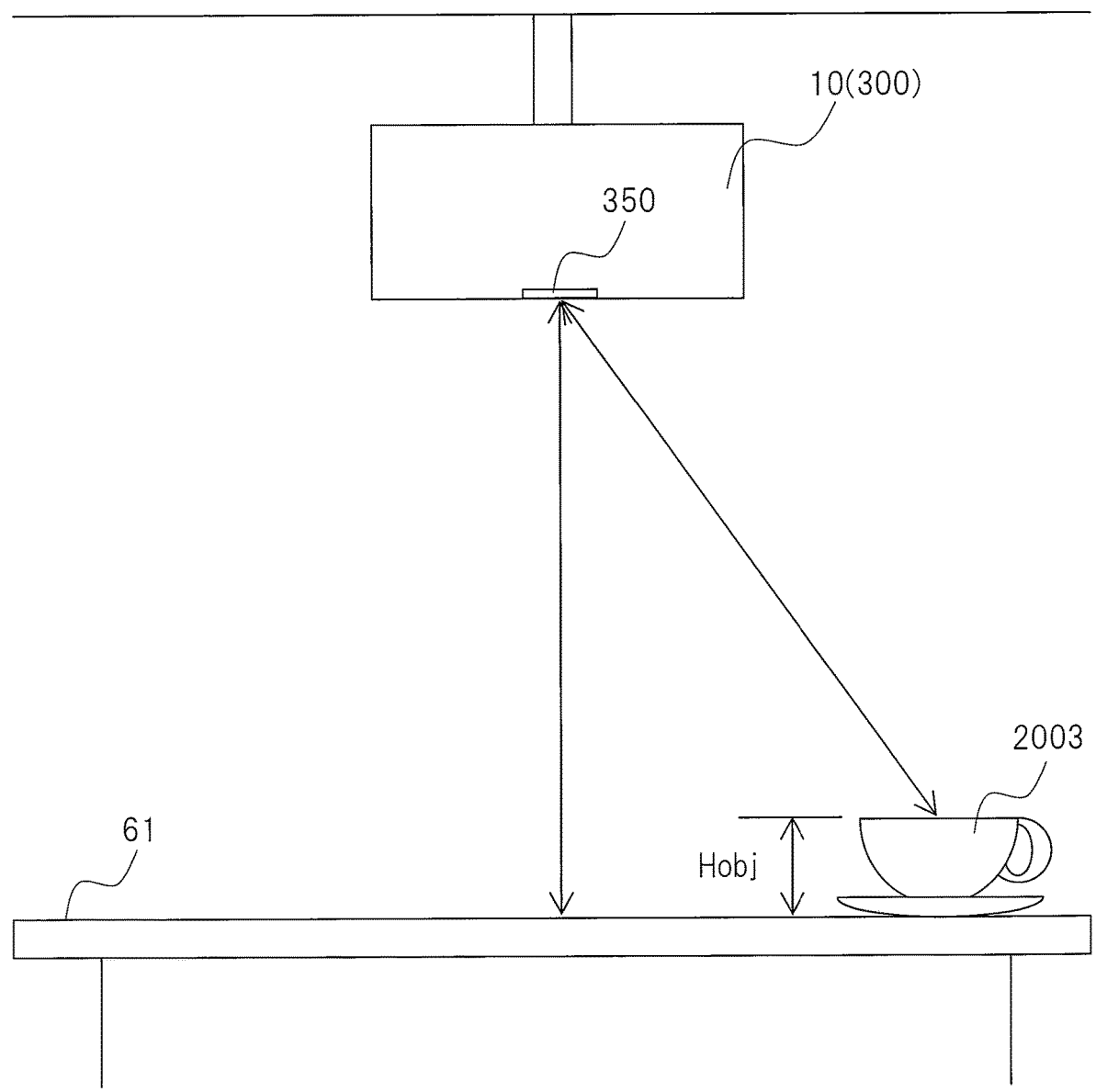
FIG. 20C is an explanatory view of an example about the interactive function of the lighting apparatus according to the present invention.
Figure 20F:
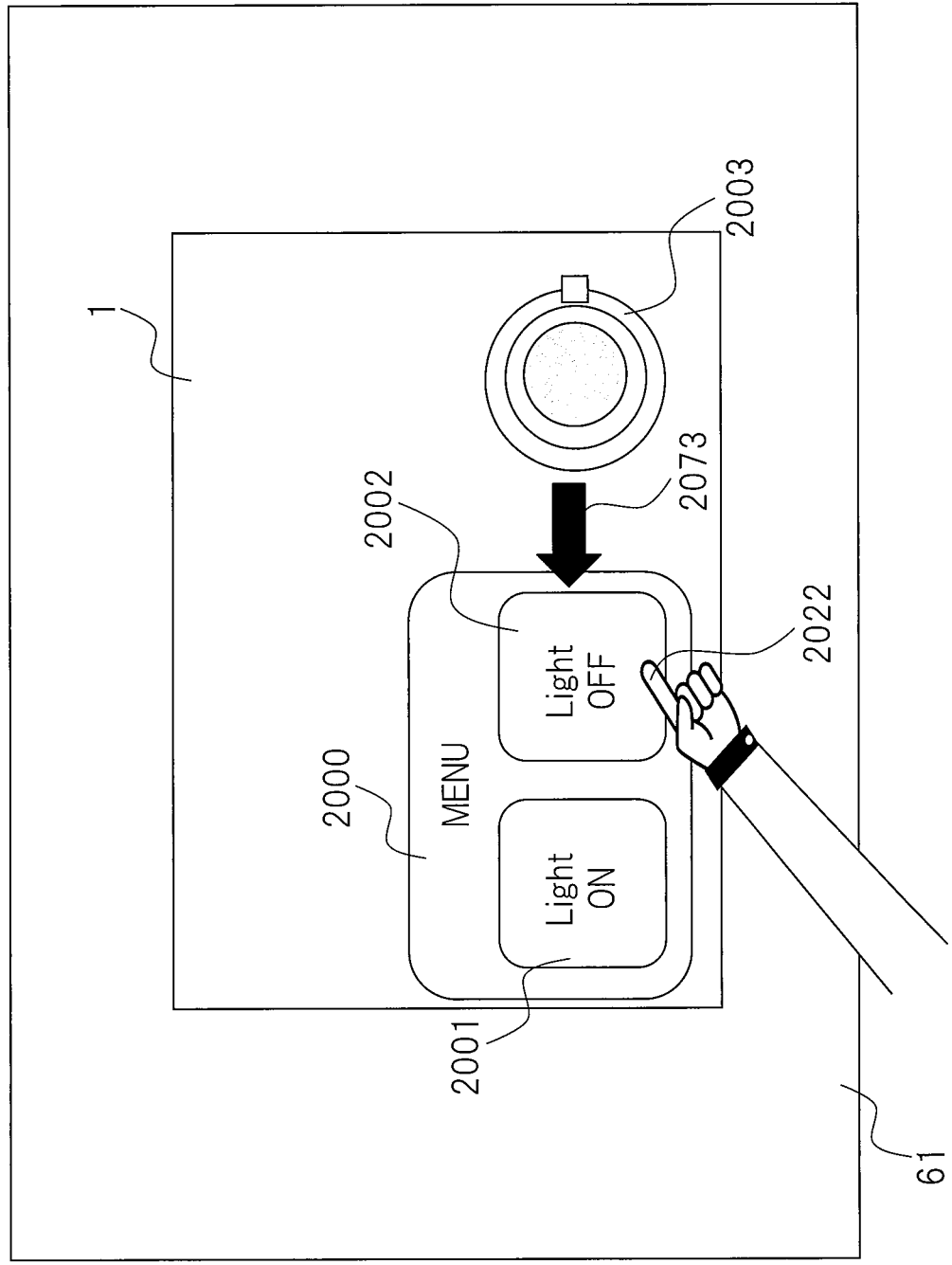
FIG. 20F is an explanatory view of an example about the interactive function of the lighting apparatus according to the present invention.

As shown in FIG. 20C, for example, the object 2003 that is a tea cup has a thickness Hobj to a certain extent from on the table surface 61, and the tea cup 2003 contains a liquid, such as tea. It is expected that the purpose of image projection onto the table surface 61 is highly frequent as use and intended use of the lighting apparatus 10 (300) with the image-projecting function. For this reason, it is expected that this situation is likely to happen.

At this time, as shown in FIG. 20D, it is assumed that somebody has moved the object 2003 as a tea cup at such a position as to overlap the "Light OFF" icon 2002 on the operation menu 2000 as indicated by an arrow 2071. In this case, the "Light ON" icon 2001 on the operation menu 2000 can be operated by the finger touch or finger approach operation 2011. However, the liquid such as tea is present in the "Light OFF" icon 2002 overlaid with the object 2003, and so the user cannot carry out the finger touch or finger approach operation to the icon.

Therefore, the lighting apparatus with the image-projecting function according to the present embodiment may be configured so as to have a function of moving automatically the whole menu including the operation icons in a given direction without the user's operation as indicated by an arrow 2072 in FIG. 20E when the object overlaps the operation icon 2002 on the display surface 61 and difficulty in the operation is detected as shown in FIG. 20D. By this configuration, the "Light OFF" icon 2002 difficult to operate at a menu position shown in FIG. 20D can be also operated by a finger touch or finger approach operation 2021. Incidentally, in the example of FIG. 20E, the whole operation menu is moved to another position, but may be moved to another position for each menu.

The above process of moving the menu or the icon can be realized in the following manner.

As described by FIG. 19, first, the operation detecting sensor 350 can acquire information on relative height of such an object as the finger 1901, finger 1902, and substance 1903 with respect to the display surface 61. The operation detecting sensor 350 can acquire also information on height of the object 2003, which is not the operation object as shown in FIG. 20C similarity thereto. Based on the height information acquired by the operation detecting sensor 350, the interactive function unit 120 of the projection-type image display unit 100 judges a part, which has a height of a given value or more (e.g., 2 cm or more) for a given time or longer (e.g., 30 seconds or longer), to be an area of an operation blocking object that is different from the operation object and that blocks the operation. For example, in the example of FIG. 20D, if the tea cup is kept placed at the same position for the given time or longer (e.g., 30 seconds or longer), an area of the tea cup 2003 is judged to be an area of the operation blocking object.

The interactive function unit 120 may be further structured as so to calculate an occupying ratio of an overlapping portion in the area of the operation blocking object occupied by the area of the operation icon 2001 or 2002, and to start a process of moving the whole menu 2000 including the operation icon 2001 or 2002 or the menu 2000 when the calculated ratio is over a value equal to or higher than a given value (e.g., 70%).

Regarding a moving direction, in the example of FIG. 20E, the display screen is moved in an upward direction as indicated by an arrow 2072. However, as indicated by an arrow 2073 in FIG. 20F, the display screen may be moved in a left-hand direction. In this case, the operation of the "Light OFF" icon 2002 can be performed through a finger touch or finger approach operation 2022. The above moving direction may be determined to be a preset direction. If the operation detecting sensor 350 makes a height map from on the table surface 61 and keeps updating the map, a direction in which the area of the operation detecting sensor 350 is small can be judged at a moving-start time. Thus, the moving direction may be determined in the direction in which the operating blocking object 2003 is small based on the judged result.

A moving process itself may be performed so that the interactive function unit 120 consecutively changes the positions of the images of the operation icons 2001 and 2002 and/or menu 2000 superposed on the image displayed by the display element 102, and inn addition to this change process, consecutively changes the operation target ranges of the operation icons 2001 and 2002.

It is preferable that an ending process of moving the operation icons 2001 and 2002 and/or menu 2000 is finished in a state of cancelling sufficiently the overlapping areas of the operation icons 2001 and 2002 and/or menu 2000 and the operation blocking object 2003. This is because that an influence on the operation blocking object 2003 should not remain as much as possible about the user's operation of the moved operation icons 2001 and 2002 and/or menu 2000.

To realize this, several process examples are conceived about the ending process of moving the operation icons 2001 and 2002 and/or menu 2000.

A first process example is a process of moving the operation icons 2001 and 2002 and/or menu 2000 to an end in the area of the projected image in the above moving direction. According to this process example, the operation icons 2001 and 2002 and/or menu 2000 are moved to the furthest positions from the operation blocking object 2003 which has brought cause of a moving start, and the process is finished. This process example is the simplest process that offers a relatively high effect of avoiding the operation blocking object.

A second process example is an example in which during the process of moving the icon or menu, the interactive function unit 120 repeatedly calculates the occupying ratio of the overlapping area of the operation blocking object 2003 occupied in the area of the operation icon 2001 or 2002, and finishes the movement when the ratio of the overlapping area becomes equal to or smaller than a threshold (e.g., equal to or smaller than 10%). In this case, if the threshold for the ratio of the overlapping area is set to a value larger than 0%, the overlapping area of the operation icons 2001 and 2002 and/or menu 2000 and the operation blocking object 2003 partially remains. However, since an operable range is partially recovered, recovery of the user operation function can be realized as moving amounts of the operation icons 2001 and 2002 and/or menu 2000 are reduced. When the threshold for the ratio of the occupying area is set to 0%, the moving process is finished with the operation icon or menu being adjacent to the area of the operation blocking object.

A third process example is an example in which the second process example of setting the ratio for the overlapping area to 0% is further improved. That is, when the moving process is finished with the operation icons 2001 and 2002 and/or menu 2000 being adjacent to the area of the operation blocking object 2003, there is a possibility that the operation blocking object 2003 hampers the user's operation because remaining close to the operation icons 2001 and 2002 and/or menu 2000. Therefore, in the third process example, the ratio of the overlapping area of the operation blocking object 2003 occupied in the area of the operation icon 2001 or 2002 is calculated repeatedly during the process of moving the icon or menu in a given direction; even after the ratio of the overlapping area reduces to 0%, an additional moving distance is set; and after the moving process is continued to the additional moving distance in the same direction, the moving process is finished.

As a calculating examples of the additional moving distance, the length of the whole image in the above moving direction may be multiplied by a given rate (e.g., 5%), or by a given number of pixels (e.g., 150 pixels), or the size of the operation icon 2001 or 2002 (or menu 2000), which is a target to be moved, may be multiplied by a given rate (e.g., 50%). In the third process example as a result, the operation icons 2001 and 2002 and/or menu 2000 are further moved continuously in the above moving direction from a state adjacent to the area of the operation blocking object 2003, and when the operation icons 2001 and 2002 and/or menu 2000 are in states distant from the area of the operation blocking object 2003 and are between ends in the area of the projected image in the above moving direction, the process is finished (when the ends in the area of the projected image in the moving direction are close to each other, the process is finished after movement to the ends in the area of the projected image in the above moving direction).

Thus, in the third process example, a gap having a distance equivalent to the above additional moving distance is provided between the operation blocking object 2003 and the operation icons 2001 and 2002 and/or menu 2000, and a possibility that the operation blocking object 2003 hampers the user's operation is reduced. The third process example does not require a change of the positions of the operation icons 2001 and 2002 and/or menu 2000 to an extreme extent in comparison with the first process example, and the user's sense of incongruity can be also reduced.

Thus, using FIG. 20, described has been the process that the interactive function of the projection-type image display unit 100 uses the operation detection function of the operation detecting sensor 350 to detect the operation by the operation object such as the user's finger on the operation surface with respect to the operation icon or menu displayed in the projected image. The process of automatically moving the operation icon or menu when the operation blocking object overlaps the operation icon or menu in the projected image has been described. By the above-descried process examples, even if the operation blocking object is placed on the operation surface, a situation where the user can continue the operation of the interactive function can be provided.

Incidentally, the above examples may have a function of allowing the user to manually perform the moving process of the operation icon or menu through the remote controller, and an operation signal input unit 301, etc. The user may move the operation icon or menu to a further desirable position when the operation blocking object is not present, and after finishing of the above automatically moving process, the user may move the operation icon or menu to a further desirable position when the operation blocking object is present.

Another example of dealing with the above "operation blocking object" about the interactive function will then be described referring to FIG. 21.

FIG. 21A describes an example of using the operation detecting sensor 350 for the interactive function unit 120 to separately recognize an contact operation 2111 of an operation object such as the user's finger onto the image projection surface 61 and an aerial operation 2112 in a given height range from the image projection surface.

The contact operation detection by the operation object onto the image projection surface has been described in detail in FIG. 19. A process of the aerial operation by the operation object in a range of a given height from the image projection surface will therefore be described in the following. As described in FIG. 19, the operation detecting sensor 350 of this embodiment may be structured to be capable of detecting the height of the operation object such as the user's finger from on the image projection surface 61. In the example of FIG. 21A, when a height Hf of the operation object is included in a height range between a given height H1 (e.g., 10 cm) and a given height H2 (e.g., 20 cm), the operation 2112 by the operation object is identified as an "aerial operation", which is recognized as an operation different from the contact operation 2111 by the operation object onto the image projection surface.

A method of moving the menu screen or operation icons by the aerial operation will be described referring to FIG. 21B. In FIG. 21B, the menu 2000 and the operation icons 2001 and 2002 are displayed in the projected image 1 in the same as those in FIG. 20. Since these functions are the same as those described in FIG. 20, their descriptions will be omitted. In the case of FIG. 21B, movement of the menu 2000, and the operation icon 2001 and/or 2002 are realized, for example, in directions etc. indicated by arrows 2171, 2172, 2173, and 2174 using the aerial operation by the operation object in the given height range described in FIG. 21A. Several methods of recognizing a moving start of the menu 2000, and the operation icon 2001 and/or 2002 through the aerial operation may be devised. Such methods will be described hereinafter.

A first method is a method according to which the interactive function unit 120 determines the moving start of the menu or operation icon from at the moment at which the operation object contacts to the menu or operation icon in the given height range of the aerial operation as indicated by the aerial operation 2112 or 2131. This method can quickly start the moving process of the menu 2000, and the operation icon 2001 and/or 2002.

There is, however, a fear of starting the moving process of the menu 2000, and the operation icon 2001 and/or 2002 against a user's intention such as a case where the user unintentionally moves by chance the operation object such as the user's hand or finger into a height range space.

Thus, a second method is a method according which the interactive function unit 120 determines a start of the moving process of the menu or operation icon after a given time (e.g., 2 to 3 seconds) passes with the operation object such as the user's finger being present in the given height range and overlapping the menu 2000 and the operation icon 2001 and/or 2002 as indicated by the aerial operation 2112 or 2131. By doing so, reduced is a possibility of starting the moving process even when the user unintentionally moves by chance the operation object such as the user's hand or finger(s) into the given height range space.

A third method is a method according which the interactive function unit 120 determines a start of the moving process of the menu or operation icon when a given gesture is made with the operation object such as the user's finger being present in the given height range and overlapping the menu 2000, the operation icon 2001 and/or 2002. Adopted as examples of the given gesture may be a gesture of sticking out two fingers to form a V shape, a gesture of bending a thumb and an index finger into a closed loop, and the like. Also in the third method, reduced is a possibility of starting the moving process when the user unintentionally moves by chance the operation object such as the user's hand or finger(s) into the given height range space.

Next, from the start of the moving process of FIG. 21B to a finish thereof, the interactive function unit 120 may cause display of the menu 2000, and the operation icon 2001 and/or 2002 to move following the operation object under its aerial operation state.

Several methods of finishing the moving process of FIG. 21B may be also devised. Such methods will be described below.

A first method is a method according to which the interactive function unit 120 determines a finish of the moving process of the menu or the icon when the operation object comes out of the given height range in the aerial operation. When adopting the first method, the user horizontally moves the operation object such as the user's finger in its aerial operation state to move the menu 2000, and the operation icon 2001 and/or 2002 to a desired positions, and then moves the operation object upward or downward to make it height deviating from the given height range. The movement of the menu 2000, and the operation icon 2001 and/or 2002 can be finished at the desired positions.

A second method is a method according to which the interactive function unit 120 determines a finish of the moving process of the menu or the icon when the user makes a given gesture by the operation object such as the user's finger in the moving process. The types of gestures may be identical with or different from those in the third method about the moving start as described above. By this, the user can finish end the movement of the menu 2000, and the operation icon 2001 and/or 2002 at the desired positions.

In the process of moving the menu 2000, and the operation icon 2001 and/or 2002 through a series of the above "aerial operations", to make the user's determinations more easily, a display indicating "in aerial operation" such as a mark 2151 of FIG. 21B may be made in the projection screen when the operation object such as the user's finger falls within the given height range and the "aerial operation" state is recognized by the interactive function unit 120.

Also, in the process of moving the menu 2000, and the operation icon 2001 and/or 2002 through the series of the above aerial operations, it is desired from the moving start to the moving finish that the user is easy to recognize clearly a target moved by the "aerial operation" by a change of colors of the above menu 2000 and operation icon 2001 and/or 2002 into colors or brightness different from the ordinary ones, or by a display of marks in their interiors or/and adjacent peripheral area.

Through the series of "aerial operation" processes described by FIGS. 21A and 21B, the user is able to transfer the menu or operation icon displayed in the projected image to a desired position.

Incidentally, an operation that follows the process of moving the menu 2000, and the operation icon 2001 and/or 2002 through the "aerial operation" of FIG. 21B will be described referring to FIG. 21C. As shown in FIG. 21C, by the contact detection process described in FIG. 19, the interactive function unit 120 detects the contact operation of the operation icon 2001 and/or 2002 by the operation object such as the user's finger onto the image projection surface 61 (e.g., contact operation 2132 or 2133, etc.), and thereby may determine that an operation of selecting the operation icon has been carried out.

Thus, advantages of separately defining operations for the menu or operation icon displayed in the projected image as two different types of operations of "aerial operation" and "contact operation" will be described referring to FIGS. 21D, 21E, and 21F.

FIG. 21D shows a case where a tea cup as the operation blocking object 2003 is placed at a position of overlapping the "Light OFF" icon 2002 on the menu 2000 similarly to that of FIG. 20D. Similarly to FIG. 20D, the "Light ON" icon 2001 can be operated through a contact operation 2134 of the operation object. However, the "Light OFF" icon 2002 is difficult to be operated by the operation object to the "Light OFF" icon 2002.

Therefore, as shown in FIG. 21E, if the menu 2000 as a whole is moved in a direction intended by the user, for example, a direction indicated by an arrow 2175 through an aerial operation 2135 by the operation object as described in FIGS. 21A and 21B, and an overlap of the operation blocking object 2003 and the menu 2000 can be cancelled.

In FIG. 21E, the user's finger as the operation object overlaps a part of the menu 2000 in the "aerial operation" 2135. However, as indicated by an "aerial operation" 2136 shown in FIG. 21F, the user's finger as the operation object may be moved in a state of overlapping a part of the "Light OFF" icon 2002. In a state of FIG. 21D, the "Light OFF" icon 2002 overlaps the operation blocking object 2003 near the image projection surface 61, and thereby its operation is difficult to perform. In the "aerial operation", however, the operation can be carried out at a position separated from the image projection surface 61, for example, 10 cm to 20 cm aloof from the image projection surface 61. By using the "aerial operation", therefore, the process of moving the operation icon 2001 and/or operation icon 2002 can be realized through the interactive function without interposing a remote-controller operation etc. even if the operation icon 2001 and/or 2002 overlaps the operation blocking object 2003 near the image projection surface 61.

As explained, described using FIG. 21 has been the moving operation in which even if the operation blocking object overlaps the menu and/or operation icon in the projected image, the interactive function unit of the projection-type image display unit 100 can change the displayed position of the menu and/or operation icon through the interactive function without interposing the remote-controller operation etc. The above-described process examples can provide a situation where even if the operation blocking object is placed on the operation surface, the user is able to continue the operation of the interactive function in a more preferable manner.

Next, using FIG. 22, described will be an example of ON/OFF control about the image projection of the projection-type image display unit 100 by the interactive function of the lighting apparatus 300 with the image-projecting function according to the one embodiment of the present invention.

For example, as shown in FIG. 22A, when the projection-type image display unit 100 projects the projected image 1 onto the projection surface 61, a "PJ OFF" icon 2201 as an operation icon for finishing the image projection by the projection-type image display unit 100 may be displayed in the projected image. When the interactive function unit 120 detects a contact operation 2211 of the PJ OFF" icon 2201 by the operation object such as the user's finger using the operation detecting sensor 350, the projection-type image display unit 100 finishes projection of the projected image 1 except for a part of the projected image 1.

As shown in FIG. 22B, the projection-type image display unit 100 stops projecting most of the projected image 1 (an image non-display area indicated by a dotted line), but continues to project a "PJ ON" icon 2202 as an operation icon for starting the image projection by the projection-type image display unit 100. The user can, therefore, resume the image projection by the projection-type image display unit 100 by making a contact operation 2212 of the "PJ ON" icon 2202 by the operation object such as the user's finger. When the image projection is resumed, the display layout of FIG. 22B may be shifted back to the display layout of FIG. 22A.

In the example of FIG. 22B, to make FIG. 22B more comprehensible, the "PJ ON" icon 2202 is displayed as a relatively large icon. However, if being displayed as a small icon in a range recognizable to the user, the "PJ ON" icon 2202 can avoid becoming an obstruction to other work etc. by the user on the table 61 as a projection surface while retaining a function of resuming the image projection.

The "PJ OFF" icon 2201 in a display state of FIG. 22A may be identical in position and size with the "PJ ON" icon 2202 in a display state of FIG. 22B. In this case, the displays of the icon 2201 and the icon 2202 are replaced every time the contact operation detection by the operation object such as the user's finger is made. The user thus can have a feeling of an operation similar to a toggle-switching operation of processing the same button repeatedly. Accordingly, an operation intuitively understandable to the user can be provided.

According to the examples of the ON/OFF control about the image projection of the projection-type image display units 100 of FIGS. 22A and 22B, the feeling of the operation intuitively understandable to the user can be provided.

Figure 23A:
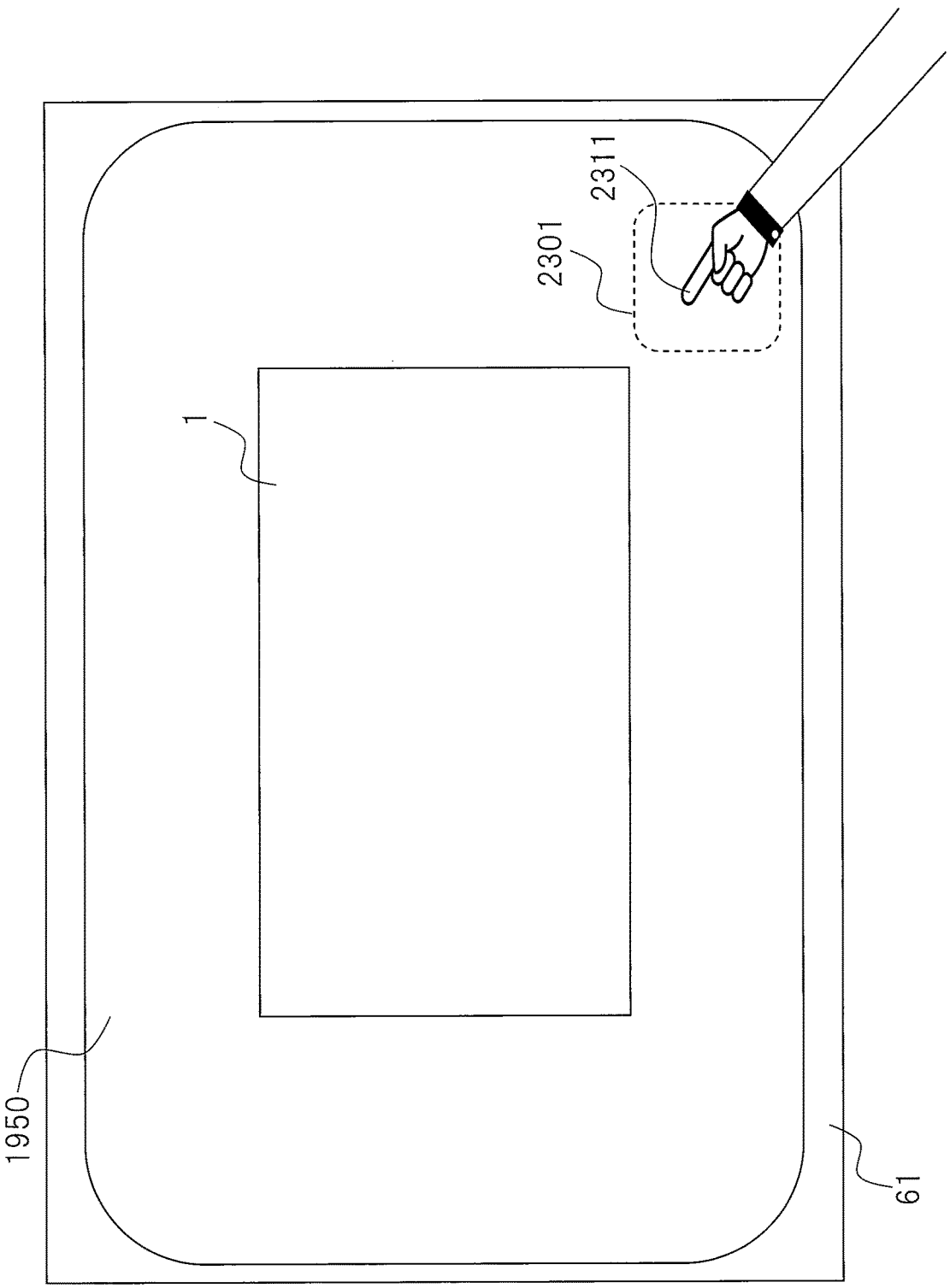
FIG. 23A is an explanatory view of an example about the interactive function of the lighting apparatus according to the present invention.

Another example of ON/OFF control bout the image projection of the projection-type image display unit 100 will then be described referring to FIGS. 23A and 23B.

In examples of FIGS. 23A and 23B, an area 2301 for detecting ON/OFF control about the image projection of the projection-type image display unit 100 is set in a part of an area that is outside the projected image 1 and inside an operation detection range 1950 for the operation detecting sensor 350. By doing this, the ON/OFF control about the image projection of the projection-type image display unit 100 using the interactive function is realized without displaying an icon equivalent to the "PJ OFF" icon 2201 of FIG. 22A or "PJ ON" icon 2202 of FIG. 22B in the projected image 1.

Specifically, in the example of FIG. 23A, a "PJ OFF" operation detection range 2301, which is a range for detecting an operation of finishing the image projection of the projection-type image display unit 100, is set outside the projected image 1 in the image projection of the projected image 1. When the interactive function unit 120 detects a contact operation 2311 by the operation object such as the user's finger into the "PJ OFF" operation detection range 2301 using the operation detecting sensor 350, the projection-type image display unit 100 may finish its projection of the projected image 1.

In the example of FIG. 23B, a "PJ ON" operation detection range 2302, which is a range for detecting an operation of starting or resuming the image projection of the projection-type image display unit 100, is set outside the projected image 1 when the projected image 1 is not projected. When the interactive function unit 120 detects a contact operation 2312 by the operation object such as the user's finger to the "PJ ON" operation detection range 2302 using the operation detecting sensor 350, the projection-type image display unit 100 may start or resume its projection of the projected image 1.

The "PJ OFF" operation detection range 2301 in a display state of FIG. 23A may be identical in position and size with the "PJ ON" operation detection range 2302 in a display state of FIG. 23B. In this case, the function of the operation detection range is switched every time the contact operation detection by the operation object such as the user's finger is made. The user can thus have a feeling of an operation similar to a toggle-switching operation of pressing the same button repeatedly. Therefore, the operation intuitively understandable to the user can be provided.

According to the examples of the ON/OFF control about the image projection of the projection-type image display unit 100 of FIGS. 23A and 23B as described above, the feeling of the operation intuitively understandable to the user can be provided. Also, the ON/OFF control about the image projection is difficult to hamper in viewing the projected image in comparison with the examples of FIGS. 22A and 22B. Differently from the example of FIG. 22B, the example of FIG. 23B does not require displaying an icon for the ON/OFF control in the projected image 1. Therefore, the light source 105 of the projection-type image display unit 100 cam be turned OFF, and energy consumption in a stand-by mode can be further reduced.

Next, described using FIG. 23C will be an example of setting a "virtual switch" having a function of the "PJ OFF" operation detection range 2301 of FIG. 23A and a function of the "PJ ON" operation detection range 2302 in the state of FIG. 23B. In the description of the examples of FIGS. 23A and 23B, it has been explained that the "PJ OFF" operation detection range 2301 in the state of FIG. 23A and the "PJ ON" operation detection range 2302 in the state of FIG. 23B are set to the same position and size, and so the user can be obtain such an operating feeling as a toggle-switching operation of pressing the same button repeatedly.

The above operation detection range will hereinafter be referred to as "virtual switch". If the operation detection range is within the operation detection range 1950 of the operation detecting sensor 350 (the irradiation range of the sensing light 1703, or a range in which the irradiation range of the sensing light 1703 overlaps the image-capturing range of the image-capturing sensor incorporated in the operation detecting sensor 350) even when this operation detection range is out of the range of the projected image 1, it can be used as the range of the virtual switch. When the lighting apparatus 300 with the image-projecting function is used for the purpose of projecting the image onto the table 61 in the home, however, it is natural to assume that a proper setting position of the "virtual switch" varies depending on individual circumstances of users and homes.

As shown in FIG. 23C, accordingly, a setting menu for the user to select the position of the "virtual switch" may be displayed in the projected image 1. In FIG. 23C, a plurality of arrowed icons pointing outward are displayed on an inner periphery position of the projected image 1. When the interactive function unit 120 detects a contact operation 2321 by the operation object such as the user's finger with respect to any one of the arrowed icons (arrowed icon 2331 as an example in FIG. 23C) using the operation detecting sensor 350, a position of a "virtual switch" 2303 may be structurally set at a position near an outer periphery position of the projected image 1 which is pointed by the arrowed icon.

Incidentally, as the examples of the functions of the "virtual switches" 2301 to 2303, examples of switches having functions of turning ON/OFF the image projection of the projection-type image display unit 100 have been described referring to FIG. 23. However, the functions of the "virtual switches" 2301 to 2303 are not limited to these. Set may be a "virtual switch" which changes the "Light ON" function for an operation of lighting the illumination light 1702 of the illuminating unit 200 and the "Light OFF" function for an operation of extinguishing the illumination light 1702 of the illuminating unit 200 every time the operation object contacts to the detection range.

According to the above setting example of the projection-type image display unit 100 of FIG. 23C, the "virtual switch" that can provide an operation feeling intuitively understandable to the user can be set at a position intended by the user, and can be made further convenient to the user.

An example in which a setting menu screen for setting a plurality of "virtual switches" with different functions at respective different positions is displayed in the projected image 1 will then be described referring to FIGS. 24A and 24B. As described in FIG. 23, no image is projected at the position of the "virtual switch". If the "virtual switches" with different functions are arranged nearly, therefore, they may not be convenient for the user. In setting a plurality of types of "virtual switches" each having no projected image, it is natural to assume that the proper setting positions of the "virtual switches" vary depending on the individual circumstances of users and homes.

Accordingly, as shown in FIG. 24A, the setting menu for the position of a "virtual switch 1", which is a switch having the function of turning ON/OFF the image projection operation of the projection-type image display unit 100, is first displayed in the projected image 1, so that the user can set the position of the "virtual switch 1" through the setting menu. In the example of FIG. 24A, for example, a plurality of arrowed icons pointing outward are displayed, the interactive function unit 120 detects a contact operation 2411 by the operation object such as the user's finger with respect to an arrowed icon 2421 using the operation detecting sensor 350, and the "virtual switch 1" is set at a position 2401.

Next, as shown in FIG. 24B, a setting menu for the position of a "virtual switch 2", which is a switch having the function of turning ON/OFF the illumination light 1702 of the illuminating unit 200, is displayed in the projected image 1, so that the user can set the position of the "virtual switch 2" through the setting menu.

In an example of FIG. 24B, for example, a plurality of arrowed icons pointing outward are displayed, the interactive function unit 120 detects a contact operation 2412 by the operation object such as the user's finger with respect to an arrowed icon 2422 using the operation detecting sensor 350, and the "virtual switch 1" is set at a position 2402. As a result of the settings shown in FIGS. 24A and 24B, for example, as shown in FIG. 24C, the user is able to operate the "virtual switch 1" set at the position 2401 through a contact operation 2421 by the operation object such as the user's finger, and the "virtual switch 2" set at the position 2402 through a contact operation 2422 by the operation object such as the user's finger.

According to the above virtual switch setting examples of the projection-type image display unit 100 of FIGS. 24A, 24B, and 24C, the respective positions of the plurality of "virtual switches" with different functions are set according to the user's intention, can be made further convenient to the user.

<Various Modifications>

The lighting apparatuses with the image-projecting function according to various embodiments of the present invention have been described above. However, the present invention is not limited only to the embodiments described above and includes various modification examples. For examples, the embodiments above have been described about the entire system in detail so as to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, a part of the configuration of each embodiment may be added, eliminated or replaced with another configuration.

EXPLANATION OF LETTERS AND NUMERALS

10 . . . lighting apparatus; 11 . . . body (casing) (shade); 12 . . . diffusing panel; 20 . . . illumination light source; 22 . . . semiconductor light-emitting element (LED); 30 . . . optical unit; 32 . . . display element; 34 . . . projection optical system; and 35 . . . reflective mirror.

The invention claimed is:

1. A lighting apparatus comprising:
an illuminator configured to emit illumination lights;
a projector configured to emit image-projecting light for projecting a projection image;
a controller; and
a toggle switch,
wherein the illumination lights emitted by the illuminator include light emitted from a plurality of light sources positioned at different locations,
the image-projecting light emitted downward by the projector from an outgoing port of the projector to a plane located at a lower position than the projector,
the controller is configured to control a lighting state of the light sources of the illuminator and control a lighting state of a light source of the projector, and
the toggle switch includes a drawstring and is configured to change control by the controller, and a front end of the drawstring of the toggle switch is placed at a position which is: 1) lower than the outgoing port of the projector, 2) higher than the plane to which the projection image is projected, 3) within an irradiation range of the illumination light emitted by the illuminator, and 4) out of a range of the image-projecting light emitted by the projector.

2. The lighting apparatus according to claim 1,
wherein a state of the control by the controller, which is changed by the toggle switch, includes:
a first state of extinguishing both of the light sources of the illumination light of the illuminator and the light source of the projector;
a second state of lighting the light sources of the illumination light of the illuminator and extinguishing the light source of the projector; and
a third state of extinguishing the light sources of the illumination light of the illuminator and lighting the light source of the projector.

3. The lighting apparatus according to claim 2,
wherein every time a user repeats a same operation to the toggle switch, the toggle switch switches the state of the control by the controller to any one of a plurality of states including the first to third states.

4. The lighting apparatus according to claim 2,
wherein the state of the control by the controller, which is changed by the toggle switch, includes a fourth state of lighting both of the light sources of the illumination light of the illuminator and the light source of the projector.

5. The lighting apparatus according to claim 4,
wherein the second and fourth states are different from each other in a light amount of the illumination light of the illuminator.

6. The lighting apparatus according to claim 1,
wherein the drawstring of the toggle switch has a fiber string portion.

7. The lighting apparatus according to claim 1,
wherein the drawstring of the toggle switch has a metal-chain portion.

8. The lighting apparatus according to claim 1,
wherein the drawstring of the toggle switch has a synthetic-resin-chain portion.

* * * * *